United States Patent [19]
Eliscu et al.

[11] Patent Number: 4,646,294
[45] Date of Patent: Feb. 24, 1987

[54] HIGH-SPEED QUEUE SEQUENCER FOR A BURST-SWITCHING COMMUNICATIONS SYSTEM

[75] Inventors: Mark Eliscu, Needham; Stanford R. Amstutz, Andover; Pamidimukkala M. V. Rao, Boston, all of Mass.

[73] Assignee: GTE Laboratories Incorporated, Waltham, Mass.

[21] Appl. No.: 762,642

[22] Filed: Aug. 2, 1985

[51] Int. Cl.⁴ .............................................. H04J 6/00
[52] U.S. Cl. ........................................ 370/94; 370/60
[58] Field of Search .................... 370/58, 60, 94, 104, 370/110.1

[56] References Cited

U.S. PATENT DOCUMENTS

| | | | |
|---|---|---|---|
| 4,201,889 | 5/1980 | Lawrence et al. | 320/68 |
| 4,201,891 | 5/1980 | Lawrence et al. | 370/58 |
| 4,484,326 | 11/1984 | Turner | 370/60 |
| 4,486,877 | 12/1984 | Turner | 370/15 |
| 4,488,288 | 12/1984 | Turner | 370/60 |
| 4,488,289 | 12/1984 | Turner | 370/60 |
| 4,490,817 | 12/1984 | Turner | 370/17 |
| 4,491,945 | 1/1985 | Turner | 370/60 |
| 4,494,230 | 1/1985 | Turner | 370/60 |
| 4,499,576 | 2/1985 | Fraser | 370/60 |
| 4,506,358 | 3/1985 | Montgomery | 370/60 |
| 4,512,011 | 4/1985 | Turner | 370/60 |
| 4,521,880 | 6/1985 | Orsic | 370/68 |
| 4,524,440 | 6/1985 | Orsic | 370/54 |
| 4,583,219 | 4/1986 | Riddle | 370/94 |

OTHER PUBLICATIONS

Morse & Kopec, Performance Eval of A Dist Burst-Switched Com Syst, Proceedings, Phoenix Conf on Computers, 3/83, pp. 41-46.
Haselton, A PCM Frame Switching Concept . . . , IEEE Communications Magazine, 9/83, pp. 13-19.
Amstutz, Burst Switching—An Introduction, IEEE Communications Magazine, 11/83, pp. 36-42.
Torng, R-Switch: A VLSI Switch Architecture for Integrated Services, IEEE, 2/82, pp. 1303-1307.
Haselton, New Switching Concept Integrates Voice and Data Bursts, GTE Labs PROFILE, Sep. 1983, pp. 1-5.
Haughney, Application of the Burst Switching Technology to the Defense Communications System, IEEE MILCOM '83, 1/83, pp. 297-300.

Primary Examiner—Douglas W. Olms
Assistant Examiner—Kenneth J. Rokoff
Attorney, Agent, or Firm—Joseph S. Romanow

[57] ABSTRACT

This invention provides a high-speed queue sequencer which may be employed as a component of a link switch or hub switch in a burst-switching communications system. When so employed, transmission speeds for integrated voice and data services over communications links between switches may be equivalent to the T1 rate or higher. A burst is a plurality of bytes which represents, for example, a block of data or a spurt of voice energy sensed by silence/voice detectors located at voice ports. In a preferred embodiment, the architecture of the queue sequencer includes a data/address bus, control including a stored program in a 64-bit wide PROM, a random-access memory for queue memory which stores administrative information pertaining to bursts passing through the switch, enque means for adding a burst to the list of bursts awaiting assignment to an output channel, and deque means for assigning the highest-priority burst on this list to an output channel and removing the burst from the list, first-in first-out memory for storing requests from switching processors and providing these requests to the control of the queue sequencer within priority class in the same time order as received, and input and output interfaces for coupling with the switching processors. A switching processor is a companion high-speed processor employed as one or more components in a link switch and hub switch. Most components of the queue sequencer operate substantially in parallel with and independently of the control, which is a contributing factor to the speed advantage realized by the queue sequencer. The queue sequencer performs queue administration for all switching processors of a link or hub switch.

15 Claims, 44 Drawing Figures

PRIOR ART PARALLEL PRIORITY-RESOLVING CIRCUIT

| \ DATA LINK ESCAPE PROCEDURE | | | | |
|---------|------|--------------|-----------------|
| CONTROL | DATA | TRANSMISSION | AFTER RECEPTION |
| DLE     |      | DLE          | PREFIX DLE      |
|         | DLE  | DLE DLE      | DLE AS DATA     |
| TRM     |      | TRM          | END-OF-BURST    |
|         | TRM  | DLE TRM      | TRM AS DATA     |

Fig. 20.

| CONDITIONS | 1<br>START OF HUB CHANNEL | 2<br>DATA PASSES THROUGH | 3<br>DATA INSERTED ONTO RING | 4<br>HUB CHANNEL SEIZED AND DATA INSERTED ONTO RING | 5<br>HUB CHANNEL BUSY DATA PASSES THROUGH |
|---|---|---|---|---|---|
| TICK | 0 | 1 TO N-1 | 1 TO N-1 | 1 TO N-1 | 1 TO N-1 |
| COMPARATOR 537 | | NO MATCH | MATCH | MATCH | MATCH |
| NEED CHANNEL 545 | | | CHANNEL NEEDED | CHANNEL NEEDED | CHANNEL NEEDED |
| THIS-SU REGISTER 532 (DESTINATION SU RECEIVE ACTIVITY) | | | CHANNEL BUSY | CHANNEL IDLE | CHANNEL BUSY |
| TRANSMIT ACTIVITY MEMORY 559 | | | TRANSMIT BUSY | TRANSMIT IDLE | TRANSMIT IDLE |
| SEIZE STATUS 551 | | | INACTIVE | CHANNEL SEARCH UNDERWAY | CHANNEL SEARCH UNDERWAY |

| TO | FROM (INFORMATION) | | | | |
|---|---|---|---|---|---|
| HUB-OUT DATA REGISTER 548 | THIS-SU REGISTER 532 (DATA BYTE) | | | | |
| RECEIVE ACTIVITY MEMORY 543 | THIS-SU REGISTER 532 (ACTIVITY BIT) | | | | |
| SUCCESSIVE SU DATA (ON 502) | | THIS-SU REGISTER 532 (DATA BYTE) | HUB-IN DATA REGISTER 535 (DATA BYTE) | HUB-IN DATA REGISTER 535 (DATA BYTE) | THIS-SU REGISTER 532 (DATA BYTE) |
| SUCCESSIVE SU ACTIVITY (ON 541) | RECEIVE ACTIVITY MEMORY 543 (RECEIVE ACTIVITY BIT FOR NEW CHANNEL) | THIS-SU REGISTER 532 (ACTIVITY BIT) | (ACTIVITY BIT BUSY) | (ACTIVITY BIT BUSY) | THIS-SU REGISTER 532 (ACTIVITY BIT) |
| CHANNEL SEIZED 546 | | | (DATA INSERTED) | (DATA INSERTED) (CHANNEL SEIZED) | (DATA NOT INSERTED) (CHANNEL BUSY) |
| TRANSMIT ACTIVITY MEMORY 559 | | | (UNCHANGED) | (CHANNEL TRANSMIT BUSY) | (UNCHANGED) |
| SEIZE STATUS 551 | | | (UNCHANGED) | (INACTIVE) (CHANNEL SEARCH COMPLETED) | (UNCHANGED) |

…

HIGH-SPEED QUEUE SEQUENCER FOR A BURST-SWITCHING COMMUNICATIONS SYSTEM

CROSS-REFERENCES TO RELATED APPLICATIONS

U.S. patent application Ser. Nos. 762,593, 762,594, 762,641, 762,589, 762,592, 762,588, 762,591, and 762,590, filed concurrently herewith and assigned to the same assignee hereof, contain related subject matter.

TECHNICAL FIELD

This invention relates to communications switching systems and their components providing fully integrated voice and data services. More particularly, the invention relates to high-speed processors employed in integrated switches.

BACKGROUND OF THE INVENTION

Communications users, particularly telecommunications users, have required ever-increasing ranges of information transport. In the traditional telephone network, voice signals were transmitted and switched through the network in analog form. Because of economies in certain types of transmission media, voice signals were digitized for transmission purposes. Time-division multiplexing of digital voice signals was the most economical way to utilize the wire-based transmission plant of the telephone network.

With the advent of data processing and distributed data processing systems, a need arose for the transmission of data over communications links and through the telephone network. For purposes herein, "data communications" is broadly defined as any information transmitted through a digital communications network other than digitized voice signals. Currently, the most common type of data communications is alphanumerical data, i.e., text or numerical data. Future communications requirements include the ability to carry image and video communications in substantial proportions. Image communications is the transmission of a still picture or motionless object. Facsimile transmission, presently the most common form of image communications, is the transmission of the image of a block or page of information rather than transmission of the digital representations of the letters or characters which comprise the block or page. Video transmission adds motion to image transmission. It can range from transmission of full motion color television signals to freeze-frame video, which is a series of sequential still images. As image and video communications become more prevalent, the demand for bandwidth will increase dramatically. No doubt, there will be even greater communications demands in the future, both as to diversity of services and traffic capacities.

It is well settled that digital time-division multiplexed transmission is preferred for both voice and data communications for a number of reasons not the least of which are the substantial economies realizable from digital multiplexing. Digital multiplexing can occur between communications of the same type, such as interleaving a plurality of voice conversations onto a single pair of wires. A form of multiplexing can also occur between communications of different types, such as inserting data communications into detectable silence periods in voice communications. Such detectable silence periods may occur while one conversant is listening or in gaps between words or syllables of a speaker. Multiplexing is particularly suited to adapting to variable bandwidth demands which result from the inherently "bursty" nature of most voice and data communications. Thus, integration of voice and data is spurred by the substantial economies of digital multiplexing and the growing diversity of services.

A digital communications network or system is said to be "integrated" or to provide "integrated services" if the network or system has the capacity to transmit voice and data communications through common equipment and facilities. An attribute of integrated communications systems is the use of intelligent processors at various points in the network for control purposes. Control is "distributed" or "dispersed" if the overall network control emanates from multiple geographical points, each point using local information or information provided by distant points via the network itself. Thus, the intelligence in a distributed control network is dispersed throughout the geographical area being served. In particular, a switching decision which needs to be made by a local processor can be made with information immediately available to the local processor. In large communications systems, distributed control generally improves efficiency since the intelligence required to route local traffic is nearby. Distributed control also enhances survivability since a local portion of the system, being self-controlled, will remain operable in the event a distant control point should be out of service.

With the ever-increasing demand for transmission bandwidth, it is axiomatic that higher bit rates will be employed over communications links in the future. On the Bell System T1-carrier, of which millions of miles are already installed, a communications link carries 1.544 million bits per second. Links with substantially higher bit rates are feasible even with current technology. The provision of integrated services over high-speed communications links will require new methods, procedures, and protocols governing information transport through the network. In particular, additional bandwidth required by the system for routing and administration, i.e., the "overhead," should be minimized while permitting reasonable flexibility within the network to adapt to changing circumstances. Integrated switching apparatus should be capable of transmitting and routing information at T1 rates and higher, so that optimal channel utilization can be achieved.

Communications systems planners, and in particular telecommunications systems planners, seek high-speed processors for use in switches such that communications links may support integrated services at the T1 transmission rate (or the equivalent) and even faster rates. Such high-speed processors should have other features, such as low cost, ease of maintenance, high suitability for implementation in very-large scale integration technology, etc. It would substantially advance the state of the communications art if such a high-speed processor were available.

DISCLOSURE OF THE INVENTION

It is, therefore, an object of the invention to obviate the deficiencies in the existing art and to make a significant new contribution to the field of communications systems.

It is an object of the invention to provide a communications system having fully integrated voice and data services.

An object of the invention is to provide a communications system employing high-speed communications links, such links having bit rates of T1 or higher.

It is an object of the invention to provide a communications system having highly distributed control and equipment.

An object of the invention is to provide a communications system wherein the control functions are administered entirely through the transmission network; where reallocation of control capacity may be achieved entirely through the transmission network, flexibly, and with virtually no disruption of user services; and where in the event of a failure of a control processor, the responsibilities of the failed processor may be reassigned to one or more surviving control processors.

Another object of the invention is to provide an integrated communications system which makes efficient use of the copper-wire plants of existing telephone networks.

It is an object of the invention to provide methods of information transport within a communications system which require minimal routing and administrative overhead while permitting adequate network flexibility to adapt to changing circumstances.

An object of the invention is to provide an integrated communications system which features low-cost modular components with highly redundant circuits well suited for implementation in very large scale integration technology.

It is an object of the invention to provide an integrated communications system which has the capability to transport voice communications without subscriber-perceptible distortion or delay except possibly under overload conditions.

An object of the invention is to provide a communications system having the capability within each switching node to allocate bandwidth dynamically, i.e., within the current communications channel, and thereby to maximize bandwidth utilization throughout the system.

It is an object of the invention to provide methods of information transport within a communications system which have the capability of handling bursty information, i.e., digital messages of varying length, in a highly efficient manner.

An object of the invention is to provide a link switch which may be employed in a communications system, such link switch having an embodiment which is relatively small and inexpensive whereby it may be highly dispersed geographically and, if desirable, located nearby or on subscriber premises.

It is an object of the invention to provide a hub switch which may be employed in a communications system, such hub switch being a high-speed high-capacity switch which may be located at points of high concentration in the system.

An object of the invention is to provide a high-speed switching processor which may be embodied as a component or as several components in a link switch and/or hub switch of a communications system.

It is an object of the invention to provide a high-speed queue sequencer which may be employed in some embodiments of a communications system as a component in a link switch and/or hub switch.

An object of the invention is to provide a communications system having the capability of providing digital communications from origin port to destination port whereby possible noise interference will be substantially reduced, ease of maintenance improved, and security and privacy enhanced, particularly in the case where the origin port and/or destination port is located on user premises.

It is an object of the invention to provide an integrated communications system wherein the transmission rates received at the ports for bursts containing digitized voice are approximately equal to burst transmission rates over communications links, so that speed buffering of voice bursts within link switches is not required.

It is another object of the invention to provide an intelligent port circuit for a link switch, such port circuit having a high degree of control intelligence whereby the distributed control feature of a communications system may be enhanced when the port circuit is remotely located.

An object of the invention is to provide a port circuit for a link switch which may be located in the vicinity of the subscriber, on the subscriber's premises, or within end-user equipment, such that call or message propagation capacity exists at the hub-switch level, link-switch level, and even at the end-user equipment level, if desired.

It is another object of the invention to provide a port circuit for a link switch, such port circuit having a loop-back testing capability, whereby components of a burst switching system may be remotely monitored for operability including components of the port circuit itself.

An object of the invention is to provide a method of call set-up and take-down in a telephone communications system.

It is another object of the invention to provide a highly distributed control architecture for a communications system in which control capacity can be added or deleted incrementally with virtually no disruption in user services.

These objects are accomplished, in one aspect of the invention, by the provision of a high-speed queue sequencer for use in a switch of a burst-switching communications system. In such system, a burst is a plurality of bytes which represents, for example, a block of data or a spurt of voice energy sensed by silence/voice detectors located at voice ports. The system includes a plurality of switches interconnected by time-division multiplexed communications links. Each link has a plurality of frames within each second of time. Each frame has a plurality of channels. Each channel has communications capacity for the transmission of one byte. A byte is a predetermined number of bits, a bit being one binary digit. The system also includes a plurality of ports. Each port is a component of a link switch. A switch includes the queue sequencer and at least one switching processor. The queue sequencer and switching processor(s) are coupled via a queue-sequencer bus.

The architecture of the queue sequencer comprises a data/address bus. Control means are coupled with the data/address bus for controlling the queue sequencer. The control means includes stored-program memory and execution means, and queue-memory means for storing administrative information pertaining to bursts passing through the link switch.

Enque/deque means are coupled with the data/address bus. The verb "enque" means to add an entry to a queue; the verb "deque" means to delete an entry from a queue. The enque function performs the administration required for placing a burst on an output queue. The output queue is a list which indicates those bursts awaiting assignment to an output channel in a communications link. The deque function assigns the highest priority burst on an output queue to an idle output channel of the communications link and removes the assigned burst from the output queue. The enque/deque means operates substantially in parallel with and independently of the control means.

Request-holding means are coupled with the data/address bus. The request holding means function is to receive requests or commands from any switching processor(s), to determine the priority of each request, to store pending requests within priority classes, and to output these requests within priority classes in the same time order as received. The request-holding means operate substantially in parallel with and independently of the control means.

Input-interface means are coupled between the queue-sequencer bus and the request-holding means. The function of the input-interface means is to provide an interface between the queue sequencer and the switching processor(s). The input-interface means have the ability to receive a request or command from any switching processor of the switch and to transmit this request to the request-holding means. The input-interface means operate substantially in parallel with and independently of the control means.

Output-interface means are coupled between the data/address bus and the queue-sequencer bus. The function of the output-interface means is to provide an interface between the queue sequencer and the switching processor(s). The output-interface means have the ability to transmit a buffer address to a switching processor. The output-interface means operate substantially in parallel with and independently of the control means.

The queue sequencer operates substantially in parallel with and independently of the switching processor(s); and the queue sequencer acts on behalf of all switching processors of the switch.

In one embodiment of the invention, the burst-switching communications system includes a link switch and the switching processor is at least one component of the link switch. In another embodiment of the invention, the system includes a hub switch and the switching processor is at least one component of the hub switch.

In yet another embodiment of the invention, the request-holding means comprise one or more first-in first-out memories including the required control logic.

Thus, there is provided a high-speed queue sequencer which will meet the growing communications needs of the present and foreseeable future. This processor incorporates many features and advantages which will be explained in greater detail below.

BRIEF DESCRIPTION OF THE DRAWINGS

FIG. 20 is a table summarizing the operations of a switching unit of a hub switch.

BEST MODE FOR CARRYING OUT THE INVENTION

For a better understanding of the present invention, together with other and further objects, advantages, and capabilities thereof, reference is made to the following disclosure and appended claims taken in conjunction with the above-described drawings.

Burst switching employs novel methods and equipment for switching digitized voice and data in a fully integrated way. As will be evident from the definition of a burst, any form of digital communications may be handled by burst switching. Burst switching systems typically are characterized by highly dispersed small switches, distributed control, and improved bandwidth efficiencies.

Figure 1:
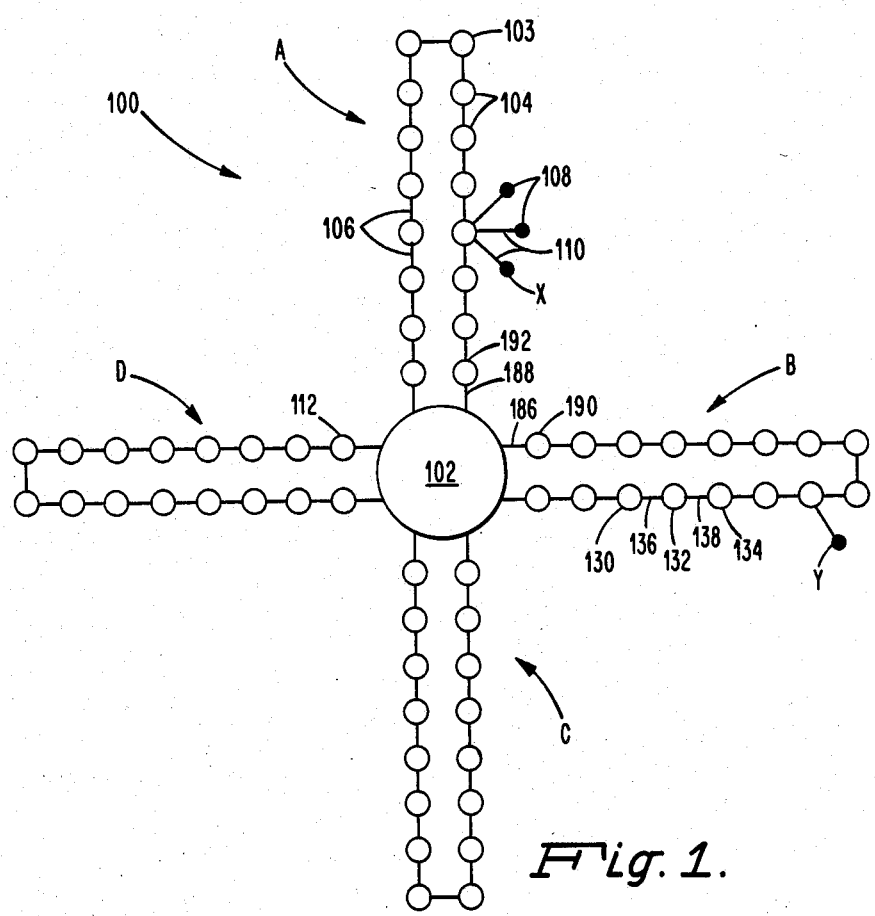
FIG. 1 is a block diagram of an embodiment of a burst-switching system.

FIG. 1 shows a preferred embodiment of burst switching system 100. System 100 comprises high-capacity hub switch 102 and a plurality of link switches 104. Link switches 104 typically are small switching elements serving, for example, thirty-two ports or less. Twenty-four ports is a preferred number because of the twenty-four channels in a T1 span. Switches are coupled to each other by time-division multiplexed communications links 106, e.g., a T1-span. A plurality of end-user instruments 108 may be coupled via lines 110 with line circuits (not shown in the drawing). The line circuits are in turn coupled with ports which are components of link switches 104. A port of a link switch provides means of access to system 100 by users, by control processors, or by other distinct communications systems. A port-interface circuit provides an appropriate interface with such user, control processor, or other communications system. When interfacing with an end-user instrument, the port-interface circuit will be denoted herein as a line circuit. When interfacing with another communications system, the port-interface circuit will be denoted herein as a trunk circuit. When interfacing with a control processor or when speaking generically, the terms "port-interface circuit" or "port circuit" will be used herein.

For purposes herein, T-carriers comprise a hierarchy of digital transmission systems designed to carry voice or speech and other signals in digital form, employing pulse-code-modulation (PCM) and time-division multiplexing (TDM) techniques. The T1-carrier has twenty-four PCM speech channels. Each signal is sampled 8,000 times per second. Each sample is represented by an eight-bit code. Each frame is 193 bits, comprising a sample for each of the twenty-four speech channels followed at the end of the frame by one frame-synchronization bit. The T1 line rate is 1.544 million bits per second. The T2-carrier has a 6.312 megabit line rate and carries 96 PCM voice channels or the equivalent. These definitions of T-carriers are used only by way of example. These definitions are not critical to the operation or description of the invention.

Link switches may be organized into link groups. Any link switch within a link group has the ability to communicate with any other link switch within the same link group without the communication passing through the hub switch. In FIG. 1, there are four link groups labelled A, B, C, and D, in the drawing. Any communication between link switch 103 and link switch 112 necessarily must pass through hub switch 102; consequently, link switch 103 and link switch 112 are in different link groups, i.e., link groups A and D respectively. Hub switch 102 interconnects distinct link groups.

A small burst-switching system may not require a hub switch. For example, link group A may function as a complete system without hub switch 102. On the other hand, a large burst-switching system or a system having high survivability requirements might require more than one hub switch.

There are numerous alternate configurations for system 100, such as star, ring, tree-type configurations, and combinations of these structures, each configuration having certain advantages and disadvantages which may be more or less relevant depending on the requirements of the particular application. System 100 as shown in FIG. 1 is a preferred embodiment of a burst switch for reasons that are set forth below.

System 100 corresponds to a present-day central office or private branch exchange (PBX) typically having a capacity for servicing 98,000 lines and trunks. In burst switching, the switching function has been dispersed, that is, brought closer to the user. The link switches are small so that they can be dispersed into the user neighborhoods or businesses. A typical link switch may be mounted on a pole in residential areas, much like a small distribution transformer, or wall-mounted in a closet in commercial buildings.

The high dispersal of the switching function exhibited in FIG. 1 satisfies an objective of burst switching. The telephone industry has a large investment in outside copper plant. The outside plant represents a significant replacement value compared to the switching and terminal equipment. Burst switching will extend the usefulness of this plant by expanding the use of the plant to new services and improving the efficiency of established services.

The Integrated Services Digital Network (ISDN) is one new service area. This network might call for a bandwidth of 288,000 bits/second at the subscriber instrument or terminal. A short loop leading to a link switch perhaps a few hundred yards away will be better able to support this bandwidth than will a two-wire pair one to three miles long leading to a central office.

Burst switching is expected to permit the extraction of new services and bandwidths from the existing plant by moving much of the switching into the plant. As a side effect, the much shortened average loop length may show much less variation in impedance, permitting the striking of better compromises in the hybrid network. While there may be some delay through a burst network, burst switching will not require echo suppressors.

For installations in a new subdivision or building, or for replacement installations, the amount of copper required to be installed for burst-switch loops is much less than that required for a traditional switch. A recent applications study done by GTE Laboratories shows that burst switches installed in a rural area of about 2000 lines would have required only 15% of the outside plant that the present centralized installation required.

In burst switching, data characters are switched in the same way as digitized voice characters and through the same circuits. Likewise, any type of digitized analog signals, e.g., image packets, will be handled in a fully integrated way by a burst switching system. Fully integrated switches will better adapt to changing traffic mixes, from moment to moment and over the years.

Should the percentage of data compared to voice increase in the coming years, a burst switch will adapt without reconfiguration since it switches data in the same way as voice. Burst switching does differentiate between data and voice in one particular. Voice samples are perishable; excessive delay renders them useless. Data messages can be delayed much longer with acceptable performance. On the other hand, voice is redundant. Some voice samples may be lost without loss of voice quality. Data is not redundant and no bytes may be lost.

Burst switching therefore switches voice samples at higher priority than data so that a voice burst may have the first chance at resources in the case of contention. This minimizes the loss of voice samples (clipping). Data characters will be buffered in the case of contention so that no data is lost, although delivery may be delayed.

Another instance of integration in burst switching is that any port may be coupled with a line or a trunk, as well as being either a voice or data line. The port circuit will differ, but a trunk may appear anywhere in the switch. A trunk may be either analog or digital.

A burst may contain a digitized voice (or speech) or data message. For purposes herein, a burst containing a communication other than digitized speech will be treated as a data communication. A "talkspurt" is a single continuous emission of voice energy as would occur in the pronunciation of a single syllable. A speaker in ordinary conversation issues voice energy 35-40% of the time. Burst switching employs silence (or speech) detection so that system resources such as transmission channels are dedicated only while there is information to send, that is, during the burst. At the conclusion of a burst, the channel is available for assignment to another burst. Thus, burst switching utilizes its resources with two to three times the efficiency of traditional circuit switching, which dedicates a channel to a conversation for the entire duration of the call.

Figure 2:
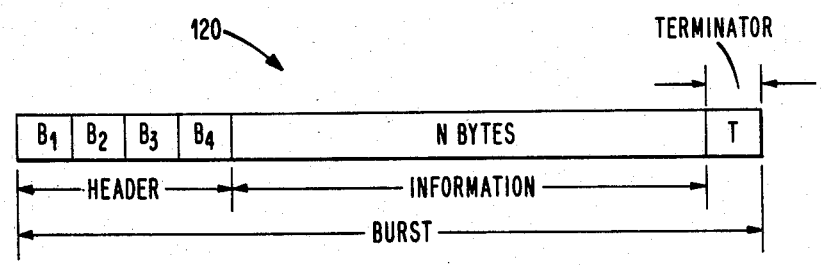
FIG. 2 shows a preferred embodiment of the digital format of a burst.

FIG. 2 shows a preferred embodiment of the digital representation of a burst. Burst 120 begins with a four-byte header, indicated as $B_1$, $B_2$, $B_3$, and $B_4$ in the drawing. In this burst-switching embodiment and for all purposes herein, a byte is eight bits, although this assumption is not critical to the invention. In other embodiments, a byte may comprise one bit, or four bits, or any predetermined number of bits. The choice of eight bits in this embodiment has been made because of the eight-bit capacity of a T-carrier channel and also because a printable character is typically represented by an eight-bit code, e.g., an ASCII code. With the definition of a byte being eight bits, the term "character" herein may be used interchangeably with byte.

In burst 120, the header contains the network address of the burst's destination. As a burst enters a switch, the header is interpreted so as to choose the appropriate link (or port) from the switch leading toward the destination port. The header contains information describing the burst as a voice, data, or control burst. As will be explained in greater detail below, control bursts are messages exchanged between switch processors. The header information is used to queue bursts for output at the desired priority and for other administrative purposes.

The fourth byte of the header is a header checksum which prevents delivery of a burst to a wrong destination. It is deemed better to abort the burst and rely on retransmission in the case of data than to deliver the burst incorrectly. No attempt is made to retransmit voice bursts. A voice burst's lifetime is so transient that there is only one chance to deliver it correctly. If that chance fails, the burst is too old to be useful.

Following the header, burst 120 has an information portion comprising N (any integral number) of bytes. Burst 100 ends with a single burst termination byte, labelled as T in the drawing. Alternatively, more than a single termination byte may be employed as will be explained below. The burst terminator may also be called FLAG herein. Thus, there are five overhead characters for each burst: the four header characters plus the terminator.

When FLAG is received, the receiver knows the burst has been completed. Bursts can be of any length, up to continuous transmission. FLAG may also used as the channel idle character, so that FLAGs will be sent in an idle channel until the next burst begins.

The bit combination chosen for FLAG may arise among the characters to be sent in the burst. There must be no restrictions in the character set available to the data sources. It must be possible to send any combination of binary data.

A data-link escape or DLE character is used to distinguish between the FLAG character as terminator and the FLAG character bit combination as ordinary data. At the source, each FLAG or DLE arising in the data to be sent is preceded by an extra DLE. At the destination, a received DLE is discarded, and the character following the DLE is received without examination for FLAG or DLE, thereby returning the character stream to that of the source. A received FLAG not preceded by DLE is interpreted as a burst terminator.

Each inserted DLE delays the actual data. FLAG and DLE should be chosen such that they occur infrequently in the voice samples or data to be sent, so as to introduce DLE-insertion delay as infrequently as possible. As voice traffic is expected to dominate data in volume through the end of the century, preferred values chosen for these characters are the codec (voice a/d and d/a) outputs representing the maximum positive and negative amplitudes of the analog voice signal. An alternate choice would be the minimum positive and negative values. This choice has particular merit where the minimum values are (in absolute value) below the minimum background noise thresholds. In any event, bit configurations which represent printable characters should not be chosen, since printable characters likely will occur in high frequencies in data and text transmissions.

In FIG. 1, communications links 106 between switches are T1 spans, although other rates could be used, for example, T2 or higher. Bursts are sent between switches in time-division multiplexed channels of the span, with succeeding characters of the burst being transmitted in succeeding frames of the span. The character rate within the channel for a T1-carrier is 8000 characters/second, which matches the codec character generation rate. In burst switching, the voice character transmission rate over communication links is matched to the character rate for the speech character sources and receivers. Therefore, no speed buffering is required at a link switch for voice bursts although, as will be explained, buffering is present in the event of contention. Burst output can begin from a link switch as soon as header routing has been done, so the delay through a link switch can be as little as two channel times, e.g., ten microseconds.

The use of T-carrier channels is an important difference between burst switching and voice packet switching. In packet switching, a packet is transmitted between nodes using the full bandwidth of the link, transmitting the characters of the packet contiguously. A packet's characters will be accumulated at the source (codec) rate, and then transmitted at a higher rate. This implies that the packet's characters must be buffered before the higher rate transmission begins. Since the time of accumulation introduces a delay, the size of the voice packet is strictly limited; otherwise, echo becomes a serious problem. A short packet means that the header overhead becomes significant. For example, suppose that a voice packet is limited to eight samples, or one millisecond's worth of data at 8000 characters/second generation rate. If the header overhead is five characters per packet, thirteen characters must be transmitted to route eight voice samples to the destination, resulting in a bandwidth efficiency of 8/13 or 62%. If only three header characters are required, the voice-packet bandwidth efficiency would be 8/11, or 73%.

By contrast, because the speech transmission rate equals the generation rate in burst switching, there is no need to buffer a speech burst before transmission begins. Transmission can begin a character time or so after burst reception begins, and the burst then continues for any period. Header transmission is required only once per burst.

The average length of a talkspurt depends on the silence detection algorithm used, but generally exceeds 100 milliseconds. The bandwidth efficiency of burst switching for a 100 millisecond burst is 800/805, which exceeds 99%.

Higher calling rates are expected in the future than those prevailing today. Experience has shown that people continue to use their telephones more and for more diversified applications. An example is the increasing transmission of data communications which was virtually nonexistent a decade or two ago.

Another significant example is that of transaction terminals, e.g., credit card verification terminals, which place calls automatically and hold for only the period of a database access. It is not now possible to determine how important this expected increase in call placement rate will be. Nonetheless, an objective of burst switching is to determine an architecture of the switch control elements which can grow gracefully to meet increased calling rates, and which does not exhibit the complexity of multiprocessor central processors.

The traditional approach for common control is to situate the decision-making element (the common control) at the center of the switch, to pull in stimuli from the periphery (signaling and supervision from subscribers), and to issue commands for connections to the switch and to the periphery (for example, for ringing).

A more recent control architecture is to move some processing capability toward the network periphery, in the form of slave processors, particularly in remote switching units. These slave processors can do some lower level preliminary processing, but the final decision making has typically remained at the central control point.

The burst switching approach expands this distributed trend to its limit. The call establishment and feature implementation logic is located in programmable processors associated with the ports in the link or hub switches. As the number of ports in a burst network increases, so will the number of control processors increase, and in a very natural way. Increased processing capability may be provided by adding a processor at an idle port without the complexity and down time entailed by adding a processor to a multiprocessor bus. In a burst-switching system, the number of bursts that can be propagated simultaneously is limited only by the number of port processors and the number of channels in the system. A port processor is a processor component of a port circuit which will be explained in greater detail below.

Messages are exchanged between control processors. For example, message exchange between the calling party processor and the called party processor is required to set up an ordinary call. This message traffic is carried as bursts in the ordinary way and thus adds to the total traffic carried by the network, although the message traffic is not significant. A three minute call between two parties, each issuing voice energy 35% of the time, will generate over one million voice samples; the control message exchange required to set up and release the call will require less than 100 characters, only 0.01% of the load.

External message exchange is not necessarily required. A port-to-port call on one link switch can be established entirely within the link switch, requiring no external control message traffic. The dispersed processors in the link switches also permit continued operation within a burst network region, even if outage prevents the region from communicating with the rest of the network.

Although the decision-making control has been moved to the periphery in burst switching systems, some semi-centralized service processor functions remain. In particular, the translation between directory number and equipment number (dialed number to burst-switch address) is performed by a few database lookup machines distributed throughout the burst network. Another similar network function is the recording of usage information for billing at the conclusion of a call. As will be discussed below, these administrative processes may be implemented in call processors and/or administrative processors. Either of these control processors may be coupled with an idle port of the system.

The advantages seen for distributed control are: processor overload is eliminated as a concern; processing capacity is added naturally and easily as ports are added; and no processor failure, central or otherwise, can bring the burst switching network down.

Figure 3:
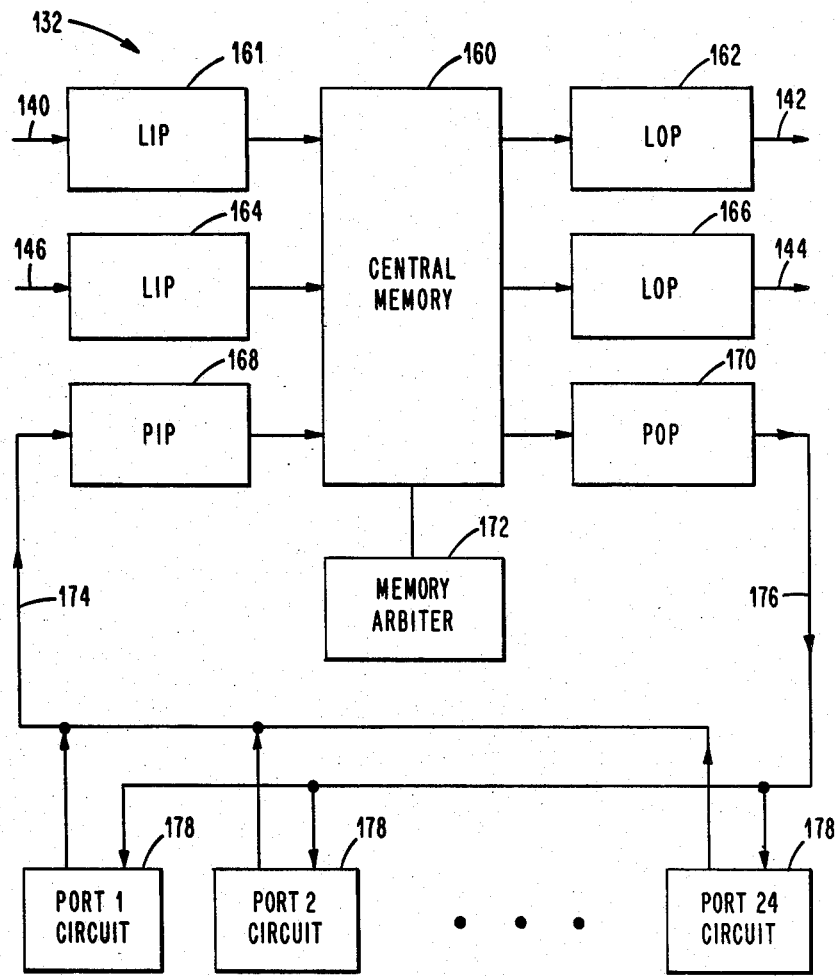
FIG. 3 is a block diagram of a link switch in accordance with the invention.
Figure 3A:
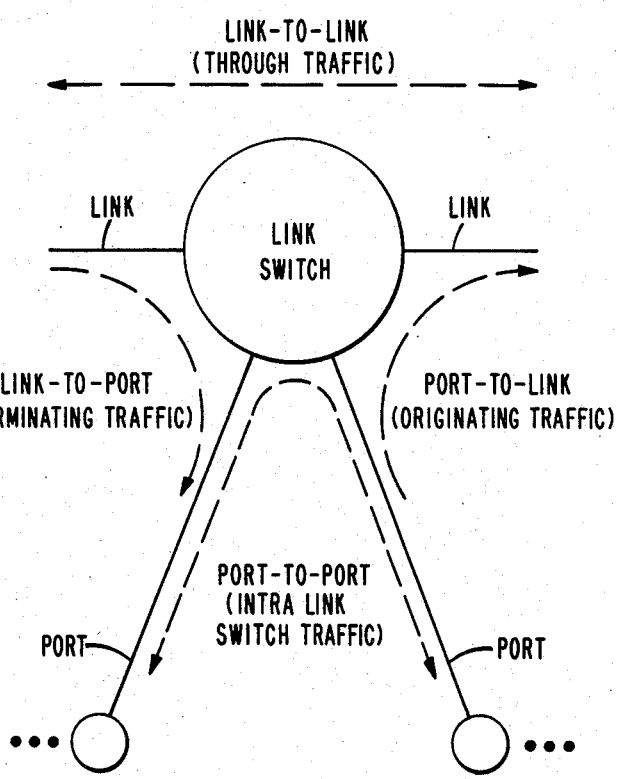
FIG. 3A illustrates the four types of bursts in transit processed by a link switch.

FIG. 3 shows a block diagram of a preferred embodiment of link switch 132. Link switch 132 is coupled between link switches 130 and 134 of system 100 as shown in FIG. 1. In such an arrangement, link switch 132 processes four types of bursts in transit as follows: link-to-link or through traffic, i.e., bursts passing through link switch 132 from an incoming link to an outgoing link; link-to-port or terminating traffic, i.e., bursts arriving on an incoming link and terminating at a port local to link switch 132; port-to-link or originating traffic, i.e., bursts originating at a port local to link switch 132 and leaving on an outgoing link; and port-to-port or intra-link switch traffic, i.e., bursts originating and terminating at ports local to link switch 132. The dashed arrows in FIG. 3A illustrate the four transit types of bursts passing through a link switch. These four transit types are also described in FIG. 10.

In FIG. 3, link switch 132 includes central memory 160 which is coupled with six high-speed processors as follows: link input processor (LIP) 161, which handles communications incoming from link switch 130; link output processor (LOP) 162, which handles communications outgoing to link switch 130; LIP 164, which handles communications incoming from link switch 134; LOP 166, which handles communications outgoing to link switch 134; port input processor (PIP) 168, which handles communications incoming from the twenty-four port circuits 178; and port output processor (POP) 170, which handles communications outgoing to the twenty-four port circuits 178. Each of these processors is a high-speed specialized switching processor adapted to handle characters and buffers. As will be explained in detail below, the same high-speed processor with slightly different software or firmware may be adapted to meet the six link-switch processor functions. Central memory 160, having high-speed direct-access memory, is coupled with memory arbiter 172 so that only one processor of link switch 132 may obtain access at one time. Memory 160 is the only means of communication between the various processors.

The term "port" does not include port circuit 178. Port circuit 178 physically may be located adjacent to link switch 132 or it may be located remotely, such as on the user premises or within the end-user instrument. Port circuit 178 may be a line circuit, when link switch 132 is coupled with a end-user instrument; or it may be a trunk circuit, when link switch 132 is coupled with another communications system. A port circuit of link switch 132 may also be coupled with a call processor or administrative processor for control purposes, e.g., call set-up. Thus, a port of a link switch, as used herein, describes means within the link switch for coupling with an external circuit or device, but the external circuit or device is not part of the port.

Most of memory 160 is divided into dynamic buffers, which may be assigned to active channels on communication links or ports. Characters are stored on input in a dynamic buffer assigned for the burst to the input channel, and characters for output are read from the buffer assigned to the output channel.

The dynamic buffers are employed as ring or circular buffers, so that the last storage location in a buffer is considered the predecessor of the first. Concurrent input and output can occur, with a character being read for output only a few character times after it has been stored as input. Only a few characters will be in the buffer of a burst which is being outputted at the same rate it is being inputted. The buffer storage locations will be used in round-robin fashion, with the output "chasing" the input and a few characters behind.

Although the normal case is concurrent input and output with only a few characters in a buffer, the dynamic buffering technique readily supports chaining buffers together when more than the storage space of a single buffer is required. A chain of buffers is formed when each buffer holds the address of the next buffer in the chain. This chain structure would be used, for example, when a data burst is temporarily blocked from output because of contention, and the burst's characters are buffered in a chain of one or more buffers until output can begin.

Bursts ready for output are placed on a queue associated with the appropriate output communications link or port. The queues are maintained in memory 160. A queue entry includes two pieces of data: the address of the first buffer of the first burst on the queue, and the address of the first buffer of the last burst on the queue. The queue contains references to bursts awaiting assignment to an available output channel.

There are three queues associated with each output link: high, normal, and low priority. Control bursts are queued on the high priority queue, because it is desirable to expedite control bursts through the switch network and because they typically consist of only ten or twenty bytes, thus occupying channels briefly. Voice bursts are handled at normal priority, and data bursts at low priority. Voice is given preference over data because voice samples, if much delayed, become useless. Data bursts can be buffered and delayed and still remain within acceptable performance limits.

In output link channel processing, whenever an idle channel is encountered, the link queues are examined. If there is a burst on at least one of the queues, the highest priority burst is removed from its queue, assigned to the channel, and the first character (or byte) of the burst transmitted. Consider the case of a burst placed on an output link queue when it is the only burst queued on the link. The first idle channel occurring after the burst has been queued will assume its transmission, thus minimizing interchannel delay. Generally, the transmission channel will differ from the channel of reception.

The six processors of link switch 132 compete for access to memory 160. When a processor is placing a burst on a queue, for example, more than one memory access may be required without interruption before the memory can be made available for use by another processor. Otherwise, the queue reference to the burst may be incomplete. Since all communications passing through link switch 132 must pass through memory 160, the speed of link switch 132 depends on the speed of memory 160. For these reasons, memory 160 is under control of memory arbiter 172.

Figure 3B:
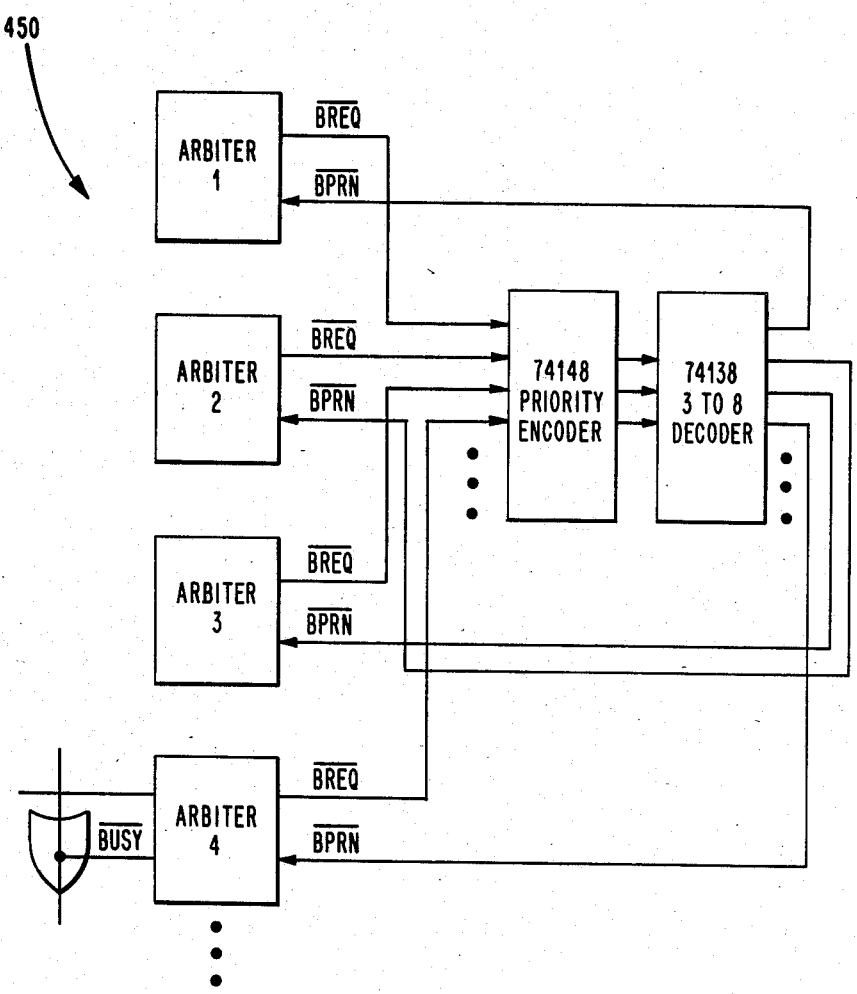
FIG. 3B illustrates a typical prior art parallel priority-resolving circuit which may be used in various embodiments of the invention.

Memory arbitration means are known in the art. FIG. 3B shows a prior art parallel priority-resolving circuit 450, taken from Y. Pakir, *Multi-Microprocessor Systems*, page 91, published by Academic Press, 1983, which would be suitable with appropriate modification for arbiter 172 of FIG. 3. When requests for memory access are pending from several processors, the highest priority request is serviced first by circuit 450. Priority may be determined by category and time of request such that requests within higher-ranked categories are serviced first and requests within the same category are serviced on a first-come first-serve basis. If only one request is pending, it is serviced immediately. See also *The Handbook of Computers and Computing,* edited by Arthur H. Seidman and Ivan Flores, pp. 227–232, and further references cited on p. 232, published by Van Nostrand Reinhold Company Inc., 1984.

Memory 160 includes a timing control, to generate read and write pulses, and random access memory. The buffer address and character index (which are sent via a character memory bus by a switching processor) are concatenated to form the address of a unique character.

A burst progresses through a link switch, from input link to output link, in the following steps:

1. Incoming communications:
    (a) The first byte of a burst is received from an unassigned link input channel; the byte is stored in a buffer in memory.
    (b) If the first byte contains sufficient information for routing, the buffer is placed on the appropriate link output queue.
    (c) The second byte is received and stored. If the burst has not been routed on the first byte and the second byte contains sufficient information for routing, the buffer is placed on the appropriate link output queue.
    (d) The third byte is received and stored. If the burst has not been routed as yet, it is destined for a port on the same link switch. The third byte identifies the local port.
    (e) The fourth byte is received and stored, and the header checksum calculated.
    (f) If the checksum is bad, receipt of the burst is aborted, and subsequent bytes before the end-of-burst FLAG are discarded.
    (g) If the checksum is good, received bytes are stored in the buffer until the end-of-burst FLAG has been received.

2. Channel Congestion:
    (a) Channel congestion occurs when there are more bursts on a link's output queues than there are idle channels on the output link. The system should be engineered so that channel congestion is an infrequent occurrence.
    (b) While a burst awaits assignment to an idle output channel, input continues to the buffer.
    (c) Voice: If two milliseconds' worth of voice samples have been accumulated and output has not begun, some or all of the accumulated characters are discarded. This is called clipping. The threshold value is variable.
    (d) Data: If the buffer accumulating data characters fills, another buffer is acquired and linked to the first buffer. Data is not discarded as a result of channel congestion, although its transmission may be delayed.

3. Outgoing Communications:
    (a) When an idle link output channel occurs, the output processor will remove the first burst from the highest priority nonempty queue, and output the first byte of the burst.
    (b) Thereafter in each successive channel time, the next (successive) byte of the burst is outputted in the same output channel. Input and output proceed concurrently.
    (c) When the ending FLAG is taken from the buffer, it is sent in the channel, the buffer returned to the free list, and the channel returned to idle. The channel is now available for transmission of another burst.

Figure 4:
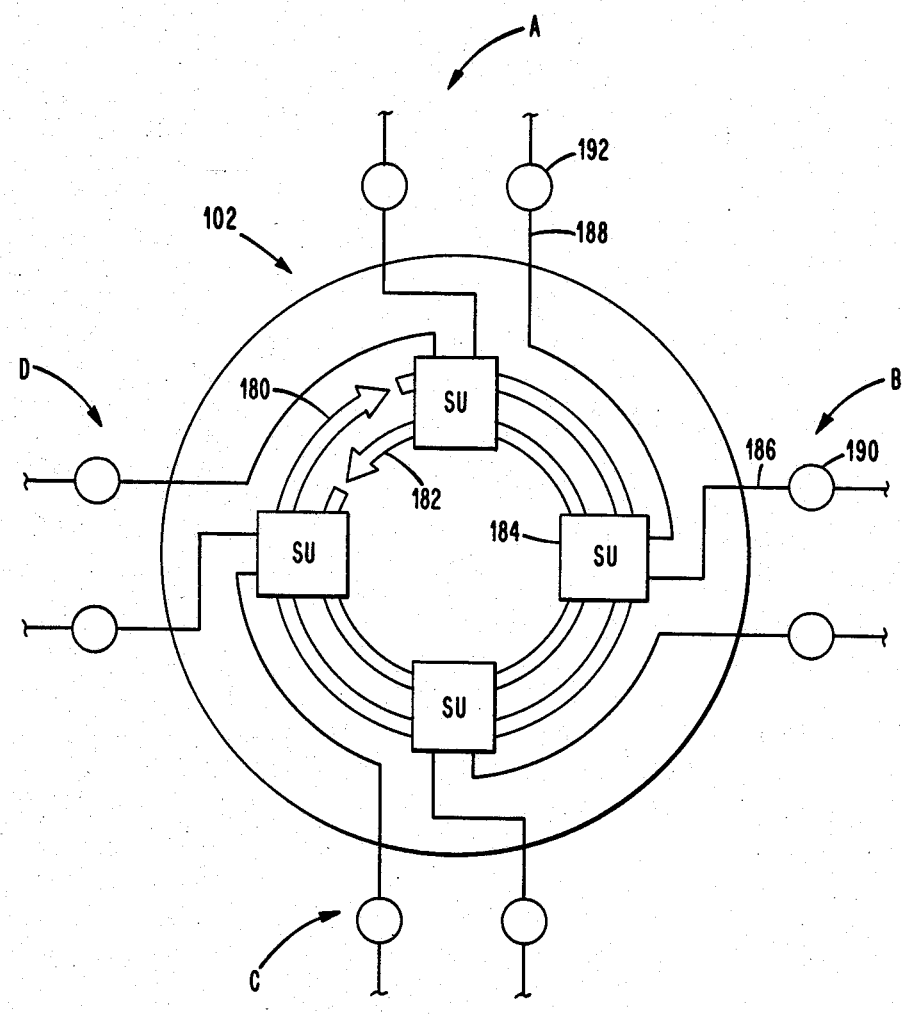
FIG. 4 is a block diagram of a hub switch showing, in particular, the coupling between the switching units of the hub switch with link groups.

The hub switch is a high-speed high-capacity burst switch used at points of high concentration in a burst switching network. The primary function of the hub switch is to transmit communications between link groups. FIG. 4 shows hub switch 102 of system 100 having means for coupling with link groups A, B, C, and D. Four switching units, each shown as SU in the drawing, are connected in a ring about two hubs, 180 and 182. Hub 180 carries a parallel transmission of at least one byte in one direction, and hub 182 has the same parallel capacity in the opposite direction.

In the embodiment of FIG. 4, each hub switching unit is coupled with two link groups. SU 184 is coupled with link switch 192 of link group A via communications link 188. SU 184 also is coupled with link switch 190 of link group B via communications link 186. The advantage of this configuration is that each link group of system 100 is coupled with two switching units. In the event a switching unit should fail, the link group will not be isolated because of the alternate communications route through the other switching unit.

Figure 5:
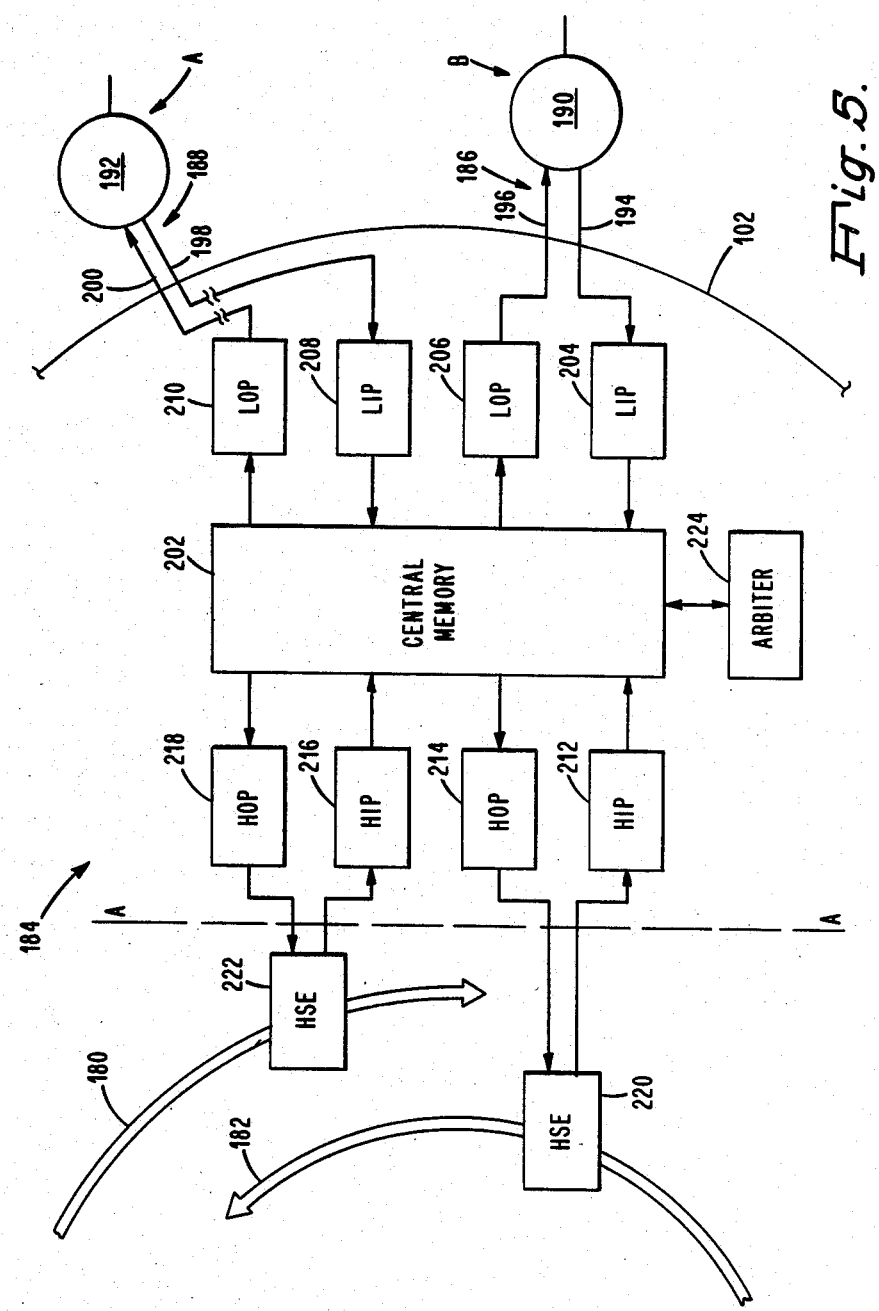
FIG. 5 is a block diagram of a hub switch in accordance with the invention.

FIG. 5 shows a block diagram of SU 184 of hub switch 102. As shown in FIG. 4, SU 184 is coupled with link switch 192 of link group A and link switch 190 of link group B. In FIG. 5, communications link 188 is shown as input line 198 (to hub switch 102) and output line 200, and communications link 186 is shown as input line 194 and output line 196.

The architecture of SU 184 is somewhat analogous to that of link switch 132. Central memory 202 is coupled in this embodiment with eight high-speed processors as follows: link input processor (LIP) 204, which handles communications incoming from link switch 190; link output processor (LOP) 206, which handles communications outgoing to link switch 190; LIP 208, which handles communications incoming from link switch 192; LOP 210, which handles communications outgoing to link switch 192; hub input processor (HIP) 212, which handles communications from hub switching element (HSE) 220 incoming to memory 202; hub output processor (HOP) 214, which handles communications outgoing from memory 202 to HSE 220; HIP 216, which handles communications from HSE 222 incoming to memory 202; and HOP 218, which handles communications outgoing from memory 202 to HSE 222. The primary function of the hub switching element is to place communications on and off the hub. As shown in FIG. 5, HSE 220 provides service to hub 182 which transmits in one direction, and HSE 222 provides service to hub 180 which transmits in the opposite direction. Memory 202 is coupled with memory arbiter 224 so that only one processor may obtain access at any particular time. In FIG. 5, the architecture of SU 184 to the right of dashed line AA resembles closely that of a link switch, i.e., a central memory coupled with various special-purpose high-speed processors. The HIP, HOP, and HSE are each the same processor as LIP and LOP with firmware or software modifications.

For example, 256 switching units may be coupled to form a hub ring in the arrangement shown in FIG. 4. In an alternate embodiment, an even larger number of switching units may be coupled in the hub ring. There may be two or more hub rings in a hub switch, e.g., hubs 180 and 182, for redundancy and to double the number of available transfer channels within the hub switch.

Referring to the embodiment of the hub switch shown in FIG. 5, hubs 180 and 182 are time-division multiplexed. There are 32 channels on the hub during each T1 frame time. Each hub channel is divided into 256 clock ticks. Each clock tick advances a word on the hub ring from one SU to the next SU. Within a hub channel (256 ticks), each SU can send a hub word to any other SU since there are 256 switching units on the hub ring. Thus, in each hub channel, 256 origin SU's can send 256 hub words to 256 destination SU's. A hub word is the full (parallel) complement of bits that can be transferred simultaneously on the hub.

Assuming the hub is one byte wide, the hub ring clock rate is (8000 frames/second)×(32 channels/frame)×(256 ticks/channel)=65,536,000 ticks/second. A four-byte-wide hub would require one-fourth this rate, or 16,384,000 ticks/second. Whatever the width of the hub, there is one additional control bit, called the "busy" bit.

Each hub signal line has but one load, that of the corresponding bit in the successor HSE. Higher rates can be sustained in this configuration than would be possible in a high fan-out bus structure.

As shown in FIG. 4, each SU typically has two T1 links leading to remote link switches. A hub switch with 256 SU's has the following transfer capacity: (256 SU's)×(2 T1 links/SU)×(24 T1 channels/link)×(8000 bytes/second/channel)=98,304,000 bytes/second. As was shown above, a hub ring having a width of one byte (so that a byte is advanced on the hub each clock tick), has capacity of 65,536,000 ticks/second or an equivalent number of bytes/second. Therefore, two hub rings are required to support the example of a hub switch having 256 switching units.

Hub switch 184 shown in FIG. 5 is a preferred embodiment, but alternate embodiments are possible and may be desirable to meet special requirements of a communications system.

As will be explained below, in order to send a burst from an origin HSE to a destination HSE requires that a hub channel be chosen in which the origin HSE is transmit idle and the destination HSE is receive idle. Thereafter, the remainder of the burst is sent in that channel. A burst's progress through a hub switch is similar to a burst's progress through a link switch.

1. At the origin HSE:
 (a) The burst begins to arrive from an input link.
 (b) The burst's characters are buffered in the central memory of the switching unit. The address of the destination HSE is determined from the header of the burst.
 (c) The burst is queued for transmission on one hub or the other.
 (d) An idle channel is chosen on the hub.
 (e) Successive bytes of the burst are transmitted on the hub in successive occurrences of the selected hub channel.

2. At each intermediary HSE:
 (a) The bytes of the burst are transferred along the hub through the HSE directly without passing through the central memory of the switching unit.

3. At the destination HSE:
 (a) The bytes of the burst are taken off the hub by the HSE and stored in the central memory of the switching unit as the bytes arrive.
 (b) The header bytes are interpreted to determine the appropriate output link.
 (e) The burst is queued on the appropriate output link.
 (f) Output commences in the first idle output link channel.

In preferred burst-switching network configurations, each link switch has at least two communications links leading toward any other link switch. Either link may be used if the route lengths are similar; the alternate link provides a route in the case of outage. An autonomous control processor coupled with a link switch will permit continuance of service among all link switches which can communicate.

The hub switch preferably comprises two load-sharing hub rings, either of which could be used to propagate a burst. In the case of hub ring failure, the other hub ring can be used for any burst. As was shown above, a single hub ring may not have sufficient capacity to handle peak traffic. Very large scale integration (VLSI) versions of the HSE's are expected to be small enough so that an entire hub ring will fit on a card. In this case, the hub switch may comprise two sets of two-hub rings; one ring of each set may be active at all times and the second ring of each set may be backup capacity.

Another alternative is to construct a burst-switch network with more than one hub switch, so complete failure of a hub switch (requiring two or more simultaneous failures in the hub switch) would inhibit communications in only part of the network. This alternative is attractive in applications requiring a high degree of survivability such as in military applications where communications outages can result because of hostile action as well as random circuit failure.

Dispersal of link switches makes repair more difficult than repair at a centralized switch. The burst-switching network should have substantial diagnostic capability so that failures may be identified and remedial action taken quickly.

A burst-switching network should have background tests and exercise routines which run automatically at other than peak-load times. For example, adjacent link switches may exchange test messages at regular intervals. A link switch which has not received an expected test message within a prescribed time will make a report via an alternate link switch to a service processor.

Since loops have no appearance at the central office, a link switch should also have the capability to execute loop and subscriber instrument tests, automatically or upon control from a manned maintenance position, and to return a report of the results.

In addition to the system structure shown in FIG. 1, there are any number of alternate embodiments of burst-switching systems. The following are examples of alternate system structures and embodiments. These examples are intended to be representative but not inclusive. A burst-switching system may comprise a single link switch providing service to a plurality of ports. A burst-switching system may comprise a plurality of link switches in a single link group. A burst-switching system may have a plurality of link groups coupled by a hub switch having a single hub, or the hub switch may have two or more hubs. A burst-switching system may comprise a plurality of link groups interconnected by a plurality of hub switches, each hub switch having one or more hubs. In these systems, each link switch provides service to one or more ports. A port may be coupled with a user end instrument via a line circuit, or it may be coupled with a trunk leading to another communications system via a trunk circuit, or a port may be coupled with a call processor or an administrative processor. As has been mentioned, burst switches are coupled by means of communications links in various configurations, examples being star, ring, tree configurations, and combinations thereof. Communications links may be full-duplex T-carrier spans.

In FIG. 1, suppose user X of link group A has made a connection with user Y of link group B. The connection might be called a "virtual" connection since it consists only of X's knowledge of Y's address, and conversely. No resources of system 100 are used except when a burst is in transit.

Assuming X and Y are coupled with voice or speech ports, the following summarizes the transit of a burst from X to Y through system 100.

1. When X's voice detector (located in the port circuit) senses voice, it causes a burst header to be issued to X's link switch. The header contains Y's address.

2. X's link switch determines from the header that the burst must be routed to the hub switch. X's link switch selects the first free channel in a communications link leading toward the hub switch and transmits the first byte of the burst in it.

3. Each link switch nearer the hub switch in turn executes the same procedure, interpreting the header address and transmitting the burst in the first free channel of a communications link leading toward the hub switch.

4. The hub switch determines from the burst header which link group contains port Y. The hub switch passes the burst through the hub to Y's link group.

5. Each link switch in Y's link group interprets the header address and forwards the burst in the first free channel of a communications link leading toward Y's link switch.

6. Upon receipt of the burst, Y's link switch discards the header, as it has served its purpose of directing the burst to Y. Y's link switch sends the information portion of the burst to Y.

7. After assigning the outbound channel, each link switch passes the burst through itself, byte by byte, receiving each byte in a channel of the inbound link and sending each byte in the channel it has assigned on the outbound link.

8. Each link switch, when it receives the termination byte of the burst, frees the outbound link channel previously assigned to the burst. This channel is now available for assignment to another burst.

Each link switch except the destination link switch makes its routing choice on the basis of the first header byte alone. The hub switch finds Y's link group number in the second byte. Y's link switch finds Y's port number in the third byte. Each link switch will delay the burst only a couple of character times as it passes the burst characters along. If the burst could be viewed as it passes from X to Y, one would see the burst strung over all the intermediary link switches, with each link switch holding a few characters of the burst.

Each link switch makes it own outbound link channel assignment. In general, the burst will arrive at a link switch in one inbound link channel and leave on a different outbound link channel. If a burst passes through N (any integral number) communications links between its origin and its destination, there will be N independent channel assignments.

If X and Y had been in the same link group, the burst would not have passed through the hub switch. If X and Y had been on the same link switch, the burst would not have passed through a communication link.

LINK SWITCH

Link switch 132 is shown in FIG. 1 with respect to its neighboring link switches, link switch 130 on the left and link switch 134 on the right. Every byte of a burst passing through link switch 132 passes through central memory 160, as shown in FIG. 3. The central memory is divided into buffers which can be dynamically assigned to a time-division multiplexed channel of a communications link or port. The central memory is the common and only communication path among the several switching processors. Simultaneous requests for memory access are arbitrated by memory arbiter 172.

The switching processors administer the movement of characters between central memory and link channels or port circuits. In the embodiment of FIG. 3, link switch 132 has six switching processors, each of which is basically the same processor. In different applications within the link switch, each processor executes a slightly different program. A control program for each processor is stored in read-only memory (ROM) within the respective processor. Each processor has local random-access memory (RAM), in which status and buffer address information is maintained for each link channel and port served by the processor.

The switching processors are special purpose processors adapted for high speed. LIP 161, for example, upon receipt of a character in a channel of link 140, performs all necessary steps for inputting that character within the channel time including the internal administrative steps required for buffer maintenance, channel assignments, etc. LIP 160 must be capable of repeating the same steps for a character of another burst arriving in the next channel. Similarly, LOP 162 must be capable of processing and outputting characters at the T1 rate. A T1 channel is 5.21 microseconds in duration.

In FIG. 3, PIP 168 and POP 170 use input port bus 174 and output port bus 176, respectively, to scan the port circuits in cyclic fashion, so that there is a time interval or "channel" associated with each port on each bus. Thus, the port processors' actions in processing port channels are similar to the input and output processors' actions in processing link channels. In the embodiment of FIG. 3, twenty-four port circuits are serially coupled on port buses 174 and 176. Each port circuit 178 performs those functions relating to an individual port, including: burst creation; silence/speech detection for voice ports; analog-to-digital and digital-to-analog conversion for voice ports; and the required BORSCHT functions, which are the standard functions associated with a line card in a traditional digital switching system.

Figure 6:
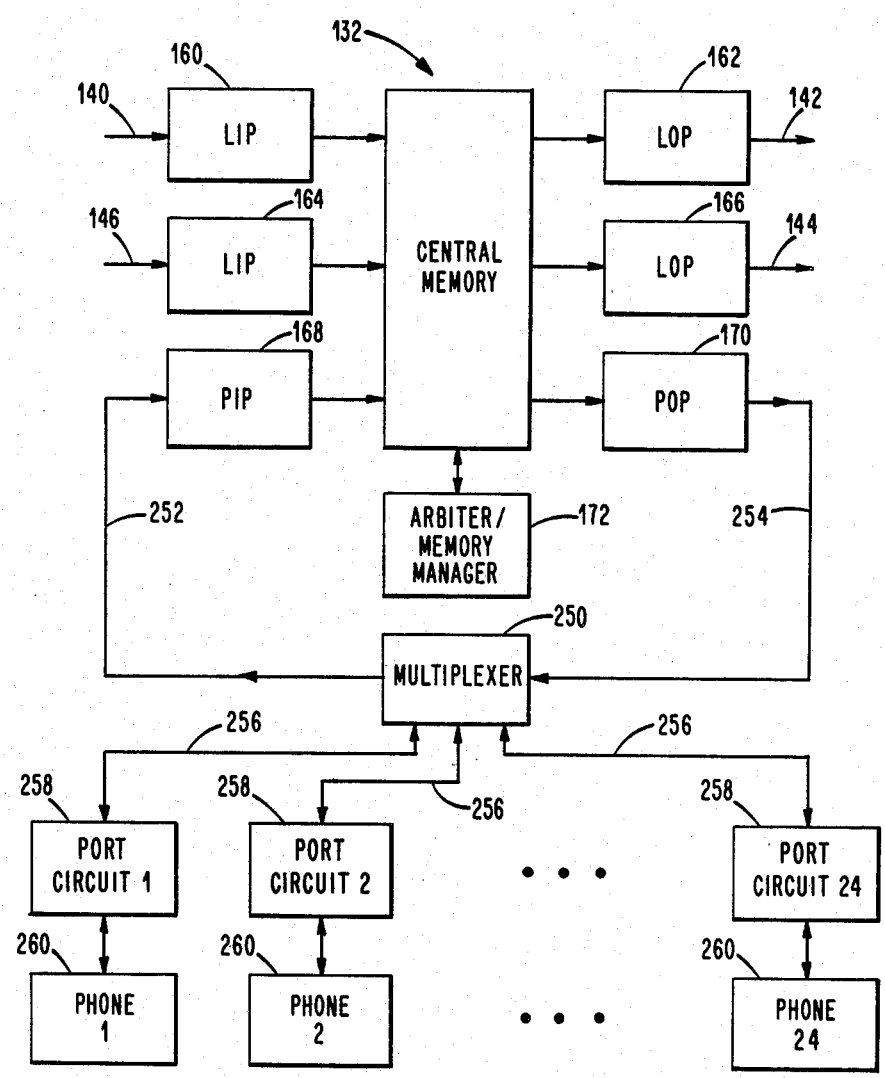
FIG. 6 is a block diagram of an alternate embodiment of a link switch showing a digital multiplexer coupled between the input and output port processors and twenty-four end-user instruments.

FIG. 6 shows an alternate embodiment of link switch 132 which replaces the port buses, shown in FIG. 3, between PIP 168, POP 170, and port circuits 178 with digital multiplexer circuit 250. Multiplexer circuit 250 multiplexes between the twenty-four parallel digital lines 256 and T1 path 252 to PIP 168, and between T1 path 254 from POP 170 and the twenty-four parallel digital lines 256.

This embodiment of a link switch has a number of advantages over the embodiment of FIG. 3. The PIP and POP external interfaces are now the same T1 interfaces as those of the LIP and LOP, respectively. Port circuits 258 may now be located at the end-user instruments, e.g., telephones, providing digital-line interconnects to the link switch with the benefits of noise immunity and remote testability which digital transmission provides.

Figure 7:
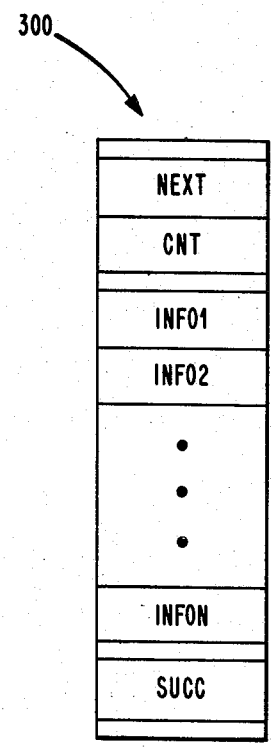
FIG. 7 shows the format of a dynamic buffer containing a portion of a burst in the central memory of a link switch.

As has been mentioned, central memory 160 is partitioned into dynamic buffers. FIG. 7 shows an acceptable format for these buffers. Buffer 300 is associated with a burst in transit. For example, the burst may be incoming to the link switch in link channel 1 and outgoing in link channel 5. In the local memory of the input processor, buffer 300 will be associated with channel 1; and in the local memory of the output processor, buffer memory 300 will be associated with channel 5. Therefore, buffer 300 is associated with an input channel (or port) and an output channel (or port).

Buffer 300 contains a fixed number of words, e.g., five words, each word being one byte. It also has three parameters associated with it. The first parameter, NEXT, contains the address of the first buffer of the next burst on queue. If there is no next burst on queue, NEXT is set to a predetermined character, such as zero. The second parameter, CNT, is the number of written and unread characters in buffer 300. The third parameter, SUCC, is the address of the successor buffer of this burst. If there is no successor buffer, SUCC is set to a predetermined character, such as zero. The informational portion of buffer 300, INFO1, INF02, . . . , INFON, (N=5 in this example), contains bytes of the burst in transit. Buffer 300 is shown as containing five informational bytes for ease of illustration. In a preferred embodiment, buffer 300 contains 32 informational bytes.

Normally, only one buffer is required for a burst, and the characters flow through the buffer from input to output. If a data burst is delayed because there are temporarily insufficient link channels, more than one buffer may be required to hold the burst's characters until an output channel can be assigned. In this case, buffers are chained together, with the SUCC field of each buffer holding the address of its successor buffer of the burst.

Figure 8:
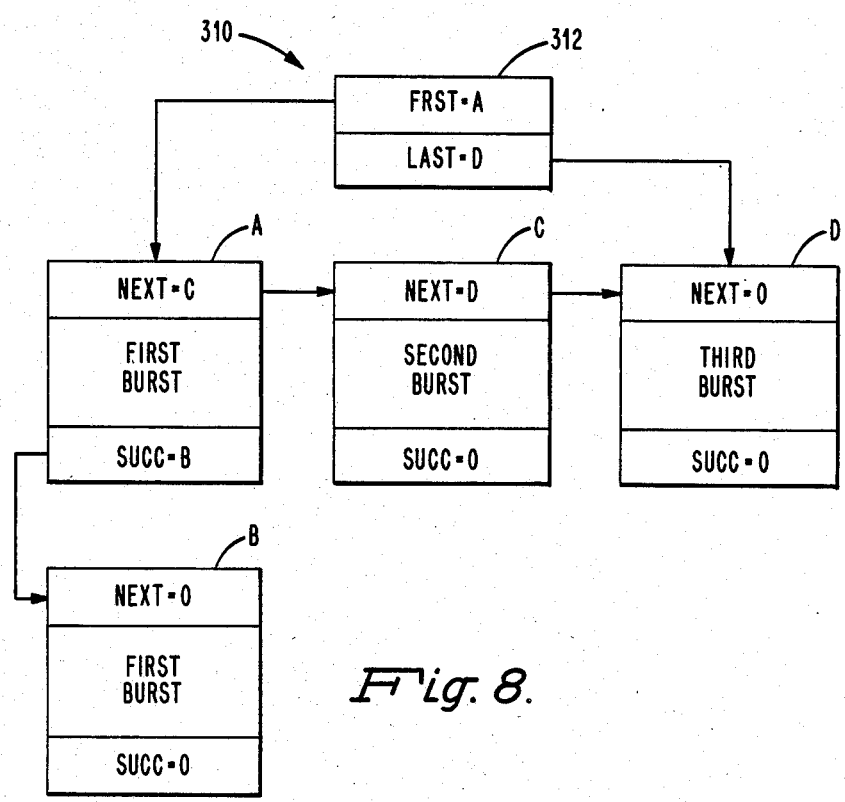
FIG. 8 diagrammatically illustrates the linkages between buffers for three bursts on a queue within a link switch.

A queue is associated with an output communications link or port, and also associated with a burst-priority type. As shown in FIG. 8, each queue includes a queue header and the burst buffers on the queue. The queue header comprises two data elements: the address of the first buffer of the first burst on the queue, FRST, and the address of the first buffer of the last burst on the queue, LAST.

FIG. 8 shows queue 310 having three bursts on it: a first burst of two buffers with addresses A and B; a second burst of one buffer with address C; and a third burst of one buffer with address D. Queue header 312 comprises FRST, which contains the address of buffer A, and LAST, which contains the address of buffer D. The arrows in the drawing show the linkages between the various buffers and queue header.

The informational portions of the buffers are cyclic or ring buffers wherein the last information location in the buffer is treated as the predecessor of the first informational location. A buffer is used as the exchange medium between an input processor and an output processor. The input processor stores a byte of a burst into the buffer using the buffer address (the memory address of its first location) and an input offset from the first location, called PUTINDX. Concurrently, the output processor reads a character of the burst from the buffer using the buffer address and an output offset from the first location, called GETINDX. The offset designates or "points" to the location in the buffer into which the next character of the burst to be received will be stored or from which the next character of the burst will be transmitted.

Both processors use CNT, the count of written but unread characters in the buffer. CNT is used by the input processor to assure that it does not store a character in a full buffer, and it is used by the output processor to assure that it does not read a character from an empty buffer, "empty" meaning that all characters in the buffer have already been outputted.

Figures 9A, 9B:
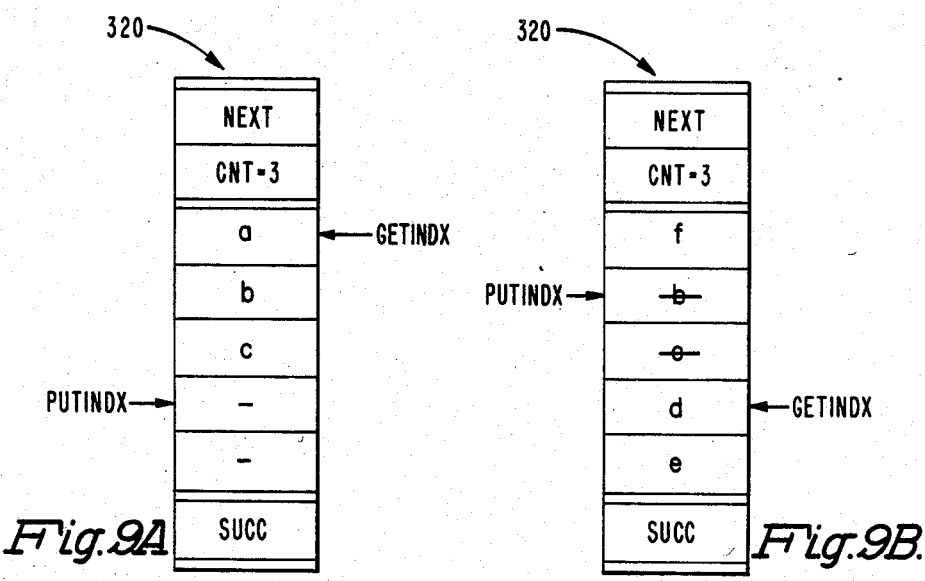
FIGS. 9A and 9B each show a buffer within character memory of a link switch at two different times in the processing of a burst through the link switch in order to illustrate the input and output indices of the buffer.

FIGS. 9A and 9B show buffer 320 which, for purposes of illustration, has five INFO locations. In FIG. 9A, the input processor has stored the first three characters of a burst, "a," "b," and "c." The output processor has not yet begun to output the burst. In FIG. 9B, the output processor has outputted the first three characters of the burst, and the input processor has stored three additional characters, "d," "e," and "f." The respective positions of PUTINDX and GETINDX are shown in each drawing. The horizontal lines through "b" and "c" in FIG. 9B indicate that these characters have already been outputted although not erased.

Figure 10:
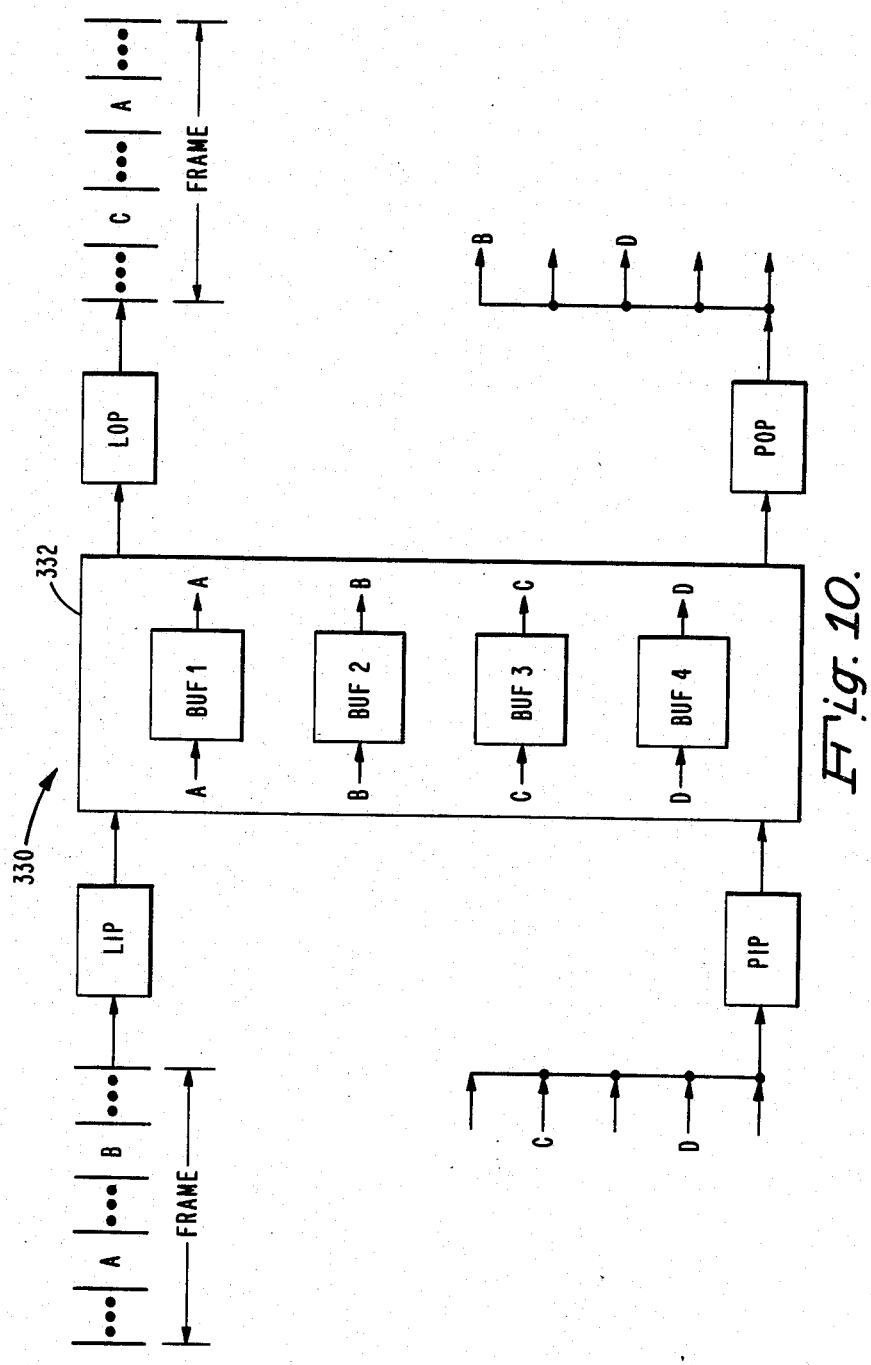
FIG. 10 illustrates the flow of four bursts through the input and output processors and character memory of a link switch.

FIG. 10 illustrates the flow of four bursts, labelled A, B, C, and D in the drawing, through link switch 330. Characters of bursts A and B are arriving in two preassigned channels of an inbound link, while characters of bursts C and D are arriving from two local ports. Each of the buffers, Buf1 through Buf4, has been assigned to one of the bursts, respectively.

Characters of burst A progress through link switch 330 as follows. When the channel in which burst A is arriving occurs, the LIP receives the next character of the burst from the channel and deposits it in Buf1. The address of Buf1 is available to the LIP in its local memory associated with burst A's input channel number.

When the channel in which burst A is being transmitted occurs, the LOP takes the next character from Buf1 and sends it in the assigned outbound link channel. The address of Buf1 is available to the LOP in its local memory associated with burst A's output channel number.

The characters of bursts B, C, and D are processed in similar fashion. These four bursts represent the four combinations within a link switch between links and ports. Burst A passes through link switch 330 from input link to output link; burst B, from input link to output port; burst C, from input port to output link; and burst D from input port to output port.

The continuous flow aspect of a burst through a link switch should be noted. The storing of individual characters in buffers has been described. Over a period of time, a stream of bytes, i.e., a burst, flows through a buffer with straightforward logic and high efficiency. The buffers are dynamically assigned to bursts in transit through the link switch. This is true even in the case where both the origin and destination ports are local to the same link switch, e.g., burst D.

Figure 11A:
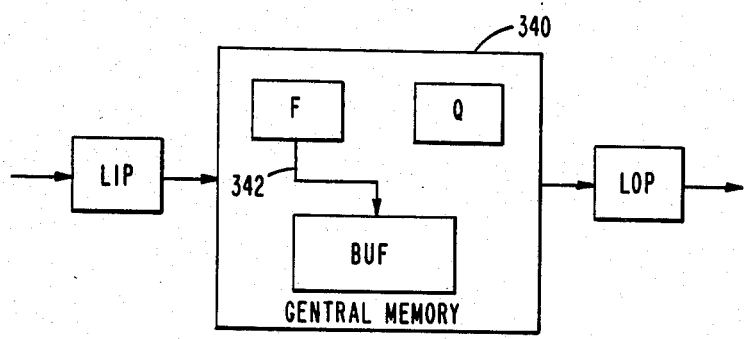
FIGS. 11A through 11E show the linkages between the input and output processors and the queues and buffers in the central memory of a link switch for the various stages in the processing of a burst through a link switch from the time of arrival of the first byte to the time of transmission of the last byte.

In the following, a burst will be traced through a link switch from the time of arrival of the first byte or character until the last character has been sent. FIG. 11A shows the conditions in central memory 340 before the first character of the burst arrives. The buffer, labelled "BUF" in the drawing, which will be assigned to the burst is on the free list, F. The free list is a queue containing the addresses of those buffers available for assignment. Arrow 342 indicates that F points to BUF as being available for assignment.

Figure 11B:
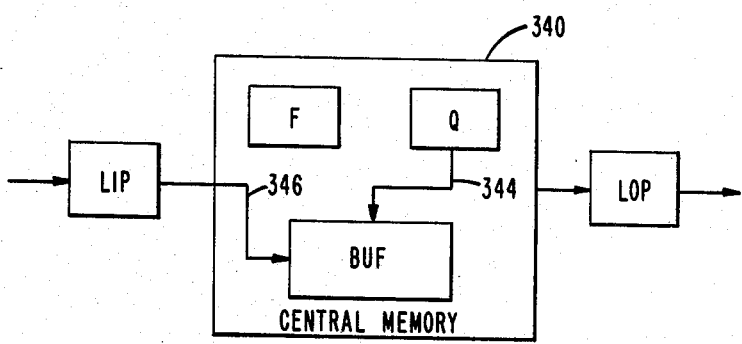

FIG. 11B shows the conditions in central memory 340 after the first character has arrived. The LIP has removed BUF from F and stored BUF's address in the portion of its local memory associated with the input link channel. Arrow 346 indicates the association in the LIP's memory between the input link channel and BUF. The LIP has stored the character into BUF; determined from the burst's destination address in the first header character that the burst is to be forwarded via the output link; and placed the burst on an outbound link queue, Q. Q contains references to bursts awaiting assignment to a channel for output on a particular communications link. Arrow 344 indicates that Q points to BUF as ready for assignment to an open channel in the output link associated with Q.

Figure 11C:
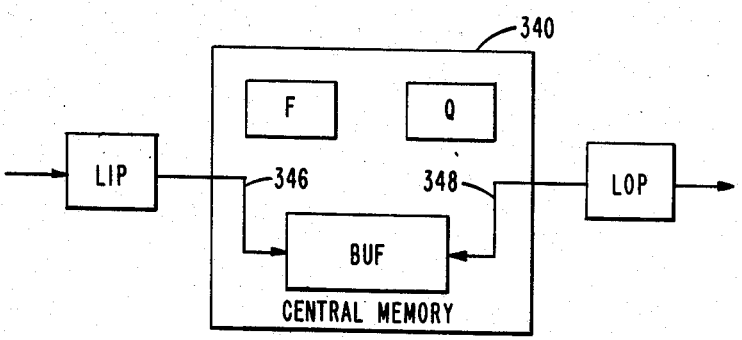

FIG. 11C shows the conditions in central memory 340 after the output link channel has been assigned. The LOP has found a free output channel and examined Q to see if any bursts are ready for assignment to an available output channel. Further, the LOP has found the burst's buffer address in Q; removed the burst from Q; stored the buffer address in the portion of its local memory associated with the output channel; and read the burst's first character from BUF and transmitted it in the output channel. Arrow 348 indicates the association in the LOP's memory between BUF and the output channel. These LOP actions have been performed independently of the LIP, except that the two processors have communicated via central memory 340 and they may have contended for access to the central memory.

The conditions shown in FIG. 11C will prevail for most of the remainder of the burst. As the burst's input channel occurs, the LIP takes the next character of the burst and stores it into BUF. As the burst's output channel occurs, the LOP reads the next character from the buffer and outputs it. The LIP and LOP each know the buffer identity, because each processor has stored the buffer address in its local memory.

In the normal case, the LIP is one character ahead of the LOP so that BUF contains one character at any time. In the event there is a delay in the output channel assignment, the LIP will be more than one character ahead of the LOP, and there will be more than one character in the buffer during the burst except for the transmission of the last character.

Figure 11D:
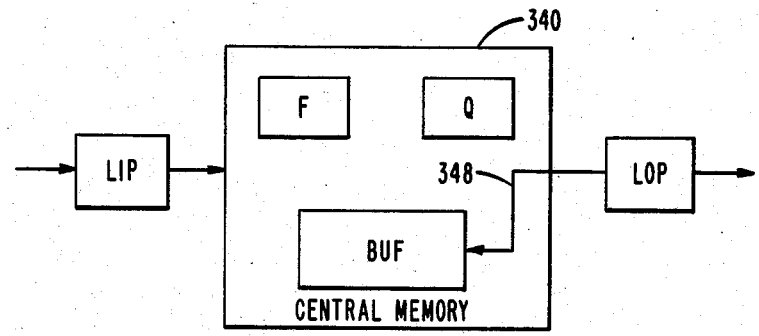

FIG. 11D shows the conditions in central memory 340 after the LIP has detected the termination character at the end of the burst. The LIP has stored the termination character into BUF and dissociated BUF from the input channel in its local memory. The LIP is ready to begin receiving another burst in the same input channel which, if present, would be stored into a new buffer in central memory since the LOP may still be using the old buffer for outputting the first burst. The LOP continues to output the remaining character or characters in BUF independently of the LIP.

Figure 11E:
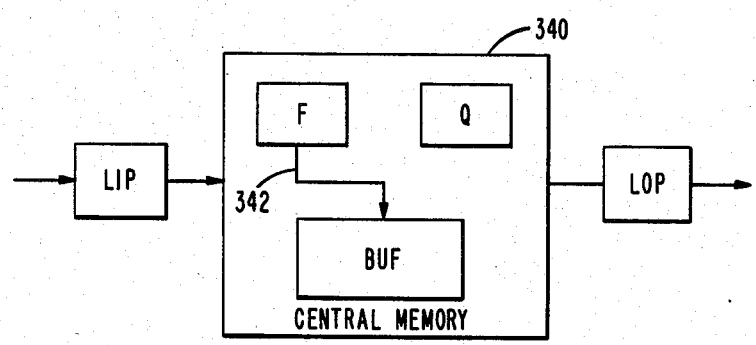

FIG. 11E shows the conditions in central memory 340 after the LOP has found the termination character in BUF. The LOP has read the termination sequence from BUF and transmitted it; and returned BUF to the free list.

Figure 12A:
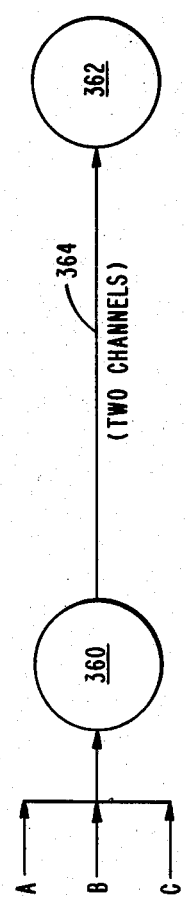
FIGS. 12A and 12B illustrate the assignments of bursts to output channels within a link switch in the presence of contention for output channels.

To expand on the assignment of output channels to bursts in a situation where there is contention for output channels, the following example is provided. FIG. 12A shows link switch 360 coupled with link switch 362 via communications link 364 in which there are only two channels (so that the example will be short). Three users, A, B, and C, desire to send four bursts over link 364; two bursts originate from user A, and one burst each originates from users B and C. It is assumed that the bursts are in the same priority class.

Figure 12B:
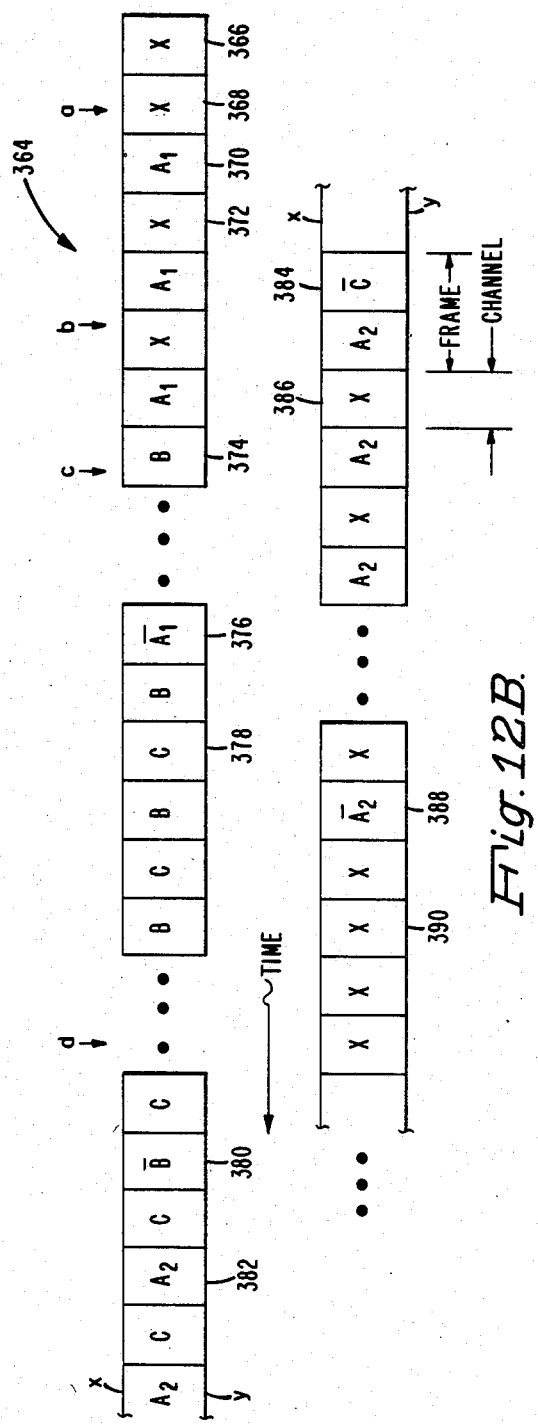

FIG. 12B is a pictorial of link 364 from link switch 360 to link switch 362 in which the assignments of bursts to the two channels as a function of time are described. As indicated in the drawing, time increases toward the left so that the rightmost slot is earliest in time. Initially, both channels are idle, as indicated by "X" in both channel slots 366 and 368. At time a, link switch 360 receives the first byte of the first burst, $A_1$, from user A. Link switch 360 transmits the first character of $A_1$, in slot 370, which is the first idle output channel occurring after time a. Slot 370 represents Channel 1. Channel 2 continues to be idle, as shown in slot 372.

At time b, link switch 360 receives the first byte of a burst from user B. The first available output slot is Channel 2 in slot 374, and the first character of burst B is transmitted therein.

At time c, the first byte of a burst from user C has been received by link switch 360. Since both channels are assigned, burst C will be accumulated in a buffer or buffers of the central memory (the length of time depending on whether burst C is a voice or data burst) and placed on a waiting queue until a channel is available. The bar over $A_1$ in slot 376 indicates the terminator character for burst $A_1$. Therefore, Channel 1 will be free during the succeeding frame. The first character of burst C is transmitted in slot 378.

At time d, the first byte of a second burst, $A_2$, has been received by link switch 360. Since both channels are occupied, $A_2$ is accumulated and placed on a waiting queue. Burst B terminates in slot 380, and the first character of burst $A_2$ is transmitted in slot 382.

In slot 384, burst C terminates. Since there are no unassigned bursts awaiting transmission, Channel 1 becomes idle in slot 386. Likewise, Channel 2 becomes idle in slot 390 after the termination of burst $A_2$ in slot 388.

This example illustrates queuing of bursts during contention for output channels and that channel assignment is only for the duration of a burst. The example further illustrates that user A's first burst was assigned to Channel 1 and A's second burst was assigned to Channel 2.

Each link switch through which a burst passes forwards the burst toward its destination port on the basis of the destination port's equipment address contained in the burst's header. Referring to FIG. 1, assume a burst originates at port X of link group A and its destination is port Y of link group B. A port address has three components: link group; link switch within link group; and port number within link switch.

Each link switch has three priority queues associated with each of its communications links, one queue for each type of burst. There are three types of bursts: control, voice, and data. Control bursts have high priority. It is desirable that they propagate quickly through the system in order to maintain system responsiveness. Since control bursts are short, they will not occupy channels for long periods. Data bursts have low priority. Data bursts can accommodate delays better than voice bursts; consequently, this type of burst can be buffered effectively. Voice bursts have middle priority. Voice bursts have preference over data bursts because voice samples, if delayed substantially, have diminishing value.

Figures 13, 14:
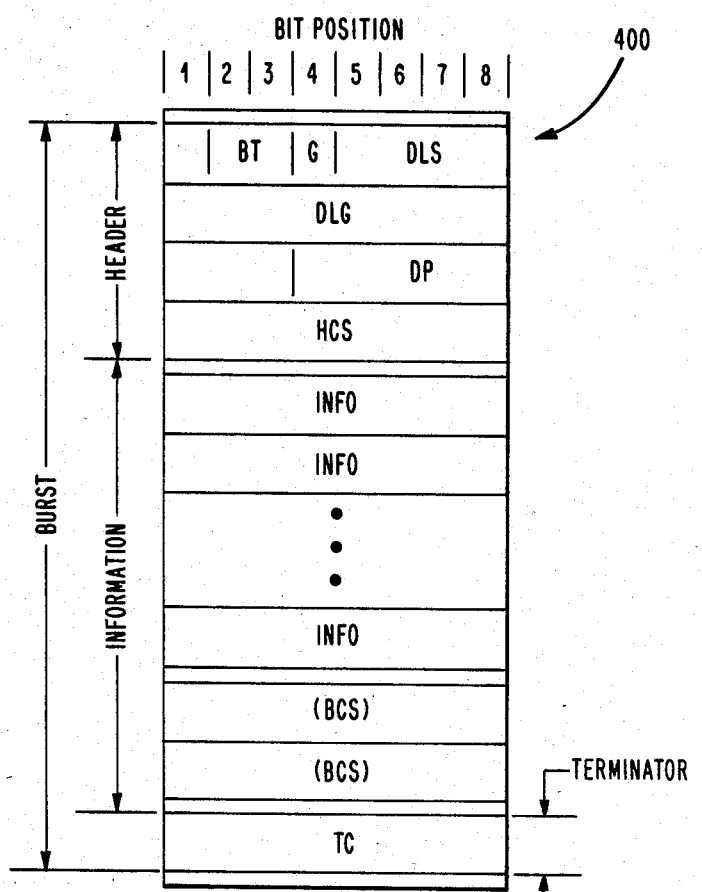
FIG. 13 is a pictorial showing a preferred format of a burst including particular fields within the four header bytes.
FIG. 14 is a table summarizing the data-link escape procedure in accordance with the invention.

FIG. 13 shows format 400, a preferred format of a burst. A burst comprises a sequence of eight-bit bytes or characters, having a four-byte header preceding a variable-length information portion followed by a termination character at the end of the burst. The first header word contains three fields: burst type, group, and destination link switch, labelled in the drawing as BT, G, and DLS, respectively. The burst type may be 0, 1, or 2, indicating that the burst is a control, voice, or data burst, respectively. The group bit may be 0 or 1. When G=1, the burst header is currently in a different link group than the link group of the destination port. Thus, the burst will be routed through the hub switch. When G=0, the burst header is currently located in the link group of the destination port. Note that the G bit is reset as the burst header passes through the hub switch into the destination link group. DLS ranges from 0 to 15 and indicates the number of the destination link switch within the destination link group.

The second header byte contains DLG, the destination link group number, which ranges from 0 to 255. The third byte of the header contains DP, the destination port number, which ranges from 0 to 31. The destination port number is within the destination link switch, which in turn is within the destination link group. The fourth header byte, HCS, contains the header check sequence. HCS ranges from 0 to 255 and provides means for corroborating error-free receipt of the first three words of the burst header.

Following the burst header is the information portion of the burst. The information portion has a variable number of bytes, meaning that the number of information bytes generally will be different in every burst. In control and data bursts, the last two bytes of the information portion may contain a burst check sequence, indicated as "(BCS)" in the drawing. The burst check sequence provides means by which the presence of errors in the received information portion of a burst may be detected. When an error is detected, the recipient may attempt to correct the error with error correction techniques or the recipient may request retransmission of the burst.

The termination character, TC, defines the end of a burst. As will be explained below, use of a data-link escape character in combination with the termination character will provide the system with means for distinguishing the termination character as a data character occurring in the middle of a burst and the termination character as a terminator occurring at the end of a burst. Termination characters are transmitted in idle channels to indicate the availability of these channels for assignments to bursts.

There are numerous alternate definitions of burst formats which may be appropriate for various system configurations. Format 400 has been described as an example. Assuming format 400 is employed in a burst-switching system, a link switch routes a particular burst in the following steps.

1. Upon receipt of the first header byte of a burst, the link switch examines the G bit. If the G bit is set, the link switch is not a member of the destination link group and the burst must be routed to the hub switch. The link switch places the burst on the appropriate priority queue of the communication link leading toward the hub switch. If the G bit is reset, the burst is in the destination link group and the DLS field of the first header byte must be examined to determine whether or not the link switch is itself the destination link switch. If the link switch is not the destination link switch, the burst is placed on the appropriate priority queue of the link leading toward the destination link switch. If the link switch is itself the destination link switch, the link switch holds the first header byte awaiting the remainder of the header and, in particular, the third header byte in which the destination port is specified.

2. Upon receipt of the second header byte of a burst by a link switch not in the destination link group (G bit set), the link switch passes the second header byte through on the assigned communications link toward the hub switch. Upon receipt of the second header byte by a link switch within the destination link group (G bit reset), the link switch determines whether or not it is the destination link switch. If the link switch is not the destination link switch, the link switch passes the second header byte through on the assigned link to the destination link switch. If the link switch is itself the destination link switch, the second header byte is held awaiting the third and fourth header bytes. The second header byte is used by the hub switch to route bursts between link groups. In the process of routing a burst into a destination link group, the hub switch resets the G bit in the first header byte so that link switches within the destination link group may determine the burst's status from the first header word of the burst. If there are more than one hub switch, the hub switch which passes the burst into the destination link group, i.e., the last hub switch through which the burst passes, resets the G bit.

3. Upon receipt of the third header byte of a burst, the action of the link switch again depends on whether or not the link switch is the destination link switch. If the link switch is not the destination link switch, the link switch passes through the third header byte on the assigned link toward the destination link switch. If the link switch is itself the destination link switch, the link switch determines the destination port from the DP field of the third header word.

4. Upon receipt of the fourth header byte of a burst, the link switch checks the header check sequence in the HCS field. If HCS is bad, indicating there is at least one error in the burst header, the link switch aborts transmission of the burst by sending the termination sequence in lieu the remainder of the burst. If HCS is good, the action of the link switch depends on whether or not the link switch is the destination link switch. If the link switch is not the destination link switch, the link switch passes through the fourth header byte on the assigned link to the destination link switch. If the link switch is itself the destination link switch, the link switch discards the entire burst header and places the burst on a queue to the destination port.

The last character of a burst is always a termination character. Whenever an output channel is idle, termination characters are transmitted in the channel. When a channel becomes idle after the transmission of a burst, there will be one or more termination characters following the burst in the channel. This adds a degree of safety in the event a termination character is sent at the conclusion of a burst, but the termination character is not received as such because of error.

The termination character has a unique character code. It must be possible to send any character stream through a link or hub switch, including streams in which the termination character code itself occurs. A method is required by which the termination character can be recognized as an end-of-burst when so intended or as a data character in a stream when so intended.

The method employed for distinguishing the termination character from a data character is derived from the escaping technique of Binary Synchronous Communications. It is similar to the bit-stuffing technique of HDLC (High-level Data Link Control) except that in this case, the method is a byte-stuffing technique. The byte that is stuffed or inserted is a second special character called data-link escape character. In the following, the termination character is designated by TRM; and the data-link escape character, by DLE.

At the source, whenever a TRM or DLE bit configuration arises in data to be sent, a DLE is inserted before the data character for transmission. Thus, the source transformations are:

TRM is replaced by DLE TRM;
DLE is replaced by DLE DLE;
X is replaced by X, if X does not equal TRM or DLE.

At the destination whenever DLE is received, it is discarded. The character received immediately following the discarded DLE is accepted without examination for control significance. Thus, the destination transformation is:

DLE Y is replaced by Y, Y is any character.

If a TRM is received without a prefixing DLE, the TRM interpreted as an end-of-burst character. FIG. 14 contains Table 410 summarizing the data link escape procedure.

Each inserted DLE delays the actual characters of the burst. Accordingly, the codes for TRM and DLE must be chosen such that they occur infrequently in the voice samples and data to be sent. Since voice is expected to dominate data in volume within the foreseeable future, meritorious choices for values of these characters are the codec (voice A/D and D/A) outputs representing the maximum positive and maximum negative amplitudes of the analog voice signal. As previously discussed, the minimum amplitudes may be alternate choices in appropriate circumstances.

As has been stated, every burst is terminated with one or more TRM characters. Suppose a burst is terminated by a single TRM character. Then, any character in a burst altered by noise into TRM, or any DLE TRM altered by noise into X TRM, would cause the switch to treat the burst as two distinct bursts. The latter part of the original burst, now erroneously treated as a second burst, would likely fail the header check sequence test, so that the "second" burst would not be delivered to its intended destination. Conversely, suppose a single TRM between two actual bursts should be altered by noise into a non-TRM character. The second burst, now erroneously treated as part of the first burst, will be erroneously delivered to the destination port of the first burst.

The probability of these errors can be reduced to any desired small value by requiring that a burst be terminated by a redundant sequence of TRM characters rather than by a single TRM. For example, the termination character sequence could comprise five TRM characters, with end-of-burst declared upon the reception of three TRM characters within any five-character sequence. In order for an end-of-burst error to occur in this case, three non-TRM characters would have to be changed to TRM characters, or three TRM characters would have to be changed to non-TRM characters. The probability of error has been reduced substantially over the case of a single-TRM character procedure.

There are any number of burst termination schemes that could be employed in a burst-switching system. The choice for any particular system will depend on system characteristics and design goals. The examples discussed herein are intended to illustrate the wide range of options available.

The link and hub switches described herein have autonomous "in-line" switching capability which by itself distinguishes them from their existing art counterparts. Each switch may be connected between communications links having T1 (or higher) capacity. With each incoming channel, each switch has the capability to make and implement an appropriate routing decision for the information contained within the channel. The routing decision is made autonomously by the switch without reliance on any outside source, e.g., a central control switch. Moreover, all of the processing relating to the routing decision is performed within the time allotted to the incoming channel. When the channel time has elapsed, the switch is ready to repeat the procedure for information contained in the succeeding channel, and so on. Thus, the switch processing is in large part synchronized with the channel and frame timing of the communications links. In some embodiments, the actual channel slot timing is employed as a "restart" signal or interrput for commencement of the switching algorithm. As has been explained, the switching algorithm must be capable of (among other functions) originating, continuing, and terminating burst transmissions which are in transit through the switch.

Burst switching fully integrates voice and data bursts. Generally speaking, only one character's worth of buffering is required in burst switching, because the voice transmission rates are matched with the T1 rate. Burst switches move every burst through a dynamic buffer; in the event of temporary channel contention, information (especially data) will not be lost.

The delay through a burst switch is an important performance parameter for voice transmission. Too much delay will make echo intolerable. In burst switching, the characters of a burst generally pass through a switch with a delay of less than four channel times. No speed buffering is required and, consequently, neither echo suppressors nor echo cancelers are required.

Different bursts on the same call may have different channel-exchange delays through the switching nodes. However, all characters within a speech burst experience the same delay. The magnitude of the variable delay component between talkspurts is less than the average silence period between talkspurts. Therefore, the variable delay between talkspurts is virtually unnoticeable.

A burst may be of any length, and a single header suffices for every burst. A typical talkspurt averages about 250 milliseconds, or 2000 pulse-code modulation characters. Assuming a burst header of four bytes and a one-byte terminator, the overhead for each burst is five bytes. The burst header overhead for the average talkspurt expressed as a percentage is 5/2000 or less than one percent. If a five-byte terminator sequence is employed instead of a one-byte terminator, the burst header overhead is still less than one percent.

A burst switch easily handles data transmissions at rates less than 64 kilobits per second (kb/s). When data is received from a user at less than 64 kb/s, a conveniently sized block of such data is accumulated in the port processor. This block is then transmitted through the system as a burst at the 64 kb/s rate. The same method would apply where the burst-switching channel rate is other than 64 kb/s.

It is expected that the switching services of the future will require a wide variety of bit rates, from low-speed data terminals of, say, 1200 bits/second, through digitally encoded voice of 16 to 64 kilobits/second, to high-speed data devices and digitally encoded video. The term "bandwidth efficiency" is often used to denote the ease with which a switch handles a variety of transmission rates. Because a burst has message structure as well as channelized operation, transmission rates higher than the channel rate can be handled with relative ease by employing a number of channels together for the transmission of a single burst. In a burst-switching system having a 64 kb/s channel rate, an N×64 kb/s burst would be treated as N separate (but related) bursts each at the 64 kb/s rate, where N is an integer greater than one. The N related bursts may be transmitted to the burst's destination in separate channels and then reassembled into the original N×64 kb/s burst. The message structure of burst switching permits reassembly of related bursts in proper order even though the N related bursts may not arrive at the destination in phase synchronization.

Future switching services are expected to require greater digital data handling capacity. Burst-switching systems may operate in a link-switch level error checking and retransmission mode for data bursts. Each data burst is fully buffered at each switch. The error-check test for a burst must be passed before the burst is retransmitted to the next switch along the route. Another error-checking mode is end-to-end error checking. In this mode, error checking of a data burst is performed only by the destination link switch. If the error check fails, the destination link switch requests retransmission of the data burst by the origin link switch.

The notion of end-to-end error checking is extended to the ultimate when the error checking is performed in the port processors and the port processors are located on user premises or within end-user instruments. The end-to-end digital-transmission capability possible with this architecture yields other advantages, such as improved diagnostic capability and enhanced security and privacy of voice and data communications. In the latter case, encryption and decryption of digital communications can also be performed in the port processors.

HUB SWITCH

Figure 15:
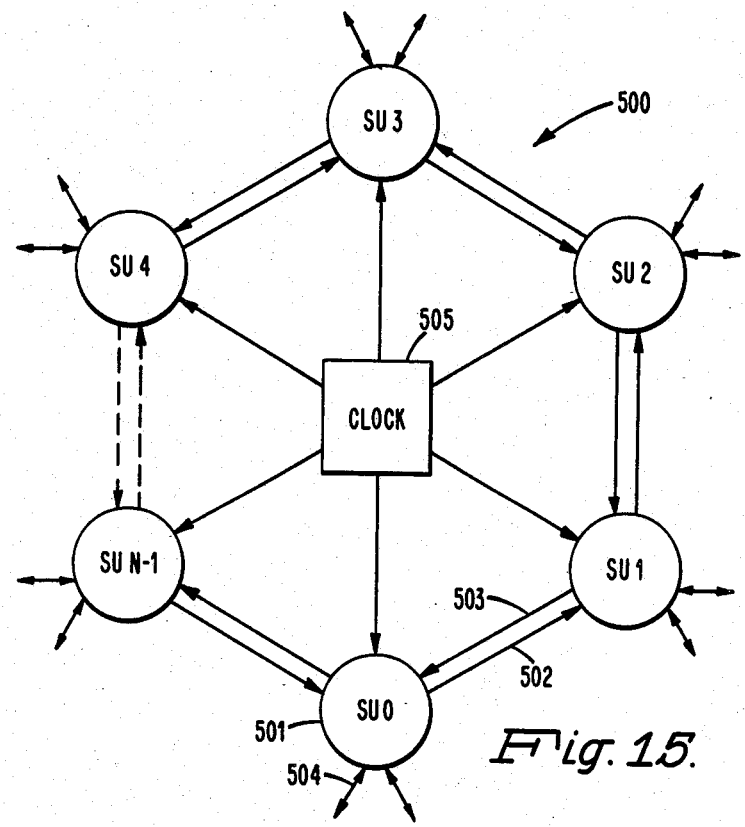
FIG. 15 is a schematic representation of a hub switch employed in a burst-switching network.

The hub switch 500 as illustrated in FIG. 15 is a high-speed, high-capacity TDM switch for transferring the bytes of a message burst received in any inbound link channel from any link group to an outbound link channel of the appropriate link group as determined by address information in the message burst. The hub switch 500 includes N switching units 501 connected in a ring. In order to provide the advantages of redundancy, two hub buses 502 and 503 may be provided to propagate signals around the ring in either direction. Each switching unit is connected to a link group by one or more TDM link communication links 504.

An origin switching unit which receives a byte of digitally encoded information on an incoming link channel places the byte on the ring. The byte is passed from switching unit to switching unit around the ring until it arrives at its destination switching unit as designated by address information contained in the message burst.

Figure 19:
FIG. 19 is a diagram illustrating the format of digital burst signals processed by the hub switch.

As illustrated by the diagram of FIG. 19, a burst consists of a header (HDR), the information or data being transferred (INFO), and a termination character sequence of termination characters (TCS). The header contains the address to which the burst is being sent along with other identifying information on the burst. The information portion of the burst is a continuous stream of bytes. The length of the burst varies. Usually for speech information the burst is between 100 and 300 milliseconds in length. The termination character sequence of termination characters (bytes) indicates the end of the burst. The sequence of termination characters is continuous within a channel while it remains idle.

Transfer of bytes of digitally encoded information around the hub ring takes place in C hub channels having the same frame period as the inbound and outbound TDM link channels. Each byte moving around the hub ring from an origin switching unit to a destination switching unit during a hub channel time slot must be transferred from switching unit to switching unit at a rate so as to propagate completely around the hub ring in a ring circulation period equal to the hub channel time slot. Movement of a byte from one switching unit to the next takes place during each tick of a central clock 505.

Figure 18:
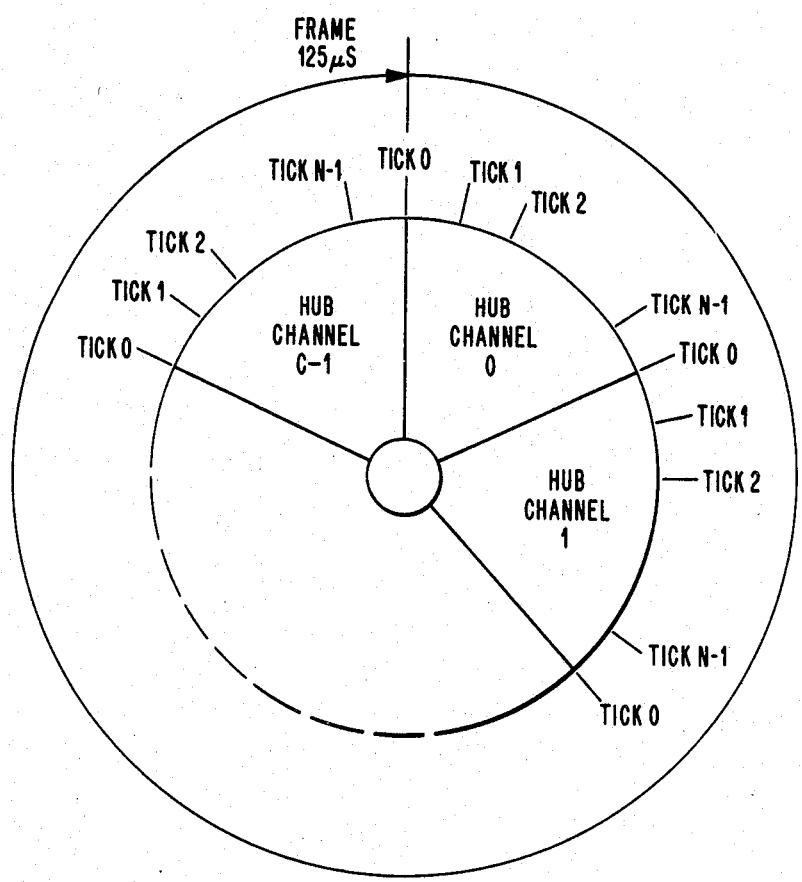
FIG. 18 is a diagram illustrating the relationships between hub channels and hub ring circulation periods during a time-division multiplexed hub frame.

As illustrated by the diagram of FIG. 18, during each frame there are C channel time slots, and during each hub channel time slot there are N clock ticks. In the illustrative embodiment under discussion the frame time is 125 microseconds, the same as the T1 frame time of the link channel in the link communication links 504. The number of hub channels per frame, C is 32. C can not be less than the number of link channels (24 in a T1 system). The number of clock ticks in a frame is C×N. In the embodiment under discussion the number of switching units, N, is 256.

In order for communication to take place between the different link groups connected to the various switching units of the hub switch, the link switch of the origin link group must find an idle channel to its associated switching unit of the hub switch. This origin switching unit in the hub switch must then find an idle hub channel between itself and the destination switching unit of the hub switch. Finally, the destination switching unit must find an idle link channel to communicate to the destination link switch in its associated link group.

Figure 16:
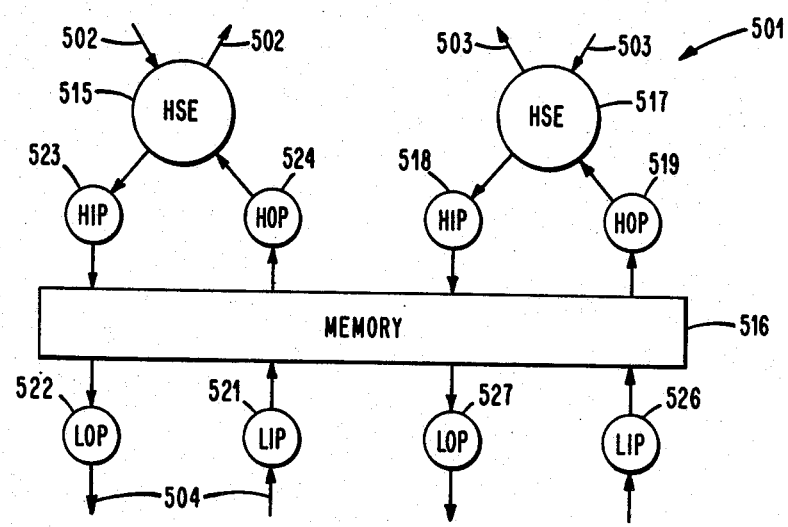
FIG. 16 is a schematic representation of a single switching unit of the hub switch of FIG. 15.

Since there may be congestion at the hub switch switching units such that an idle hub channel or outgoing link channel is not immediately available when needed, and since some channel slip between channels is inevitable, each switching unit must include buffer memory and processors to manage the memory. FIG. 16 illustrates a switching unit. The switching unit includes a first hub switch element 515 connected to the hub bus 502 for transferring bytes in one direction around the hub switch ring. A second hub switch element 517 is connected to the hub bus 503 for transferring bytes around the hub switch ring in the opposite direction. The switching unit also includes a memory 516 and processors for managing the information into, out of, and within the memory. The processors, which are designated with respect to the memory, include two link input processors (LIP) 521 and 526 between incoming link channels and the memory and link output processors (LOP) 522 and 527 between the memory and the outgoing link channels. A hub input processor (HIP) 523 and a hub output processor (HOP) 524 are between the hub switch element 515 and the memory 516. The processors associated with the second hub switch element 517 are a HIP 518 and a HOP 519.

A principal function of the processors is controlling the routing of bytes between the memory 516 and the hub channels, and between the memory 516 and the link channels. They also have other functions including the acquisition of channels and the assignment and deassignment of dynamic memory buffers within the memory 516 to hub and link channels. These and other functions such as sequencing and queuing are managed in essentially the same manner as similar functions are performed by the link switches described in detail previously. The functions of transferring bytes from the memory 516 to the hub ring 502 by way of the hub switch element 515 and transferring bytes off the hub ring 502 by way of the hub switch element 515 are controlled by the HOP 524 and HIP 523. The memory 516, HIP 523 and HOP 524 together with a LIP and a LOP in effect form a variety of link switch serving as an interface between the link group and the hub switch element 515. The processors associated with the second hub switch element 517 function in a corresponding manner in transferring bytes between the memory 516 and the hub ring 503.

In summary, a message burst passes through the hub switch from an incoming channel of one link group to an outgoing channel of another link group in the following manner. Bytes of the burst arriving at the origin hub switching unit 501 on an incoming link channel are buffered in the switching unit memory 516. The first bytes, or header, of the burst contain address information; one byte, specifically the second byte, designating the destination link group and therefore the destination switching unit. The received bytes are queued for transmission on the hub bus. A hub channel in which the origin switching unit is transmit idle and the destination switching unit is receive idle is selected. The bytes of the burst are loaded onto the selected hub channel, one byte during each hub channel frame. A byte is transferred directly between the hub switch elements of adjacent intervening switching units on each clock tick without passing through the memories 516. Upon arriving at the destination switching unit, each byte is stored in the memory. The header bytes are interpreted to determine the appropriate output link group, if more than one link group is associated with the destination switching unit. The bytes are queued on the appropriate outbound link, and output begins on the first idle outbound link channel.

Hub Channel Transfer-General

Figure 17:
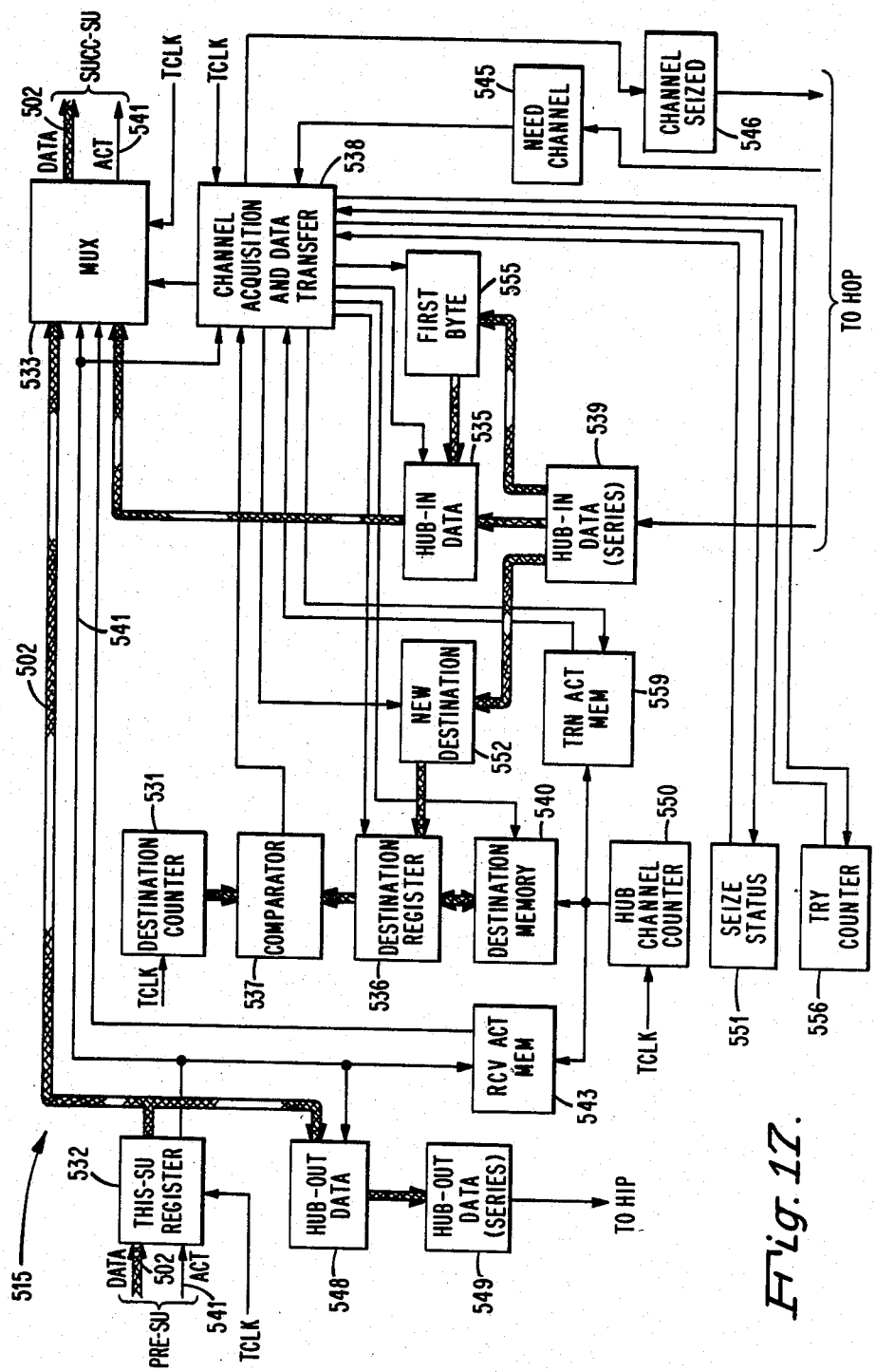
FIG. 17 shows a block diagram of a hub switching element of the switching unit illustrated in FIG. 16.

FIG. 17 is a block diagram illustrating the first hub switch element 515 of a switching unit 501. The hub switch element handles the transfer of bytes from the preceding hub switch element and to the succeeding hub switch element along the hub ring bus 502. Also, under control of the HOP and HIP the hub switch element loads bytes from the memory 516 to the ring when the switching unit is an origin, and unloads bytes from the ring into the memory 516 for transmission on an outbound link channel when the switching unit is a destination.

Each hub switch element includes a destination memory 540 which contains the switching unit destination address for each hub channel in which the hub switch element 515 is transmit active. In addition a transmit active memory 559 contains a bit for each hub channel indicating the transmit busy or idle status of each hub channel for the hub switch element. Each hub switch element also includes a destination counter 531 which at the start of each hub channel or ring circulation period is set to the hub switch element's address. On each clock tick (TCLK) the destination counter 531 is decremented. Also on each tick the byte circulating on the ring which is in the THIS-SU storage register 532 of the hub switch element is transferred on the hub bus 502 by a multiplexer 533 to the storage register of the next succeeding switching unit. At the same time the byte in the register of the preceding switching unit moves into the THIS-SU register 532 of the switching unit.

When the hub switch element 515 of the switching unit 501 is serving as an origin for a message burst, the byte to be transferred during a hub channel time slot is placed in the hub-in data register 535 by way of a hub-in data series register 539 at the start of the hub channel time slot by the HOP to await transfer onto the ring. At the same time, an activity bit indicating that the hub switch element needs a hub channel is placed in a need channel register 545. Also, the destination switching unit address is placed in the destination register 536 from the destination memory 540 at the start of the hub channel time slot or ring circulation period. Upon the clock tick that causes the contents of the destination counter 531 to be the same as the address in the destination register 536, a comparator 537 produces an output. This indication of a match is applied to a channel acquisition and data transfer section 538 which causes the multiplexer 533 to transfer the contents of the hub-in data register 535 rather than the contents of the THIS-SU register 532 onto the hub bus to the succeeding switching unit.

As stated above, each byte on the ring is transferred from one switching unit to the next succeeding switching unit on each tick during the hub channel time slot. On the last tick of the ring circulation period at the end of the hub channel time slot each byte on the ring is transferred to the THIS-SU register 532 of its destination switching unit. On the next tick starting a ring circulation period and hub channel, the byte stored in the THIS-SU register 532 is transferred to the hub-out data register 548 for placing in the memory 516 by the HIP and transmission on an outbound link channel by the LOP.

Hub Channel Acquisition-General

Movement of the bytes of a message burst during successive frames of a hub channel involves coordination between a HOP of the origin switching unit and a HIP of the destination switching unit. The HOP controls fetching a byte from the memory of the origin switching unit and placing it on the hub ring bus, and the HIP of the destination switching unit takes the byte from the hub ring bus and places it in its memory. The HOP can process only one byte movement and the associated functions during each hub channel or ring circulation period, and the HIP can process only one byte movement and the associated functions during each hub channel or ring circulation period. Thus, for each burst, a free hub channel must be found during which both the origin switching unit is transmit idle and the destination switching unit is receive idle.

The need for acquiring a hub channel is recognized by the origin switching unit when an incoming link channel becomes busy. Therefore, the finding of a free hub channel must be accomplished at the origin switching unit. The origin switching unit knows its transmit busy/idle status for each of the hub channels. In order to select a free channel, it must also have information on the receive busy/idle status for each of the hub channels for the destination switching unit.

In order to provide information on the receive busy/idle status of each switching unit during the ring circulation period of a hub channel on the hub ring bus 502, an activity line 541 is provided in the hub ring in parallel with the hub ring bus 502. A receive activity memory 543 stores a bit for each hub channel indicating whether the hub switch element 515 is receive busy or receive idle for that hub channel. At the beginning of each hub channel period the bit indicating the receive busy/idle status of the hub switch element for that hub channel is transferred to the THIS-SU register 532 of the succeeding switching unit. This activity bit is propagated around the ring from switching unit to switching unit during subsequent ticks. Thus, any switching unit can determine the hub channel receive busy/idle status for any other switching unit by examining the activity bit placed in its THIS-SU register 532 on the appropriate tick during the ring circulation period.

When an origin switching unit must find a free hub channel to a destination switching unit, the address of the destination switching unit is placed in the destination register 536 of the hub switch element and the first byte of the burst which is to be transmitted is transferred into the hub-in data unit register 535 at the start of the first hub channel in which the hub switch element of the origin switching unit is transmit idle. In addition the HOP sets the need channel register 545 to indicate the need for a hub channel for transmitting the byte in the hub-in data register 535.

On the clock tick when the contents of the destination counter 531 are the same as the contents of the destination register 536, the comparator 537 produces an output indicating that it is the appropriate point in the ring circulation period for loading the byte in the hub-in data register 535 onto the hub ring bus 502. The activity bit in the THIS-SU register 532 indicates the receive busy/idle status of the destination switching unit, and a bit in the transmit activity memory 559 indicates the transmit busy/idle status of the hub switch element of the origin switching unit. If these bits indicate that the destination switching unit is receive idle and the origin switching unit is transmit idle for this hub channel, a hub channel has been found for sending the burst from the origin switching unit to the destination switching unit.

The origin switching unit seizes this hub channel by setting the activity bit to busy as it is transmitted by the multiplexer 533 to the succeeding switching unit on line 541. At the same time the first byte of the burst is transferred from the hub-in data register 535 to the succeeding switching unit on line 502 by the multiplexer 533. In addition, the channel acquisition and transfer section 538 sets a channel seized register 546 to indicate to the HOP that a successful hub channel acquisition and data insertion on the hub ring bus have been made. The HOP stores the appropriate information in the memory 516 so that subsequent bytes of the burst will be transferred into the hub-in data registers 539 and 535 at the appropriate times for transmission to the destination switching unit on the acquired hub channel during successive frames. The indication that the acquired hub channel is now transmit busy is placed in the transmit activity memory 559 and the address of the destination switching unit for the hub channel is placed in the destination memory 540 to complete the hub channel acquisition procedure.

Since the activity bit being propagated on the activity line 541 is set to busy by the origin switching unit when seizing a hub channel, any downstream switching unit which may also be seeking an idle channel to the same destination switching unit will be aware that the destination switching unit is receive busy for the current hub channel. Thus no confusion arises out of substantially simultaneous requests for a hub channel by different switching units to the same destination.

At the tick terminating one hub channel and starting the next, the byte in the THIS-SU register 532 is transferred into the hub-out data register 548 and the activity bit is transferred into the receive activity memory 543. The receive activity bit placed in the receive activity memory 543 is propagated on the activity line 541 during the next frame of the same hub channel. The byte in the hub-out data register 548 is transferred to the hub-out data series register 549 and transferred in series by the HIP to the memory 516.

If for a hub channel the origin switching unit is transmit busy or it finds from the activity bit in the THIS-SU register 532 that its intended destination is receive busy, the origin switching unit must try the next hub channel as a possibility. If an origin switching unit examines all of the hub channels and fails to find a channel in which it is transmit idle and the intended destination switching unit is receive idle, then no suitable free hub channel exists at the moment on that bus. With the hub switch configuration shown in FIGS. 15 and 16, the origin switching unit may try the other hub switch element 517 and hub ring bus 503. The origin switching unit may also try other destination switching units which can interconnect with the proper link group, or the channel searching procedure may be repeated until a free hub channel is found. Repeating the procedure of searching for a free hub channel may provide a channel with only slight delay, since typically a hub channel is assigned and held for only a few hundred milliseconds; that is, the length of a single burst. A free hub channel may become available when either the origin switching unit becomes transmit idle in a hub channel or the destination switching unit becomes receive idle in a hub channel.

Detailed Operation of the Hub Switch

The operation of a switching unit 501, particularly a hub switch element 515 under control of the associated HIP and HOP, during the ring circulation period of a hub channel on hub ring bus 502 will now be explained in greater detail. The table of FIG. 20 provides a summary of the operations within a hub switch element during a hub channel under various sets of conditions.

The ring circulation period of one hub channel ends and that of the next one starts at tick 0 (or tick N) of the central clock 505 of the hub switch as illustrated in the diagram of FIG. 18. On this tick each byte is transferred into the THIS-SU register 532 of its destination switching unit from the preceding switching unit. As indicated in column 1 of the table of FIG. 20 the byte is placed in the hub-out data register 548, and the activity bit (busy) is placed in the receive activity memory 543. The HIP transfers the byte to the memory 516 by way of the hub-out data series register 549 to be processed by a LOP for transmission on an outbound link channel.

If the byte placed in the hub-out data register 548 is a termination character which is to be used by the destination to determine that the burst has been terminated, the activity bit in the hub-out activity register 548 will show a busy status. This information is processed by the HIP to recognize the end of the burst. The hub channel status will be changed to idle by the origin switching unit during a subsequent frame of the hub channel.

Also on the starting clock tick the bit in the receive activity memory 543 indicating whether the switching unit is receive busy or receive idle in the next hub channel on hub ring bus 502 just starting is passed through the multiplexer 533 to the activity line 541 to the successive switching unit. These actions are summarized in column 1 of the table of FIG. 20.

On the first tick (0 or N) of a hub channel the destination counter 531 is set to the switching unit's own address. If the switching unit has previously seized the hub channel just starting (during a previous frame), the transmit activity memory 559 contains a transmit busy bit for the hub channel and the destination memory 540 contains the address of the destination switching unit for the hub channel. The current hub channel of the C hub channels is designated by a hub channel counter 550 which is advanced every tick 0. A byte is loaded from the memory 516 into the hub-in data register 535 by way of the hub-in data series register 539 by the HOP. A bit indicating that a channel is needed is placed in the need channel register 545 by the HOP. The address of the destination switching unit is loaded into the destination register 536 from the destination memory 540.

Upon each subsequent tick the destination counter 531 counts down by one, and a byte and an activity bit are loaded into the THIS-SU register 532. If no match is produced between the contents of the destination counter 531 and the destination register 536 as indicated by the output of the comparator 537, no action is taken by the switching unit with regard to the byte (if any) in the hub-in data register 535. On the next tick of the clock the contents of the THIS-SU register 532 are passed through without change to the successive switching unit by the multiplexer 533. This situation is shown in column 2 of the table of FIG. 20.

On a tick when the destination counter 531 is decremented to equal the contents of the destination register 536, the output of the comparator 537 indicates a match. It is assumed that the switching unit has seized the hub channel during a previous frame for transmission of the bytes of the burst to the destination address in the destination register 536. In response to the indication of a match from the comparator 537 together with a channel needed indication from the need channel register 545, a channel receive busy bit from the THIS-SU register 532, and a transmit busy bit from the transmit activity memory 559, the channel acquisition and data transfer section cause the multiplexer 533 to transfer the contents of the hub-in data register 535 together with a busy activity bit to the successive switching unit. This situation is indicated in column 3 of the table of FIG. 20.

If the first byte of a burst is to be transferred from the memory 516 to the hub ring, the switching unit must acquire a hub channel in which it is transmit idle and the destination switching unit, designated by the address information in the header of the burst, is receive idle. As explained previously on the first tick of the hub channel the destination counter 531 is set to the address of the origin switching unit. The HOP transfers the address information of the intended destination switching unit to the hub-in data series register 539. The HOP also sets the need channel register 545 to indicate a channel is needed. In response to the combination of the need channel indication from the need channel register 545, a channel transmit idle indication from the transmit activity memory 559, and an idle or inactive status indication from a seize status register 551 indicating that no hub channel search is underway, the address information in the hub-in data series register 559 is transferred to a new destination register 552, and the seize status register 551 is changed to indicate that the new destination information has been received. Next, the first byte of the burst which is to be transmitted, which byte was transferred to the hub-in data series register 539 as the address information was transferred out, is loaded into a first byte register 555. The seize status register 551 is changed to provide an indication that a channel search is underway for this hub channel. At the same time a try counter 556 is loaded with a value C, specifically 32, the total number of hub channels in a frame. Then the address information in the new destination register 552 is loaded into the destination register 536, and the byte in the first byte register 555 is loaded into the hub-in data register 535.

On the tick of the clock at which the destination counter 531 is decremented to equal the contents of the destination register 536, the comparator 537 produces an indication of a match to the channel acquisition and data transfer section 538. The activity bit in the THIS-SU register 532 indicates to the channel acquisition and data transfer section 538 whether the destination switching unit is receive idle or busy for this hub channel. If the activity bit in the THIS-SU register 532 indicates idle status, the channel acquisition and data transfer section 538 causes the multiplexer 533 to transfer the first byte of the burst in the hub-in data register 535 and a busy activity status bit to the successive switching unit. The channel seized register 546 is set indicating that data has been inserted on the hub ring, and to inform the HOP that a hub channel has been seized and that subsequent bytes of the burst should be sent in subsequent frames of that hub channel. In addition a transmit busy bit for this hub channel is stored in the transmit activity memory 559, and the address of the destination switching unit is transferred from the destination register 536 to the destination memory 540 for use in subsequent frames. The seize status register 551 is restored to the inactive status. This situation is summarized in column 4 of the table of FIG. 20.

If on the tick of the ring circulation period when the comparator indicates a match the activity bit in the THIS-SU register 532 indicates busy, this hub channel to the destination switching unit has already been acquired by another switching unit. Under these conditions as summarized in column 5 of the table of FIG. 20, the byte in the hub-in data register 535 is not transferred to the hub ring. Instead, the contents of the THIS-SU register 532 are passed to the successive switching unit. The channel seized register 546 is not changed indicating to the HOP that the channel has not been seized. No change is made in the transmit activity memory 559 or in the seize status register 551, which still indicates that a search is underway.

On tick 0 (or tick N) at the start of each subsequent hub channel the presence of the search underway indication from the seize status register 551 causes the try counter 556 to be decremented by one. On the next hub channel that is not transmit active, (the transmit activity bit in the transmit activity memory 559 is idle), the contents of the first byte register 555 and the new destination register 512 (which remain until replaced) are placed in the hub-in data register 535 and destination register 536, respectively. The hub switching element is thus primed to make another attempt to seize a hub channel when the count in the destination counter 531 equals the contents of the destination register 536. If the contents of the try counter 556 reach a value of zero, it indicates that all C hub channels on the hub ring bus 502 have been checked and none is currently available. When the try counter 556 reaches zero, the seize status register 551 is reset to the inactive status. The HOP also counts the number of channels which have occurred since it delivered the first byte to the hub switching element. Thus, the HOP also knows when the search has been discontinued, since it has not received a hub channel seized indication from the channel seized register 546 for C hub channel periods.

When all the bytes of a burst have been sent, the origin switching unit transmits a sequence of termination characters on the hub channel to the destination switching unit to indicate the termination of the burst. Upon receiving this notification that the burst has been completed, the HIP of the destination switching unit manages the contents of its memory 516 to reflect this situation. On the start of the hub channel during the next frame a receive idle activity bit in the receive activity memory 543 is passed along the activity line 541 indicating that the switching unit is now receive idle in that hub channel.

SWITCHING PROCESSOR

A burst switch is an intelligent switching network. When a burst is introduced into the network through a port, the burst will be routed by the network nodes to the burst's destination port as designated in the header. The network directs the burst toward its destination port without external control intervention. This distributed network switching intelligence is provided essentially by two specially designed high-speed processors: a switching processor; and a queue sequencer. There are several variations of the switching processor which differ only in firmware. A burst switch generally has other high-level control processors which, for example, determine what the content of a burst header should be. Here, the focus is directed only to the intelligence associated with the in-line switching functions; the processors which perform these functions will be referred to as switching processors except for the queue sequencer which will be referred to by name. Each switching processor works in conjunction with the queue sequencer.

The operations of the various switching processors in a link switch and hub switch have already been described. In a link switch, the switching processors mediate the flow of bytes of a burst between communications links and central memory and between ports and central memory. In the hub switch, the switching processors mediate the movement of bytes between a communications link and central memory and between a communications hub and central memory.

A general purpose processor can be programmed to perform the functions of a switching processor. An experimental burst switch was constructed at GTE Laboratories with Rockwell 6502 Microprocessors as its switching processors. However, this experimental model supported only four channels on its communications links. It is highly desirable that a burst switch support twenty-four, thirty-two, or more channels on its communications links.

The speed requirements imposed on the switching processors are quite stringent. As explained above, a burst switch has in-line switching capability in the sense that substantially all of the processing required for an incoming or outgoing byte must be completed within a single channel time, so that the switch can stay current in real time. A T1-carrier with twenty-four channels has a channel time of 5.2 microseconds. In a carrier with thirty-two channels, as is the European standard, the channel time is 3.9 microseconds. It has been determined that a switching processor must be capable of performing approximately fifty operations per channel time in order to stay current. In view of this stringent speed requirement, specially designed switching processors are required to implement a full complement of channels. There is no commercially available microprocessor which can perform approximately fifty operations per 5.2 or 3.9 microsecond period.

As has been explained previously, a typical link switch has six or eight switching processors competing for access to central memory. The control logic requires that only one processor may obtain access at any time. Accordingly, it is necessary that memory access be arbitrated. As a result of memory arbitration, a switching processor may have to wait, while another processor completes its use of memory, thus reducing the available in-line processing time. Since this waiting time may be substantial under certain conditions, there is a need for a parallel processing capability.

The central memory of a link switch contains the dynamic buffers and queue headers used in processing bursts. Memory accesses by the various switching processors are primarily of two types: to read or write a character (or byte) of a burst; and to administer queues and buffers.

Memory contention can be reduced by dividing central memory into two parts: a character memory, which contains only characters; and a queue memory, which contains queue and buffer administrative information (not the characters of the various queues). Only one character may be read or written from character memory during a single memory access. During a single operation on queue memory, a number of uninterrupted reads and/or writes is permitted (which may be required to link multiple buffers of a queue).

The administration of queues and buffers is a specialized function common to all switching processors. A specialized processor, called a queue sequencer, has been added to administer all information in the queue memory on behalf of all switching processors. When a switching processor requires a queuing action, it delegates such action to the queue sequencer; thereafter, the switching processor is free to perform further processing without awaiting access to queue memory. The actions of the queue sequencer are carried out in parallel with those of the switching processors. Thus, the addition of the queue sequencer to the link switch provides two speed advantages: first, queue administration is conducted in parallel thereby relieving the switching processors of a substantial in-line responsibility; second, the waiting time for the switching processors to access queue memory has been eliminated. In addition to the speed advantages, the queue sequencer provides subdivisions of actions on the queue memory. This means that a series of uninterrupted reads and/or writes is permitted for each operation on queue memory. Thus, additional accesses and processing, otherwise needed to insure no interference between switching processors, are not required.

Figure 21:
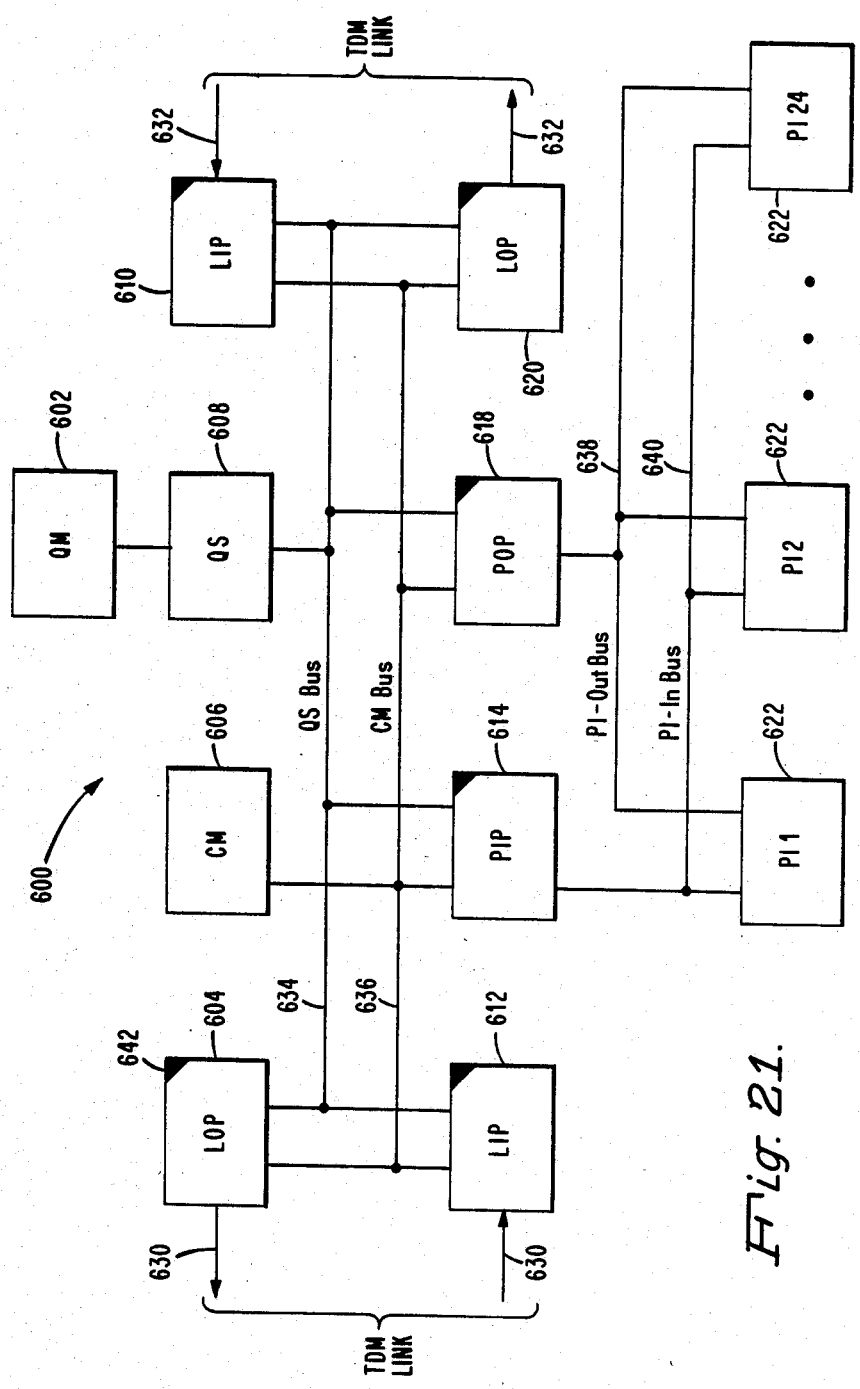
FIG. 21 contains a block diagram of a typical link switch showing the queue sequencer and various embodiments, or firmware variants, of the switching processor.

FIG. 21 contains a block diagram of a typical link switch 600 coupled between time-division multiplexed communications links 630 and 632 showing the queue sequencer and various embodiments, or firmware variants, of the switching processor. Each input or output switching processor, LIP 610, LIP 612, PIP 614, LOP 604, LOP 620, or POP 618, has an interface with queue sequencer bus (QS Bus) 634, with character memory bus (CM Bus) 636, and with a communications link or port bus. Queue sequencer (QS) 608 mediates QS bus 634 and queue memory (QM) 602. Queue memory 602 in FIG. 21 is shown conceptually as a component separate from queue sequencer 608. Character memory (CM) 606 is coupled with CM bus 636. Each port interface (PI) circuit 622 (twenty-four ports are indicated in the drawing) is coupled with PI input bus 640 and PI output bus 638. PI-In bus 640 and PI-Out bus 638 are coupled respectively with PIP 614 and POP 618. QS Bus 634 and CM Bus 636 are arbitrated buses. Each block of FIG. 21 having a triangle 642 in the upper right corner is a firmware variation of the basic switching processor. The basic switching processor is also employed in counterparts of the hub switch.

Arbitration is required on both CM Bus 636 and QS Bus 634 in order to insure that no collisions or data corruption occur on these buses and that all requests for actions on CM 606 and QM 602 are serviced fairly. Contention on each of these buses may be resolved using priority arbitration logic, appropriately modified, as shown in FIG. 3A. In FIG. 21, CM 606 and QM 602 each include timing control for generating internal read and write pulses, and random access memory. All transfers across CM Bus 636 and QS Bus 634 take one machine cycle. Arbitration for one cycle may be performed concurrently with bus transfers, so that one transfer may be performed every cycle.

Figure 22:
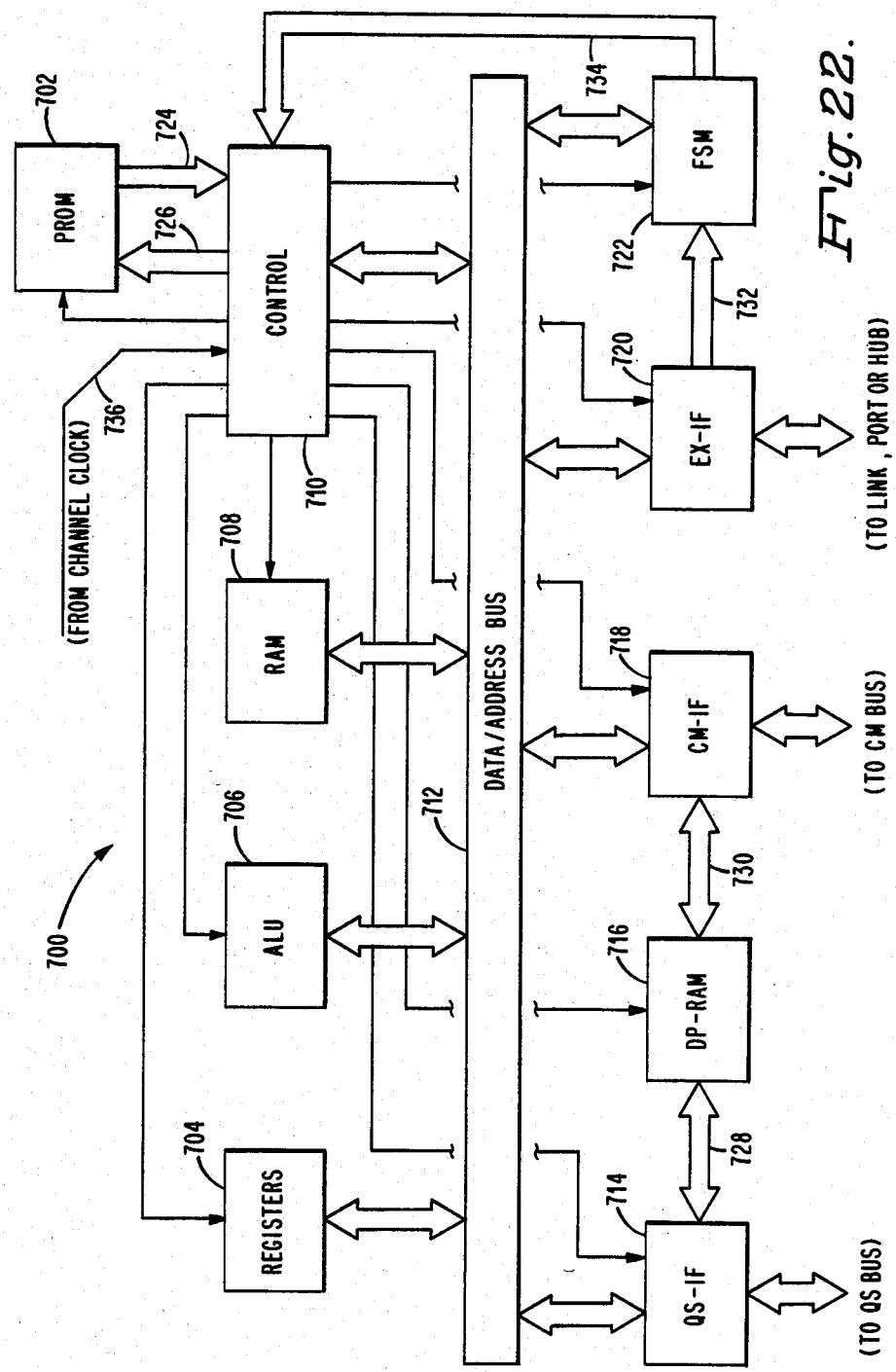
FIG. 22 is a block diagram of the architecture of the basic switching processor.

FIG. 22 shows a block diagram of the architecture of the basic switching processor 700. Control 710 executes instructions from program memory 702. In a preferred embodiment, program memory 702 is implemented as a programmable read only memory, designated PROM in the drawing. There are registers 704, an arithmetic/logic unit (ALU) 706, and data memory, i.e., random access memory 708. There is an interface with the queue sequencer bus (QS-IF) 714; an interface with the character memory bus (CM-IF) 718; and an external interface (EX-IF) 720 which provides means for coupling with a communications link, port, or hub. Dual-port RAM (DP-RAM) 716 comprises means for providing the current buffer address in character memory (as a function of present channel number). Finite state machine (FSM) 722 comprises means for determining the status of each channel with respect to incoming bursts. Typical channel states of FSM 722 are: channel idle, awaiting a burst; particular header byte received; informational byte received; DLE (data link escape) byte received; and FLAG (end of burst) character received.

Each component of switching processor 700 is coupled with data/address bus 712 except for PROM 702 and DP-RAM 716. PROM 702 is coupled with control 710 via instruction bus 724 and microcode address bus 726. DP-RAM 716 is coupled between QS-IF 714 and CM-IF 718 by means of buses 728 and 730, respectively. FSM 722 is coupled with EX-IF 720 via bus 732. FSM 722 also is coupled with control 710 via jump address bus 734. As shown in the drawing, there are control lines from control 710 to each component. Control 710 includes channel counter means, e.g., a broadcast channel count or a count derived from a broadcast channel clock. Control line 736 provides an input to control 710 from an external channel clock source.

The instructions executed by switching processor 700 are read from PROM 702 via instruction bus 724. Control 710 provides the address of the next instruction to be executed via address bus 726. For each embodiment of the switching processor, the microcoded programs will not change. Therefore, the program memory is a read only memory.

PROM 702 comprises 256 words, each word having a length of 64 bits. This word length is greater than that typically found in the art. The extended word length provides a speed advantage in several respects. More than one operation may be included in a single instruction word, e.g., a register transfer and an ALU operation, so that several operations can be performed within the time allotted for a single instruction. Various bit positions in the instruction word have been assigned to certain registers, operations, etc., so that decoding of program instructions has been minimized. For example, a register may be addressed by the presence of a bit in the assigned bit position of the instruction word. Operations on several registers may occur within the same instruction cycle. Instructions are executed in a pipelined manner. Instruction fetch overlaps instruction execution; during the execution cycle of a particular instruction, the next sequential instruction is fetched. Thus, the switching processor executes one instruction per cycle. The next sequential instruction is the next instruction to be executed unless the current instruction is a jump instruction. Jump instructions introduce a non-sequential address for the next instruction and therefore require two cycles to take effect.

RAM 708 comprises 1024 bytes. It serves as the local data memory for switching processor 700. It contains various status variables and parameters for each of the switching processor's channels, e.g., there is an indicator to denote whether or not a burst has been routed toward its destination. The data memory address is a concatenation of the channel counter (5 bits) and the offset (5 bits) within control 710 available from the instruction.

ALU 706 performs standard arithmetic and logic operations.

Dual-port RAM 716 is the switching processor's storage for active buffer addresses. The switching processor sends the buffer address to the queue sequencer or character memory by addressing DP-RAM 716 with the channel counter; this reads out the active buffer for that channel, which is automatically sent to the queue sequencer or character memory. When the queue sequencer updates the active buffer for a given channel, it does so by addressing DP-RAM 716 with the channel number and writing the new buffer address. DP-RAM 716 may be implemented using a commercially available dual-port RAM or by using a single-port RAM with multiplexing circuitry on the address and data buses together with contention control logic.

Registers 704 comprise eighteen registers each accessing the eight-bit internal data bus 712. Most registers contain eight bits. The switching processor registers are listed in Table 1 as follows.

TABLE 1

| | Switching Processor Registers and Latches | | | | |
|---|---|---|---|---|---|
| No. | Abbrev. | Name | Bits | Write DB* | Read DB* |
| 1 | ALUO | ALU Output Register | 8 | X | |

TABLE 1-continued
Switching Processor Registers and Latches

| No. | Abbrev. | Name | Bits | Write DB* | Read DB* |
|---|---|---|---|---|---|
| 2 | AREG | ALU Input Register | 8 | | X |
| 3 | BTYP | Burst Type | 3 | | X |
| 4 | BUFF | Buffer Register | 8 | X | |
| 5 | CHNS In | Channel Status Register | 4 | | X |
| 6 | CHNS IN | Channel Status Register | 4 | | X |
| 7 | CHRS OUT | Character Status Out Register | 4 | X | |
| 8 | INDX | Index Register | 8 | | X |
| 9 | INPUT | Input from external interface | 8 | X | |
| 10 | INPUT STR | Input Strobe Latch | | | X |
| 11 | LMEM IN | Local Memory In | 8 | | X |
| 12 | LMEM OUT | Local Memory Out | 8 | X | |
| 13 | OUTP | Output to external interface | 8 | | X |
| 14 | OWNS | Own Switch ID | 5 | X | |
| 15 | QUEU | Queue Register | 5 | | X |
| 16 | QS REQ | Queue Sequence Request | 8 | | X |
| 17 | SEQD | Data Out Field from Microword | 8 | X | |
| 18 | | Channel Counter | 5 | X | |

*DB = Data Bus 712

QS-IF 714 is the switching processor's interface to the queue sequencer bus. When switching processor 700 requires a queue sequencer function, control 710 issues a command or request via QS-IF 714. Control 710 merely issues the command or request. AS-IF 714 has means for gaining access to the arbitrated queue sequencer bus and transferring the request to the queue sequencer. The queue sequencer exectes the request independently of the switching processor. The queue sequencer will, when appropriate, return a single piece of information to switching processor 700, namely the address or number of a new buffer in character memory to be used with a particular channel. This buffer address passes from QS-IF 714 directly to DP-RAM 716 via bus 728 and is stored there at the location addressed by the channel number.

The input switching processors store bytes or characters into character memory; the output switching processors read bytes or characters from character memory. For each access, a buffer address for the current channel is required. The buffer address comprises the buffer number, supplied by DP-RAM 716, concatenated with the position in buffer or index, stored in RAM 708. CM-IF 718 has means for implementing the access to or from character memory independently after the buffer address has been supplied.

Each switching processor serves as an intermediary between character memory and a communications link, port, or hub. EX-IF 720, referred to as the external interface, provides interface means for a link, port, or hub, depending on the particular embodiment of the switching processor. In a switching processor on the input side of central memory, EX-IF 720 has means for providing the received byte to FSM 722 via bus 732.

The purpose of FSM 722 is to assist control 710 by performing logic associated with incoming bursts in parallel with control 710. Once the status of an incoming byte has been determined by FSM 722, a jump address is placed on bus 734. This jump address is the location of the microcoded subroutine in PROM 702 which is appropriate for processing the incoming byte. This type of jump is typically performed once per channel time. The appropriate jump address is determined by FSM 722 essentially by two criteria or states: character state, and channel state. As will be seen, the status of an incoming byte in general is dependent on the status of the preceding byte of the same burst or channel. The status relationships are best illustrated in state diagrams.

Figure 23:
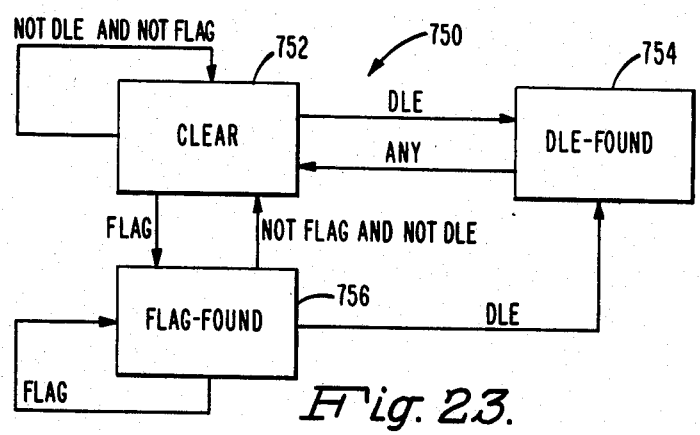
FIG. 23 is a character state diagram for the finite state machine of the switching processor showing three states.

FIG. 23 shows character state diagram 750. There are three character states: Clear, in block 752; DLE-Found, in block 754; and FLAG-Found, in block 756. Each state is determined by the incoming byte and the status of the preceding byte of the same burst or channel. The process is initialized in the Clear state. If a byte other than a DLE or FLAG character is received, the status remains Clear. If the received byte is a DLE, the status changes to DLE-Found. If the received byte is a FLAG, the status changes from Clear to FLAG-Found. The Clear state indicates that either type of burst characters may be received, i.e., either a control character or an informational character. The two control characters are DLE and FLAG.

When status is DLE-Found, the status will return to Clear upon reception of any byte. Any character following a DLE will be interpreted as an informational character rather than a control character.

When status is FLAG-Found, reception of any character other than another control character will return the status to Clear. If another FLAG character is received, the status remains in FLAG-Found. If a DLE character is received, the status changes to DLE-Found. Since a DLE character indicates that the following character is a data character, there is no possibility of passing from DLE-Found directly to FLAG-Found. FLAG indicates end-of-burst or an idle channel. The transition from FLAG-Found to Clear occurs upon receipt of the first non-control character, i.e., not FLAG and not DLE.

Figure 24:
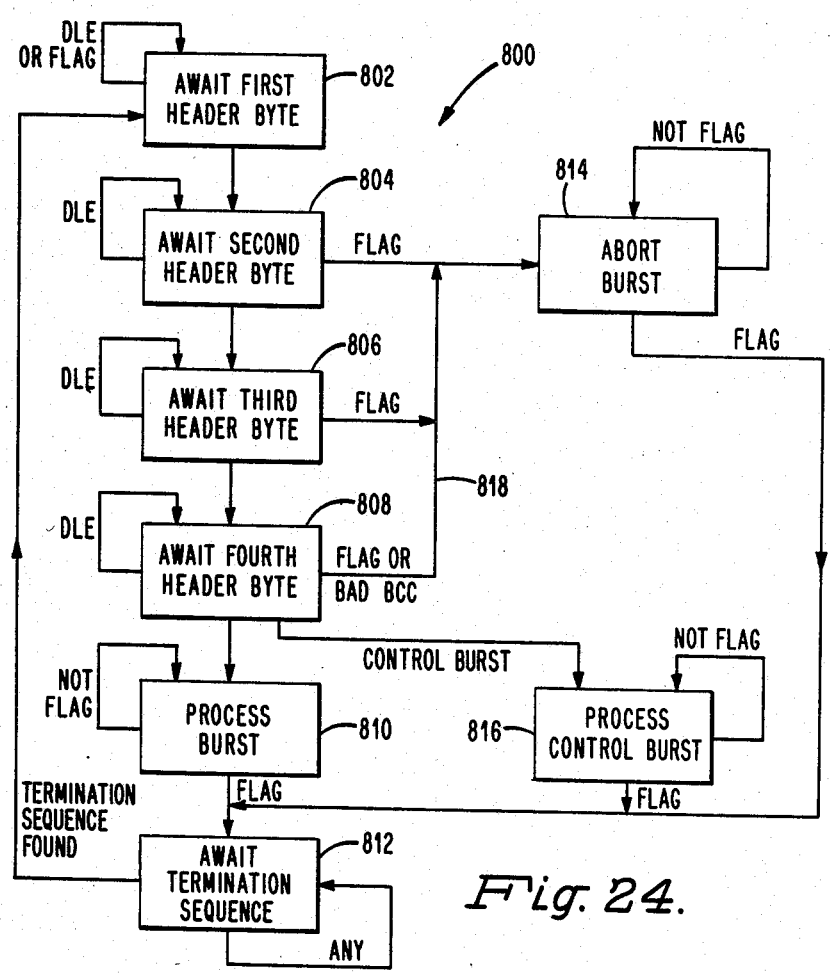
FIG. 24 is a channel state diagram for the finite state machine of the switching processor showing eight states.

FIG. 24 shows channel state diagram 800. This diagram shows the flow of control between channel states while processing an incoming burst. The initial state is that of awaiting reception of the first byte of a burst header in block 802. If either control character, (DLE or FLAG), is received, the status does not change. In a preferred embodiment, FLAG characters are transmitted in an idle channel. When the first byte of a burst has been received, the status changes to that of awaiting the second header character in block 804. Likewise, the status changes to that of awaiting the third and fourth header bytes in blocks 806 and 808 respectively upon receipt of a non-control character in either case. In blocks 804, 806, and 808, the status remains unchanged upon receipt of a DLE.

If an FLAG is received during the processing of the header, there is an error in the header (which contains the destination of the burst). With the destination in doubt, the transmission of the burst is aborted as shown in block 814. For the identical reason, the transmission of a burst is aborted if the burst-header check character (BCC) does not validate after receipt of the fourth header byte as indicated by arrow 818. (The BCC has been referred to above as the header check sequence.) When a burst transmission has been aborted, the bytes of the burst are processed without retransmission in block 814 until FLAG is received whereupon the status changes to that of awaiting receipt of the termination sequence in block 812. If the system termination sequence is a single FLAG, control passes directly through block 812 and returns to the idle state in block

802. If the termination sequence is more than one character, e.g., at least three FLAGS in five characters, control remains in block 812 until the successful reception of the termination sequence.

After reception of the fourth header byte in block 808 and successful validation of the burst check character, control passes to block 810 in which the informational portion of the burst is processed. Upon reception of FLAG, the status changes to that of awaiting the termination sequence in block 812.

A control burst is one which is sent between switches, rather than between end users, for purposes of internal administration. An example of a control burst is a change in the routing table of a switch. A control burst may be detected in block 808. If a control burst is received, status passes to block 816 in which the control burst is processed. Upon receipt of a FLAG, control passes from block 816 to block 812 where the termination sequence, if any, is awaited.

Finite state machine 722 has three character states, shown in the three blocks of FIG. 23, and eight channel states, shown in the eight blocks of FIG. 24. Each block of both figures corresponds to a unique state of FSM 722. Referring to FIG. 22, the logic for processing incoming bursts is inextricably linked between control 710 and FSM 722. Control 710 initializes FSM 722. Upon receipt of an incoming byte, FSM 722 determines its proper state and places the jump address corresponding to this state on bus 734. As used herein, the term "bus" includes a single-entry single-exit data path as in bus 734 and elsewhere. Control 710 jumps to the address on bus 734 which is the location of the appropriate microcoded subroutine for processing the incoming byte. After processing the byte, control 710 provides feedback to FSM 722 via data/address bus 712. Employing the feedback provided by control 710, FSM 722 determines the proper state for reception of next byte in the same channel of the next frame. Thus, each component provides information to the other which is vital to the proper functioning of the switching processor.

The basic instruction set of the switching processor is listed in Table 2. As shown in Table 2, there are four groups of instructions: moves; arithmetic logic unit instructions; jumps; and miscellaneous instructions.

TABLE 2

| \multicolumn{3}{l}{Switching Processor Instruction Set} | | |
|---|---|---|
| mov | move | from register to register(s) |
|  | move | from register to memory |
|  | move | from memory to register(s) |
| alu | $inc | increment AREG, to ALUO |
| alu | $incq | increment AREG, to ALUO and QREG |
| alu | $deq | decrement AREG, to ALUO and QREG |
| alu | $atoq | transfer AREG to QREG |
| alu | $exor | Exclusive OR of AREG & QREG, to ALUO |
| alu | $and | Logical AND of AREG & QREG, to ALUO |
| alu | $andq | Logical AND of AREG & QREG, to ALUO and QREG |
|  | where | AREG = ALU input register |
|  |  | ALUO = ALU output register |
|  |  | QREG = ALU internal register |
| \multicolumn{3}{l}{Normal Jumps (jump address from the microcoded PROM):} | | |
| jnu |  | jump unconditionally |
| jne |  | jump if equal |
| jnn |  | jump if not equal |
| jnw |  | jump if wait flag active |
| jnb |  | jump if no buffer |
| jns |  | jump if not start of channel |
| jnq |  | jump if queue sequencer acknowledges |
| jnc |  | jump if character memory acknowledges |
| jnl |  | jump if link processor (LIP or LOP) |
| \multicolumn{3}{l}{FSM Jumps (jump address from the Finite State Machine):} | | |

TABLE 2-continued

| \multicolumn{2}{l}{Switching Processor Instruction Set} | |
|---|---|
| jfu | jump unconditionally |
| jfe | jump if equal |
| jfn | jump if not equal |
| jfw | jump if wait flag active |
| jfb | jump if no buffer |
| jfs | jump if not start of channel |
| jfq | jump if queue sequencer acknowledges |
| jfc | jump if character memory acknowledges |
| jfl | jump if link processor (LIP or LOP) |
| nop | no operation |
| req | request work of queue sequencer |
| rst | reset channel start latch |

The general operation of a switching processor is as follows.

1. The channel count is advanced, and the current channel's parameters are fetched from local memory.
2. The next byte is inputted, from the external interface in input processors; or from character memory in output processors.
3. Processing is done based upon the channel state and the received byte.
4. The next character is outputted, to character memory by input processors; or to the external interface for output processors.
5. The appropriate request is issued to the queue sequencer via the queue sequencer interface. Each switching processor issues a queue sequencer request each channel time.

QUEUE SEQUENCER

The queue sequencer is a memory management processor in a link switch or in the link interface of a hub switch. A link switch includes input and output processors which operate independently, communicating with each other via a common character memory. An input processor receives information from an incoming communications link or port and stores it in a linked buffer in character memory.

An output processor then removes the information from character memory, and places it on an outgoing link, port, or hub. The queue sequencer provides management of buffers and connects input processors to output processors by assigning the appropriate buffers to each.

The queue sequencer uses a linked-list data structure to manage buffers. Buffers are placed in a queue corresponding to the destination and burst type of the burst they contain. All unused buffers are placed in a separate queue, called the free queue. When a burst is stored for a period longer than a frame time times the length of a buffer, the buffer is chained to another buffer in such a way as to provide an unlimited-length elastic storage.

Upon initiation of a burst, an input processor issues an "enque" request to the queue sequencer which places an entry into the output queue corresponding to the burst. When approaching an idle output channel, an output processor issues a "deque" request to the queue sequencer, whereupon the queue sequencer provides the address of the highest priority burst awaiting an output channel. As used herein, the term "enque" is an abbreviation for "enqueue," which means adding an entry to a queue; the term "deque" is short for "dequeue," which means deleting an entry from a queue.

Before the beginning of a burst, an input processor issues a "getbuf" request to the queue sequencer, and the queue sequencer responds with the address of the next available buffer from the free-queue list. After sending the last character of a buffer, an output processor issues a "putbuf" request which directs the queue sequencer to place the buffer on the free queue list.

The queue sequencer administers the chaining of buffers for bursts which have been queued for a long period of time. Upon storing a data character in the character memory, the input switching processor issues an "inccon" request to the queue sequencer. The queue sequencer then returns a new buffer to the switching processor if buffers have been chained. Similarly, an output processor requests a "deccon" while processing data characters of a burst. If buffers have been chained, the new buffer address is provided to the output processor by the queue sequencer.

The queue sequencer performs queue administration independently of and substantially in parallel with the various switching processors. At initialization, the queue sequencer places all of the (empty) buffers in character memory on the free queue list. During operation, the queue sequencer allocates and surrenders buffers from and to the free queue list for the various switching processors. When there are no new bursts awaiting output, the output queues are empty.

Figure 25:
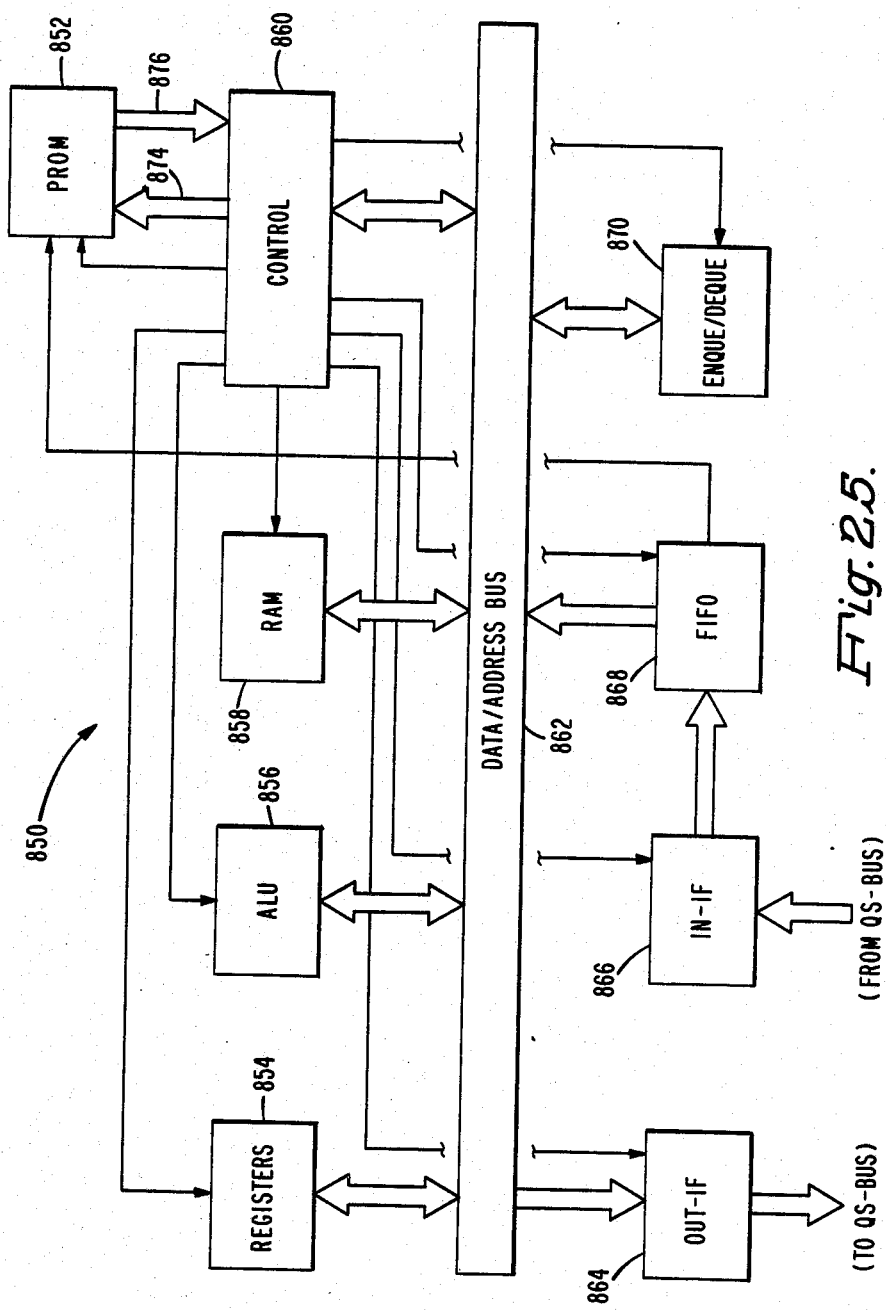
FIG. 25 is a block diagram of the architecture of a queue sequencer in accordance with the invention.

FIG. 25 shows block diagram 850 describing the architecture of the queue sequencer. Control 860, registers 854, ALU 856, and RAM 858 are each coupled with internal data/address bus 862. PROM 852 is coupled with control 860 via instruction bus 876 and address bus 874. These blocks perform essentially the same functions as described above with regard to the switching processor. RAM 858 in FIG. 25 is shown as an internal part of the queue sequencer. In FIG. 21, QM 602 is shown conceptually as a separate memory component apart from the queue sequencer. The description in FIG. 25 is a preferred embodiment.

The queue sequencer interfaces with the switching processor via the queue sequencer bus, denoted as QS-BUS in the drawing. This interface is divided into two portions, input and output. Output interface, OUT-IF 864, is coupled with data/address bus 862. Input interface, IN-IF 866, is coupled with first-in first-out buffer, FIFO 868, which acts as in input buffer between the switching processors and queue sequencer. Various switching processors independently issue requests to the queue sequencer.

Whenever a switching processor gains access to the queue sequencer bus, it stores a request on "top" of FIFO 868. Whenever the queue sequencer completes processing a request, it obtains its next control from the "bottom" of FIFO 868, if there is one. If there are no requests in FIFO 868, the queue sequencer awaits receipt of a request in an idle loop.

FIFO 868 stores requests from the various switching processors in first-come first-serve order within priority groups. These FIFOs may be implemented using commercially available FIFO integrated chips and control logic. The output of each FIFO is the next pending request. This request is mapped through a look-up table into an address in PROM 852, which is used by control 860 as a jump address to the microcode routine corresponding to that request. Queue sequencer 850 contains two sets of FIFOs: one for normal priority requests, and another for high priority requests. If there is any request in the high priority FIFO, its output is taken as the next pending request. Otherwise, the output of the normal priority FIFO is used.

Enque/Deque 870 contains logic which is used to update the index of pending work for each destination of an output queue. When a burst is enqued to a destination which has no other bursts of that burst type pending, a bit corresponding to the burst type must be set in the index for that destination. This is done by decoding the burst-type field, ANDing the result with the index, and storing the final result as the index. When an output processor requests a deque, Enque/Deque 870 performs two tasks. First, the highest priority burst type pending must be extracted from the index register; this may be done using a priority encoder and a decoder. Second, the bit corresponding to the burst type in the index register must be reset if the burst being dequed is the last one pending of that burst type. This may be done by ORing the index with the complement of the highest priority burst type pending. The operations performed by the Enque/Deque logic could also be performed by control 860 in several instructions, or could be done using a custom ALU with the described operations incorporated into the logic.

In the queue sequencer, PROM 852 has 256 words, each word having a length of 64 bits. The speed and decoding advantages realized from the length of the instruction word are the same as described for the programmable read only memory of the switching processor. RAM 858 includes 2,048 bytes of data memory. Two types of information are stored in RAM 858, as follows: administrative information on each buffer in character memory; and administrative information on each queue in the switching processor memories.

The arithmetic and logical operations of ALU 856 include means for incrementing and decrementing. Registers 854 access eight-bit internal data and address buses 862. The queue sequencer registers are specified in Table 3 as follows.

TABLE 3

Queue Sequencer Registers

| No. | Abbrev. | Name | Bits | To DB* | From DB* | To AB** |
|---|---|---|---|---|---|---|
| 1 | AND | Removes bit from IREG | 8 | X | | |
| 2 | BTYP | Burst Type | 3 | | | X |
| 3 | BUFF | Buffer Register | 8 | X | | X |
| 4 | BUFO | Buffer Out Register | 8 | | X | |
| 5 | CNTR | Counter | 8 | X | | |
| 6 | DREG | Data Register | 8 | X | X | X |
| 7 | IREG | Index Register | 8 | | X | X |
| 8 | MMEM | Main (Local) Memory | 8 | X | X | |
| 9 | QUEUE | Queue Register | 8 | | | X |
| 10 | SEQU | Data Out Field in Microword | 8 | X | | X |
| 11 | TEMP | Temporary Register | 8 | X | X | X |

TABLE 3-continued

Queue Sequencer Registers

| No. | Abbrev. | Name | Bits | To DB* | From DB* | To AB** |
|-----|---------|------|------|--------|----------|---------|
| 12  | XNOR    | Adds bit to IREG | 8 | X | | |

*DB = Data Bus
**AB = Address Bus

Figure 25A:
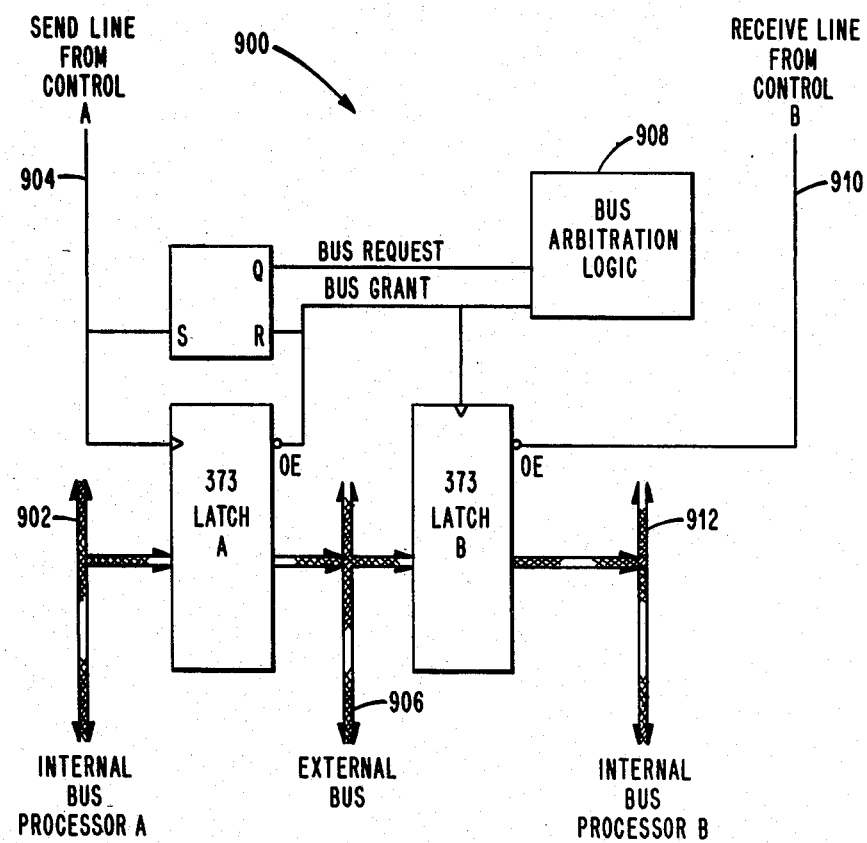
FIG. 25A is a block diagram of an interface circuit employing handshaking logic which, with appropriate adaptation, may be used as any of the interfaces in the switching processor or queue sequencer.

In order to reduce the load on the central control of the switching processors and queue sequencer, the various interfaces of a link switch have been designed to perform bus transfers independently. This technique is known in the art. FIG. 25A is a block diagram 900 of an interface circuit employing handshaking logic which with appropriate adaptation may be used as any of the interfaces in the switching processor and queue sequencer.

FIG. 25A shows an interface between two processors A and B. To communicate with processor B, processor A places data to be sent on its internal bus 902 and activates send line 904. The timing of the transfer across external bus 906 is controlled by bus arbitration logic 908. To receive the data, processor B activates receive line 910 and reads the data from its internal bus 912.

This type of interface may be operated synchronously or asynchronously. It may be used to communicate between logic on different processors, as well as between buses, in which case latch A, latch B, or both might be replaced by a buffer. In FIG. 22, QS-IF 714 and CM-IF 718 are of the latter type. In FIG. 25, Out-IF 864 and In-IF 866 are also of the latter type.

The basic instruction set of the queue sequencer is listed in Table 5.

TABLE 4

Queue Sequencer Instruction Set mov - Move from:   register to register(s)
                   register to memory
                   memory to register(s)

Normal Jumps (jump address from microcode PROM):
jnu   Jump unconditionally
jne   Jump if equal
jnn   Jump if not equal
jng   Jump if greater than
jnl   Jump if less than FIFO Jumps (jump address from control in FIFO):
jfu   Jump unconditionally
jfe   Jump if equal
jfn   Jump if not equal
jfg   Jump if greater than
jfl   Jump if less than
nop   No operation
nst   Normal Strobe; get next normal control from FIFO
pst   Priority strobe; get next priority control from FIFO
inc   Increment buffer count parameter
dec   Decrement buffer count parameter
ein   Enable burst addition to index register
din   Enable burst removal from index register The operation of the queue sequencer is controlled by commands or requests placed in FIFO 868 by the various switching processors. Each request corresponds to a microcoded subroutine stored in PROM 852.

Upon startup, the queue sequencer initializes RAM 858. This task consists of setting all queues to idle, setting all buffers to idle, and placing all buffers on the free queue list.

The queue sequencer then enters its idle loop. In the idle loop, the queue sequencer queries FIFO 868 to determine if a request has arrived. When a request is present, a FIFO jump instruction is executed. This transfers control to the beginning of the microcoded routine which implements the particular request.

At the conclusion of a routine, FIFO 868 again is queried for the next request, if any. If there is another request, the proper FIFO jump is executed to implement the request. If there is no request the queue sequencer idle loop is resumed.

As has been described, the switching processor and queue sequencer work cooperatively to provide the speed advantage necessary to enable the link switch (or the link interface of the hub switch) to perform in-line integrated switching. The speed advantage is realized by judicious designs of architectures. The central memory has been divided into a character portion and an administrative portion thereby reducing memory contention. The queue sequencer has been designed to operate in parallel with the various switching processors and to perform specialized tasks relating to the administrative portions of memory.

The wide instruction format of the switching processor and the queue sequencer permits direct activation of processor signals without decoding delays. The wide instruction format permits more than one processor operation to be performed concurrently. A shorter instruction word would incur additional decoding delay, and it would support only one operation per instruction. The pipelined mode of operation with instruction fetch overlapping execution of the previous instruction increases the speed of operation over a non-pipelined mode of operation.

The specialized interfaces of the switching processor and queue sequencer will continue operating to conclusion, once started. Thus, neither processor is delayed as a result of input/output tasks. Special hardware is provided to speed actions which would require more time if performed in software. Examples of this specialized logic are the finite state machine, the various interfaces, and the enque/deque logic.

The architectures of the switching processor and queue sequencer have incorporated these features to optimize processing efficiency, so that the stringent time constraints of integrated in-line switching can be achieved.

Table 5 contains estimates of the speed-up factors of the switching processor resulting from the special architectural features of this processor. Table 6 contains similar speed-up estimates resulting from the specialized architecture of the queue sequencer. Table 7 contains speed-up estimates of the architecture of the link switch or link interface of a hub switch. The entries in these tables are rough estimates made in comparison with similar architecture employing a hypothetical typical microprocessor of the existing art having a 6 MHz clock and without specialized support hardware. The factors in these tables are neither independent nor mutually exclusive. Therefore, an overall speed-up factor for the in-line switching functions cannot be obtained by computing the product of various factors. These tables are offered as aids to understanding the architectures of the respective processors. Experience has shown that the overall speed enhancement obtained in the burst-switching embodiment is approximately twenty times. This substantial speed-up factor enables execution of the various in-line switching functions above described.

TABLE 5

Switching Processor Estimates of Speed-up Factors

| Feature | Factor | Mechanism |
|---|---|---|
| Reduced Instruction Set | 5 | Faster cycle time through No External Memory Access Simple Instructions Less Instruction Decoding Fewer Cycles per Instruction |
| Parallelism in Instructions | 2 | Fewer Instructions Required (by Approx. 50%) |
| Finite State Machine for Character and Channel States | 1.5 | Fewer Instructions Required (by Approx. 33%) |
| "Independent" Interfaces | 1.3 | No Need to Await Bus Grant in Software |
| Dual-port RAM 1.3 | No Need to Await Interrupt | from Queue Sequencer |

TABLE 6

Queue Sequencer Estimates of Speed-up Factors

| Feature | Factor | Mechanism |
|---|---|---|
| Reduced Instruction Set | 5 | Faster Cycle Time through: No External Memory Access Simple Instructions Less Instruction Decoding Fewer Cycles per Instruction |
| Parallelism in Instructions | 2 | Fewer Instructions Required (by Approx. 50%) |
| "Independent" Interfaces | 1.3 | No Need to Await Bus Grant in Software |
| Enque/Deque Hardware | 1.5 | In Critical Path: One cycle in lieu of 9 Instructions for Deque and 6 Instructions for Enque |

TABLE 7

Link Switch Estimates of Speed-up Factors

| Feature | Factor | Mechanism |
|---|---|---|
| Queue Sequencer | 2 | No Need for Switching Processors to Perform Serialization and Memory Management Functions |
| FIFOs on Queue Sequencer | 1.5 | No Need for Switching Processors to Await Queue Sequencer Readiness; Queue Sequencer may Balance Workload |
| Separate Queue Sequencer and Character Memory Buses | 1.3 | Parallel Access to Memories Less contention on Each Bus |

The switching processor and queue sequencer are special purpose sequencers. Both have microprograms which control a number of specialized registers, RAMs, and other hardware structures. The microprograms also contain flow-of-control information to direct jumps and branches. The microprogram format is specific to the hardware being controlled; there is a bit or a group of bits to control each hardware function.

Figure 27:
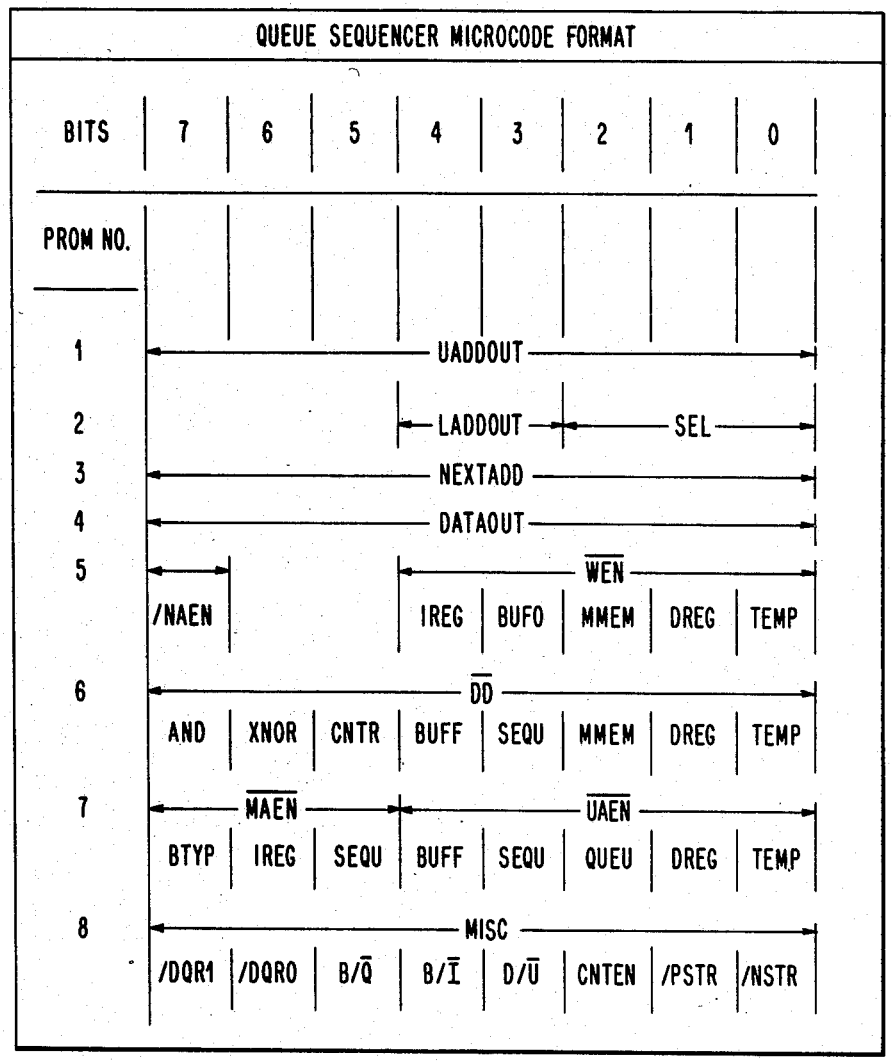
FIG. 27 is a diagram showing the microcode format of the switching processor.

The microcode format for the queue sequencer is shown in FIG. 27. The microcode is 64 bits wide, and is organized as eight 8-bit bytes. The first byte is the Upper Address byte, which is used to address the queue sequencer's local memory through the address bus. This bus can also be controlled through a register, in which case the Upper Address Out byte is all ones. The second byte of the Microcode contains a Lower Address Parameter (LADDOUT) and a select code. The Lower Address parameter is used to address the local memory. The Select code determines where the next microcode address will come from, essentially controlling jumps and branches.

The third byte of the microcode contains the NEXTADD parameter. This is used only when jumping, and contains the address of the instruction to be jumped to. The fourth byte contains immediate data to be placed onto the data bus. This allows constants to be introduced into any of the registers from the microcode. The fifth byte of the microcode contains a NAEN bit and five write enable bits. The NAEN bit controls case branches: when the bit is active, the next microcode address is taken from a mapping PROM which contains the next 'routine' to be executed. This is analogous to fetching and decoding an instruction in a microprogrammable computer. The write enable bits control the writing of information into registers. When any of these bits are active, whatever is on the data bus is written into the designated registers. Any number of registers may be written into simultaneously. There are five write enables WENs: Index Register, IREG; Buffer Out Register, BUFO; Main (Local) Memory, MMEM; Data Register, DREG; and Temporary Register, TEMP.

The sixth byte of the microprogram word contains Data Read Bits. Under control of these bits, the information in a register is placed onto the data bus. Only one register may be read at a time. There are eight data bits: the contents of the AND circuitry (AND removes a bit from the index register); the XNOR circuitry (which adds a bit to the index register); the Counter, CNTR; the buffer register, BUFF; the DATAOUT field in the microprogram word, SEQU; the Memory output, MMEM; the data register, DREG; and the temporary register, TEMP.

The seventh byte of the microprogram word contains Upper Address and Middle Address bits. Under the control of these bits, information from a register is placed on the Address Bus, UAENs, or part of the address bus, MAEN. Only one UAEN or MAEN may be active at any given time. The three middle address registers are: burst type register, BTYP; index register, IREG; and data from the sequencer, SEQU. These place data on the three least significant bits of the address bus. The five upper address enables place data on the entire address bus. These are: buffer register, BUFF; sequencer data, SEQU; queue register, QUEUE; data register, DREG; and temporary register, TEMP.

The eighth byte of the microcode word contains miscellaneous control bits. DQR1 and DQR0 signal the completion of deque requests to LOP1 and LOP0 respectively. B/Q controls the most significant local memory address bit, thus addressing either buffer parameters or queue parameters. B/T controls the selection of either the index register or the burst type register for the manipulation of the queue index (which keeps track of pending work by priority). D/U determines whether the counter counts up or down, for manipulation of the buffer count for LIPs and LOPs respectively. CNTEN controls the action of the counter.

PSTR and NSTR strobe the output register of the high priority and normal priority FIFOs respectively.

Figure 26:
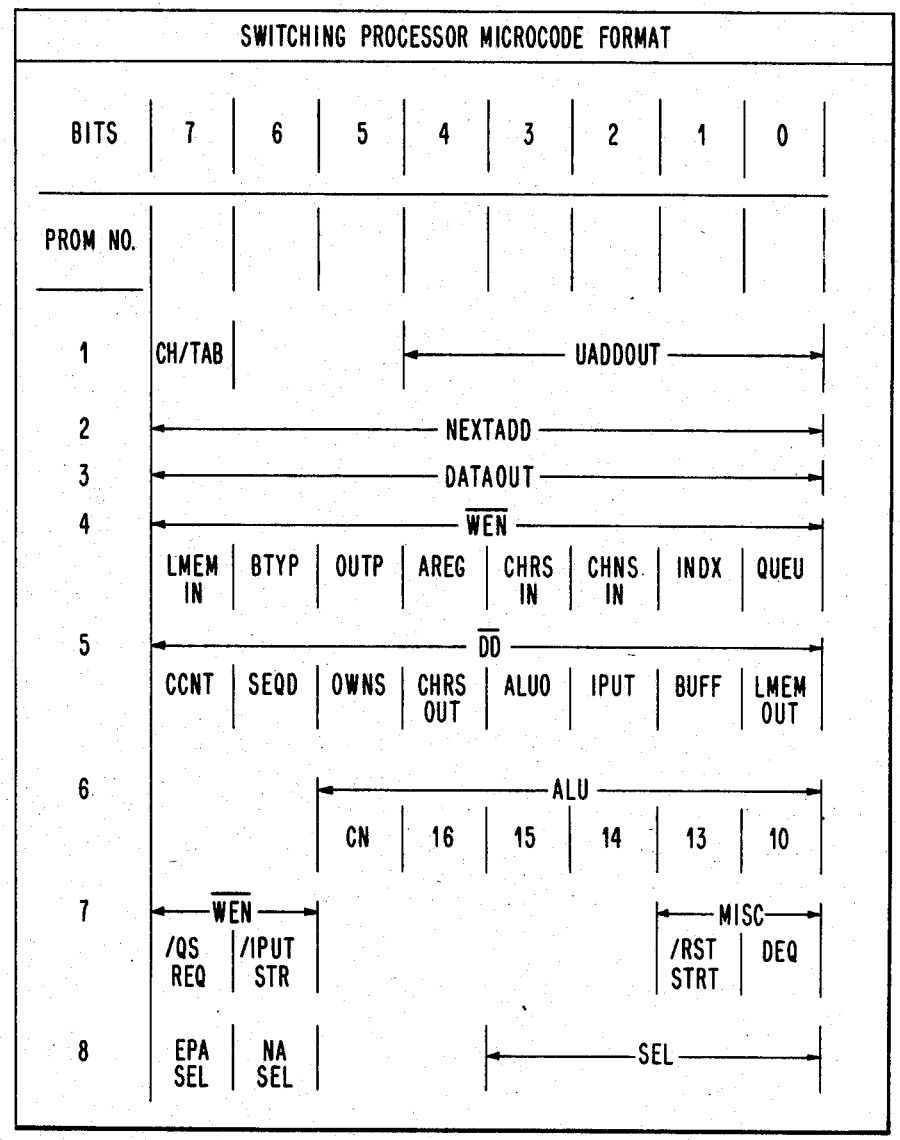
FIG. 26 is a diagram showing the microcode format of the queue sequencer.

FIG. 26 shows the microcode format for the switching processor. The format is similar to that of the queue sequencer, but differs in the function of many of the bits. The first byte contains the Address Out data, which is only five bits for the switching processor. The most significant bit of this byte controls the most significant address bit of the local memory, thus addressing either the channel parameters or the switching processor's routing table. The second byte of the microcode contains the next address field, and the third byte is the data field. These are analogous to the same fields in the queue sequencer microcode.

The switching processor microcode has ten write enable bits: eight in byte 4, and two in byte 7. They allow data to be written from the data bus into ten different places: the local memory, LMEM IN; the burst type register, BTYP; the output register, OUTP; the Arithmetic Logic Unit's input register, AREG; the character status register, CHRS IN; the channel status register CHNS IN; the index register, INDX; the queue register, QUEU; the queue sequencer request latch, QS REQ; and the input strobe latch, INPUT STR.

The fifth byte of the microword contains the data enable controls. These are seven bits which allow data to be transferred from a register to the data bus. The seven registers are: the data from the microword DATAOUT field, SEQD; the switching processor's local address switch, OWNS; the character status out register, CHRS OUT; the ALU output register, ALUO; the input register, IPUT; the buffer register, BUFF; and the local memory, LMEM OUT.

The sixth byte of the microword controls the switching processor's Arithmetic Logic Unit. This involves a 6-bit coded control word which direct the ALU to add, subtract, shift, XOR, or perform another function. The seventh byte of the microword contains two write enables, a reset of the channel start latch, REST STRT; and a deque request latch control, DEQ. The eighth byte contains bits to control the sequence of instructions. These are: a bit which brings the next address from the NEXTADD field in the microword, EPA SEL; a bit which selects the next address depending on the character and channel status, NA SEL; and four bits which control conditional jumps based on feedback from other parts of the switching processor, SEL.

In order to facilitate the development of microcode, custom assemblers have been implemented for the queue sequencer and switching processor. These assemblers take as input an assembly code routine and output microcode in the formats described above. The format for the assembly code is similar for the switching processor and queue sequencer. Assembly statements either generate an entire microword or part of a microword. As long as assembler output statements do not contend for the same microcode bits, these statements may be incorporated in the same microword.

Figure 28:
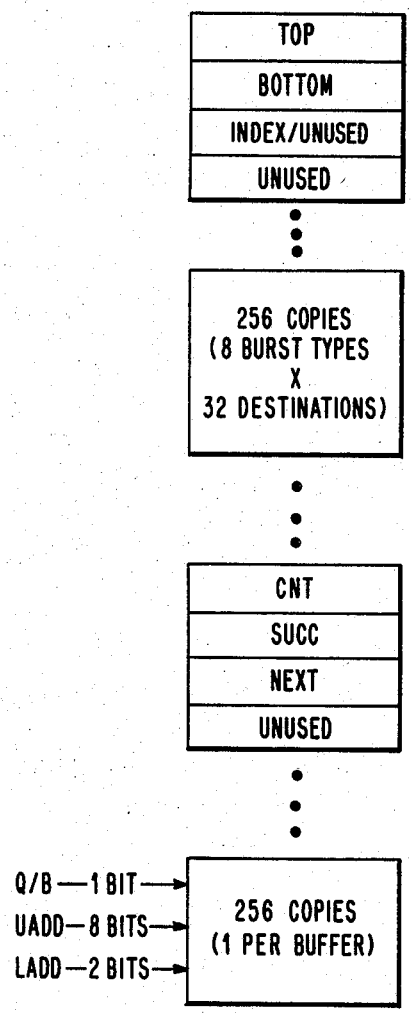
FIG. 28 shows the memory configuration of the queue sequencer.

The addressing of memory is different for the queue sequencer and the switching processor, reflecting the difference between their memory formats. The memory configuration of the queue sequencer is shown in FIG. 28.

The queue sequencer's local memory holds parameters for each buffer in the shared memory, and for each queue. This is reflected in the addressing syntax for the memory: buffer parameters are addressed by (b.****), while queue parameters are addressed by (q.*****).

There are three buffer parameters: the count of characters in the buffer (cnt), the successor to this buffer in a given burst (succ), and the next buffer on the same queue as this one (next). These parameters are addressed by the lower address bus, and are usually addressed by symbolic constants ($cnt, $succ, $next). The buffer being examined is addressed through the upper address bus, and may be address with a constant or with the content of a register. For example, the statement:

mov -dreg=(b. -buff . $cnt );

moves the count parameter of the buffer in the buff register (usually the current buffer for a given channel) into the data register.

Queue parameters are addressed through the middle address bus. This splits the upper address bit into the five most significant bits, which address a particular queue by destination (output link or port), and the three least significant bits, which address a queue by the burst type. Each queue has three parameters: a queue bottom (bot) holding the address of the last burst in the queue, a queue top (top) containing the address of the first (oldest) burst in the queue, and a queue index (indx), which keeps track of which burst types for a given destination have active burst on them. The index is active only in burst type 0, and so is usually addressed with a constant: (q. -queue. #0000. $indx). The top and bottom parameters are usually addressed through two registers: one for the destination, and one for the burst type. For example, the statement:

mov (q. -queue . -typ. $bot)=-buff;

moves the contents of the buffer register into the bottom parameter of the burst type in the burst type register under the queue in the queue register. Normally, this would add the current buffer to the bottom of the current queue. The queue parameters may also be addressed with constants, so that the statements mov -temp=(q. #0001 . -btyp . $bot);
mov -temp=(q. -queu . #0002 . $bot);
and
mov - temp=(q. $freeq. $top);

are valid statements.

Figure 29:
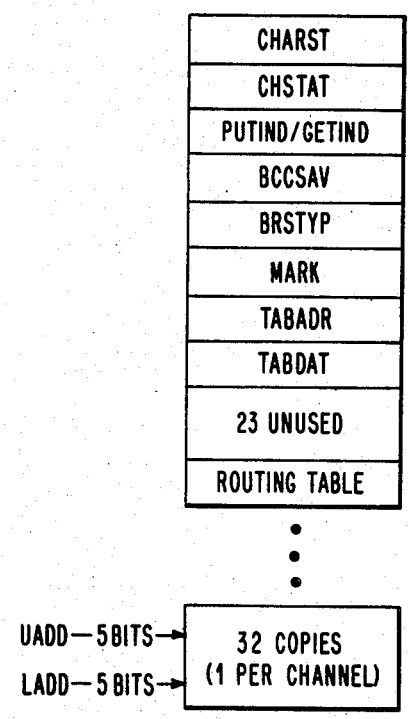
FIG. 29 shows the memory configuration of the switching processor.

The switching processor has a different memory address format, and consequently the syntax of move statements for the switching processor is slightly different. The memory configuration of the switching processor is shown in FIG. 29.

The switching processor's local memory is addressed by two address buses. The upper address bus is controlled directly from the microword, and addresses one of ten parameters. Nine of these parameters are specific to a given channel: the status of the character coming in on the channel (charst : whether a FLAG or DLE character has been encountered); the status of the channel (chstat: beginning or end of a burst, etc.); the index of the next character in the active buffer (putind for LIPs and PIPs, getind for LOPs and POPs); the error control parameter (bccsav); the routed/not-routed indicator (mark); the queue on which to place a new burst (outprt); and the routing table address to be changed with the data to change it to (tabadr and tabdat). One more address on the upper address bus controls the routing table entries. These entries are used to determine which communications link to route a burst onto, and are changed in the event of a link outage.

The switching processor's local memory is also addressed by the lower address bus. For all of the channel parameters, this is automatically controlled by the channel counter. When accessing the routing table, however, the lower address bus is controlled by the index register. Thus, the instruction mov ($charst)=-chrs;

moves the contents of the character status register into the local memory at the address for the character status parameter for that particular channel. In this way, the hardware of the switching processor may be used for other channels, while the parameters for that particular channel are saved for use in the next frame time. On the other hand, the statement mov (-indx )=#0001;

moves the constant "1" into the routing table location addressed by the index register. This location is independent of the channel number. Therefore, the same routing table is available to all channels as a common resource.

Jump statements control the order of execution of microwords. This is done by loading a value into the microaddress counter depending on a particular condition. All jumps take two cycles to be executed, thus the statement after a jump statement is executed whether or not the jump is "taken."

There are two forms of jump statements: normal jumps, and FIFO jumps. Normal jump statements take the branch address from the NEXTADR field in the microword. The format of the normal jump is:

jn* $location;

FIFO jumps take the branch address from other hardware. In the queue sequencer, the address is taken from a set of FIFOs; this results in the next request being serviced according to a priority tree. There are three priorities: deque, high priority, and low priority. Within a priority, requests are serviced on a first-come first-serve basis. In the switching processor, the address is taken from a PROM which is part of a finite state machine. The finite state machine controls the sequencing of tasks for each channel. For example, after the second byte of a burst was processed in a particular channel, the finite state machine would indicate that the third byte was next, and control the branching to the appropriate microcode. The format of the FIFO jump statement is:

jf*;

For both types of jump statements described above, the * denotes a condition symbol. If a particular condition is met, the jump is executed. Otherwise, the microcode address counter is incremented, and the next (sequential) instruction is executed. Different conditions are available for the queue sequencer and the switching processor. For the queue sequencer, the available conditions are:

|     | SEL                              |
|-----|----------------------------------|
|     | 00 fall through to next instruction |
| jnu | 01 unconditional jump            |
| jne | 02 jump if equal                 |
| jnn | 03 jump if not equal             |
| jng | 04 jump if greater than          |
| jnl | 05 jump if less than             |

These are based on the result of a comparison of the contents of the data register with some ABSOLUTE VALUE.

For the switching processor, the conditions are taken either from the ALU status register or from some external hardware line. The available conditions for the switching processor are:

|     | SEL                              |
|-----|----------------------------------|
|     | 00 fall through to next instruction |
| jnu | 01 unconditional jump            |
| jne | 02 jump if equal                 |
| jnn | 03 jump if not equal             |
| jnw | 04 jump if wait flag active      |
| jnb | 05 jump if no buffer             |
| jns | 06 jump if not start of channel  |
| jnq | 07 jump if queue sequencer acknowledges |
| jnc | 08 jump if shared memory acknowledges |
| jnl | 09 jump if LIP or LOP            |

For example, the instruction sequence:

%loop jns $loop ;
    nop ;

constitutes a loop until the start of the next channel. A nop statement represents a no-operation, and takes up one instruction cycle.

There are a few specialized instructions available for the queue sequencer and the switching processor. For the queue sequencer, these instructions are:

nst;
pst;
inc;
dec;
ein;
din;

The "nst" instruction strobes the output register of the normal-priority FIFO, thus latching the next request into the output register. The "pst" instruction strobes the output register of the high priority FIFO. An "nst" must be executed by a normal priority routine, and a "pst" by a high priority routine, or else the contents of the FIFO output register will remain unchanged and the same request will be serviced many times. The "inc" instruction increments the counter, and "dec" decrements the counter; these are used for manipulating the count parameter of a buffer. The "ein" instruction enables the addition of a burst to the index register, while "din" enables the removal of a burst. The index register is used to keep track of which queues have work to do for a particular destination; it is important to update it whenever a new burst is added to a queue or an old burst is removed.

The switching processor has special purpose instructions which are specific to it. These are:

rst;
bst;
mov -outp :=-input;
alu $operation;
req $request;

The "rst" instruction is used to reset the channel strobe latch; every switching processor routine must do this, or miss the start of the next channel. The "rst" instruction strobes the input into the input register; for LIPs and PIPs, this latches the input from the incoming link or port; for LOPs and POPs, it requests a character from shared memory. Writing into the output register, though done with a conventional move statement, has a special purpose as well. For LIPs and PIPs, it initiates a write into shared memory; for LOPs and POPs, the output is sent to the outgoing link or port.

The "alu" instruction in the switching processor is used to control the Arithmetic Logic Unit. This ALU responds to a number of codes by performing an operation between its 15 register (-areg) and Q register (internal), and placing the result in its output register (-aluo). The available ALU operations are:

| alu | $inc;   | increment areg, output to aluo |
| --- | ------- | ------------------------------ |
| alu | $incq;  | increment areg, output to aluo and qreg |
| alu | $atoq;  | transfer areg contents to qreg |
| alu | $exor;  | perform exclusive OR of areg & qreg |
| alu | $and;   | logical and of areg and qreg, output to aluo |
| alu | $andq;  | logical and with output to aluo and qreg |
| alu | $decq;  | decrement areg, output to aluo and qreg |

The "req" instruction requests work of the queue sequencer. This is done by sending the request along with a switching processor ID, a channel number, and a buffer parameter across a shared bus, and latching it into the FIFOs of the queue sequencer. There is a request parameter for each routine that the queue sequencer can perform. For example, the instruction
req $incsim;
requests that the queue sequencer increment the count parameter of the buffer associated with that channel of that switching processor.

The queue sequencer microcode is organized as a collection of routines, each of which services a request from a switching processor. Requests are chosen from the highest priority FIFO which has pending work. At the end of each routine, a jfu instruction is executed, which jumps to the next pending request. Thus, the queue sequencer executes a number of routines in series until there is no work to be done, at which time it executes a wait loop. There are presently 15 different routines as shown in Table 8.

TABLE 8

| Queue Sequencer Requests | |
| --- | --- |
| Routine | Definition |
| incsim | simple increment count |
| incunc | increment w/getbuf |
| incunl | incunc w/enque |
| inccon | inc, conditional getbuf |
| inccre | inc, conditional reset |
| incenq | increment and enque |
| reset | reset count |
| requn | reset, getbuf, enque |
| resenq | reset and enque |
| deqpri | priority deque (LOPO/1) |
| deqnrm | non-priority deque=POP |
| deccon | decrement, cond. chain |
| putbuf | return buffer to freeq |
| getbuf* | get buffer for the LIP |
| setbuf* | set buffer parameters |

*routine is used only in initialization

Only one request may be posted in any channel time from each switching processor. LIPs or PIPs may post an incsim, incunc, incunl, inccon, inccre, incenq, reset, requn, or resenq request. LOPs may post a deqpri, deccon, or putbuf request, while POPs may post a deqnrm, deccon, or putbuf request. In this way, the queue sequencer is always able to process a request within a frame time of its posting. Deqpri has the highest priority, those routines which enque a buffer for a LOP (incunl and incenq) have the second highest priority, and all other routines have low priority.

At the end of each routine, parameters are written into the appropriate switching processor's dual-port buffer memory for the appropriate channel.

Each switching processor executes a different set of microcode depending on whether it is a LIP, LOP, PIP, or POP. The structure of the microcode is similar for all of these. Each channel is handled independently within a channel time. During this time, parameters from the local memory are read out, requests are made to the queue sequencer, characters are inputted, processed, and outputted, and parameters are stored in local memory for the same channel in the next frame.

Figure 30:
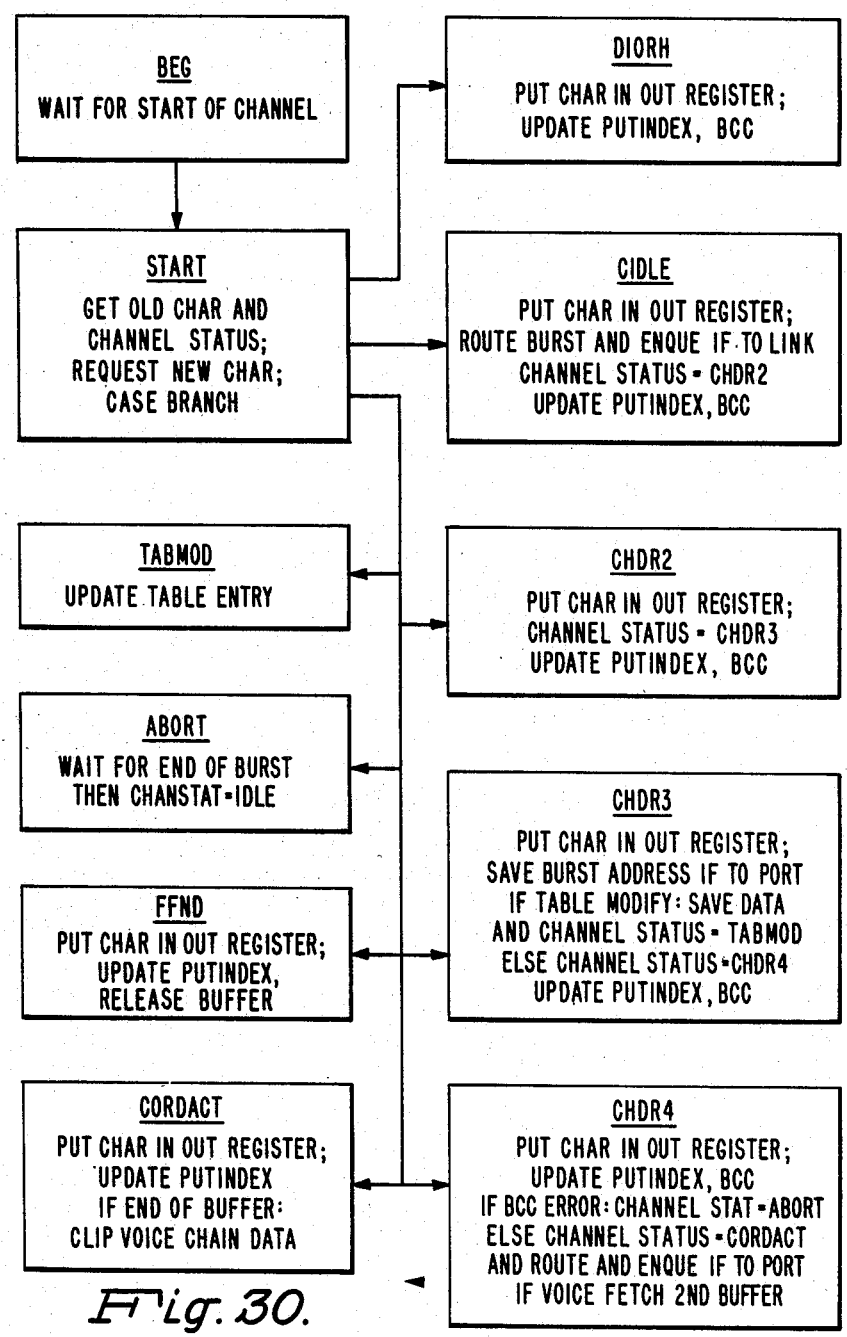
FIG. 30 is a functional flowchart for the input processors of a link switch.

FIG. 30 is a functional flowchart of the input processors of a link switch. The LIP and PIP microcode is organized as a common section of code which then branches to a specific routine via a jfu instruction. The common code loops until the beginning of a channel time, loads the character status and channel status registers from the local memory, and stores the output of the character status finite state machine into the local memory. Each routine inputs a character from the communications link or port, does the appropriate processing, puts the character into shared memory, requests queue handling from the queue sequencer, calculates the routine to be executed in the next frame time, and stores this information in local memory.

Figure 31:
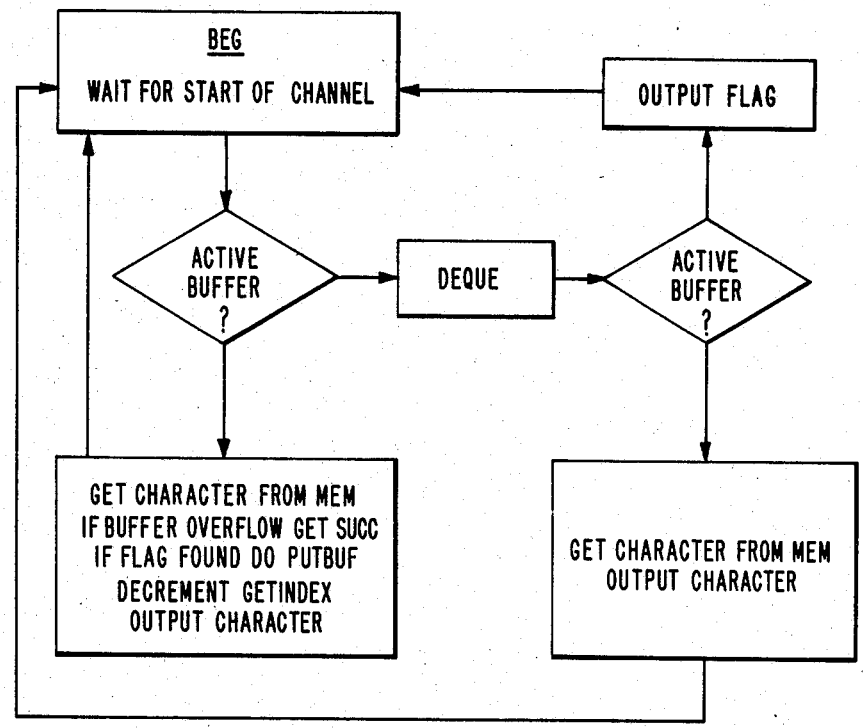
FIG. 31 is a functional flowchart for the output processors of a link switch.

FIG. 31 is a functional flowchart of the output processors of a link switch. The LOP and POP have somewhat simpler tasks than the LIP and PIP. The LOP need only find a burst intended for the output link or port and output the next byte of the burst. When no burst is available for output, a FLAG character is sent. In the case of a LOP, the time constraint is tight; hence the deque has highest priority. In the case of a POP, the time constraint is not as severe and a low priority deque may be used.

The queue sequencer handles requests from all switching processors in a two-type priority. The first type is for processing and is based on the type of request; the second type is for access and is based on the identity of the switching processor.

There are three priorities in the requests: deque requests, priority requests, and normal requests. Priority and normal requests are serviced on a first-come first-serve basis within their type. Normal requests are not serviced until all priority requests have been completed. The deque requests are generated by the link output processors, and they are assigned the highest priority so that they will be serviced in the same channel as they are made. Since deque requests are serviced in the same channel, there is no need for the switching processor to transfer identification to the queue sequencer. Priority and normal requests are loaded into FIFOs to be serviced when the queue sequencer has time for them. These requests must be accompanied by their IDs, which include the switching processor number and the channel in which the request is made, so that the queue or buffer reply can be returned correctly.

The second tier of arbitration is by function of the processor. The LIP, LOP, PIP, and POP have been arranged in that order of priority. If there are multiple processors of any type in a switch, the priority within the type can be selected arbitrarily. The interface between the queue sequencer and the switching processors is asynchronous and prioritized. A switching processor that has the bus grant loads the request and its ID into the FIFO on the queue sequencer.

The queue sequencer is primarily a Register Transfer Machine with two arithmetic functions (Increment and Compare) and two logic functions (AND and XNOR). There is no accumulator in the machine. Almost all bits are linearly encoded except for the condition code select field in order to achieve maximum speed of operation. Other than consecutive processing, there are only two program control instructions: conditional and unconditional jumps.

Both the queue sequencer and switching processor have a pipelined instruction register which allows automatic instruction prefetch. The instruction prefetch increases the performance of sequential processing and adds an additional instruction while taking a successful jump. Although it becomes necessary sometimes to insert a no-op instruction, often useful work can be done with the prefetched instruction before a successful jump.

After initialization, which sets all queues to empty and returns all buffers to the free queue, the queue sequencer goes into a small two-instruction loop (the second instruction is a no-op caused by instruction prefetch) waiting for switching processor requests to come through the FIFO. When a request has been found, the queue sequencer jumps to the appropriate microcoded subroutine to handle the request. At this point, it no longer needs the request, but the identification (ID) of the requesting switching processor is required. Early in the subroutine, a strobe is issued to the appropriate FIFO to make way for the next request. While strobing, the current request ID is clocked into a buffer register.

There is a local memory in the queue sequencer where it keeps the status of the buffers and queues residing in the character memory. All bursts that go on communications links are prioritized, based on their type, into eight possible priorities (voice, data, and control being examples of these types). There may be as many as eight link queues corresponding to eight priorities for each communications link.

Four locations are dedicated for the status of each buffer, and hence there are two lower address bits. The buffer status contains the byte count, next, and successor buffer linkage information. The queue status contains the top and bottom pointers to the queue. A priority index register is maintained in the zeroeth queue as status of the link queues. When a LIP receives a new burst of a certain type, it sets the corresponding priority bit in the index register not already set. Similarly, when a LOP requests the next task for an empty channel, the queue sequencer returns the task on the highest priority queue; if that queue is empty, the LOP clears the corresponding bit in the index register.

The queue sequencer is designed to run at 12.5 MHz. The switching processor is designed to run at 10 MHz.

Appendix A, entitled *Burst-Switching Microcode*, contains the microcode with comments for the queue sequencer and various embodiments of the switching processor, e.g., LIP, LOP, PIP, POP, etc.

PORT CIRCUIT

The purpose of a port circuit or port-interface circuit in a burst-switching system is to transform the signal form of the link-switch port to the particular signal form of the port user, and conversely. Thus, analog telephones, digital telephones, data devices, analog trunks, etc., each will require its own type of port circuit wherein the characteristics of its signal are transformed to the common burst port-signal form. While port circuits for various types of devices will differ, all will include processing means for creating and terminating bursts, silence/voice detection, and other control functions.

In the following, the port circuit for an analog telephone is described. Thereafter, the relationships of other types of port circuits to the analog-telephone port circuit will be described.

Figure 32:
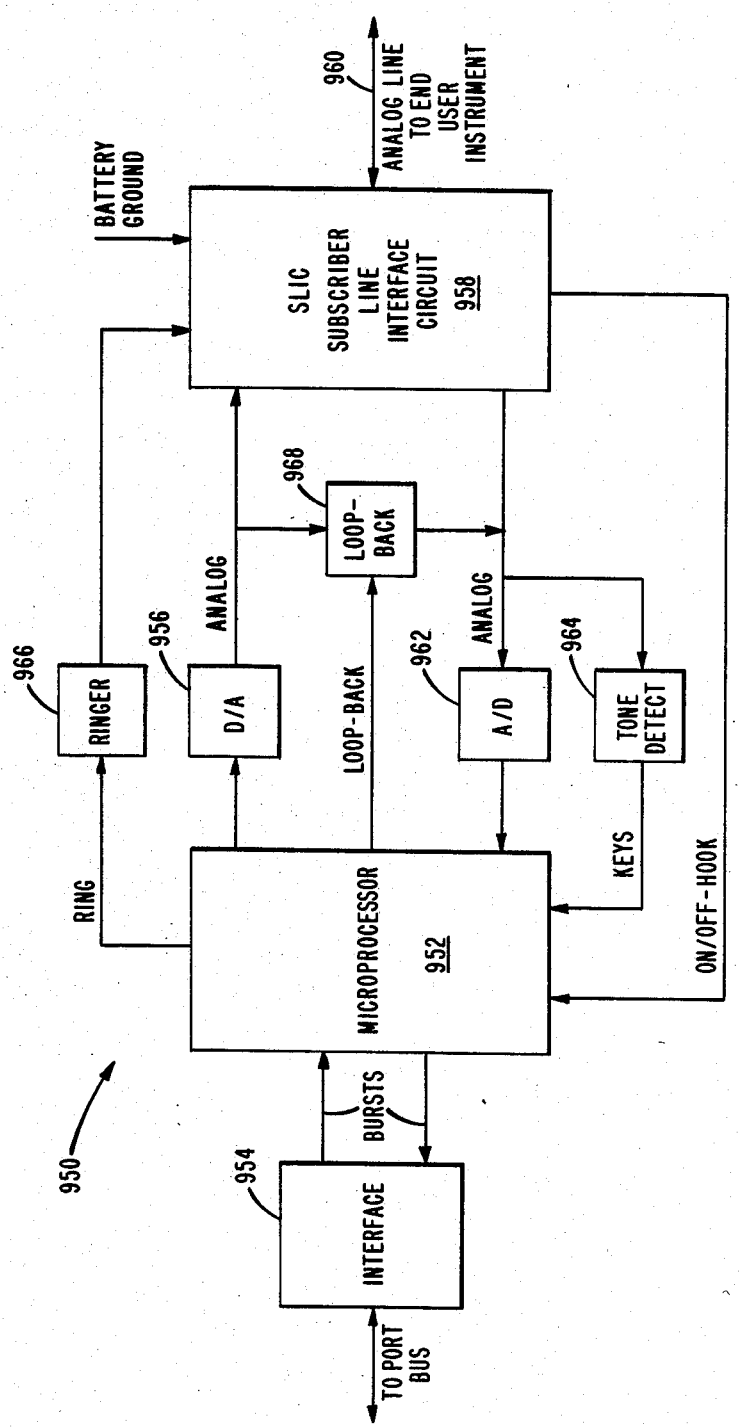
FIG. 32 is a block diagram of a port circuit for an analog line which may be employed as a component of a link switch as shown in FIGS. 3 and 6.

In FIGS. 3 and 6, port circuits 178 and 258 respectively are shown as being coupled with ports of link switch 132. FIG. 32 shows a block diagram of an example of a port circuit 950 for an analog line which may be employed as either port circuit 178 or port circuit 258.

In FIG. 32, some of the so-called BORSCHT functions are contained in port circuit 950. This is consistent with the highly distributed control feature of a burst switch. The term "BORSCHT" is a mnemonic which represents the standard functions traditionally associated with a line card in a digital switching system. These functions are as follows. "B", is for Battery feed: supplies the direct-current bias or loop current to the subscriber instrument; "O", is for Overvoltage protection: protects against damage by high-voltage transients, such as those induced by lightening strikes near the transmission line; "R", is for Ringing: controls the ringing signal induced on the subscriber line; "S", is for Supervision: monitors the line to detect various subscriber instrument conditions; "C", is for coding: codes the subscriber's voice signal into digital characters and conversely; "H", is for Hybrid: performs the two-to-four wire conversion required between the two-wire subscriber line and the four-wire coding section; and "T", is for Test: performs tests, e.g., on the subscriber line, to determine fault conditions. For a more detailed explanation of the BORSCHT functions, see *Designer's Handbook of Integrated Circuits*, Arthur B. Williams, Editor in Chief, McGraw-Hill Book Company, 1984, Chapter 4.

Bursts of every type from port circuit 950 pass byte-by-byte between the port bus and microprocessor 952 through interface 954. Interface 954 matches the characteristics of the port bus to the bus of microprocessor 952. A commercially available microprocessor, such as the Zilog Z80A, will suffice as microprocessor 952.

The bytes of an incoming voice burst arriving at microprocessor 952 will be delivered to Digital-to-Analog (D/A) converter 956. D/A converter 956 produces a continuous analog signal which is transmitted to SLIC 958.

Subscriber Line Interface Circuit (SLIC) 958 is a commercially available circuit which performs many of the BORSCHT functions, including the hybrid or four-to-two wire conversion function, battery feed or powering of the telephone, application of ring voltage to the line, and off-hook detection. The reformulated analog signal is applied to the two-wire analog line 960 by SLIC 958.

The analog signal arriving from the end-user instrument, e.g., a telephone, on analog line 960 passes through SLIC 958 and is applied to the Analog-to-Digital (A/D) converter 962. A/D converter 962 digitizes the signal and provides a character stream to microprocessor 52. Microprocessor 952 continuously executes a voice/silence detection algorithm against this stream. If microprocessor 952 determines that information energy is present, e.g., the user is speaking, it declares a burst, prefixes a header, sends the bytes of the burst via interface 954 to the port bus, and appends a terminator or termination sequence at the end of the burst. The D/A and A/D converters, taken together, are often referred to as the "codec," for coder/decoder. Thus, burst origination and termination occur in the port circuit. This feature is of particular importance when the port circuit is moved from the vicinity of the link switch to the vicinity of the user, ultimately within the end-user instrument itself. Burst-switching architecture supports digital transmissions from origin-user to destination-user including a digital telephone.

Voice/silence detection algorithms are known in the art. Since the detection algorithm operates on a digital signal, digital speech interpolation (DSI) algorithms are appropriate. For an example of a DSI algorithm, see S. J. Campanella, *Digital Speech Interpolation,* Comsat Tech. Rev., Vol. 6, No. 1, pp. 127–158, Spring, 1976. Also, equivalent TASI (Time Assignment Speech Interpolation) techniques known in the art are applicable.

When certain conditions arise in port circuit 950, microprocessor 952 creates a control burst and sends it through interface 954 to inform higher level processors of these conditions. Such conditions include on-hook or off-hook detection, and tone detection from tone detector 964. Upon receipt of an analog tone, such as a key tone, tone detector 964 supplies a digital encoding of that tone to microprocessor 952. An example of a suitable tone detector is GTE Microcircuits, Part No. G8870A.

When microprocessor 952 receives a control burst from interface 954, it may take various actions depending upon the control burst type. It may turn on ringer 966 which generates a 20 Hertz ring voltage which causing a telephone attached to the line to ring. It may cause a sequence of bytes representing an analog tone to be read from the memory of microprocessor 952 to be sent to D/A converter 956 which will cause a tone, e.g., a dial tone or a busy signal, to be heard at the telephone. The control burst may also cause the D/A output to be connected directly to the A/D input through loop-back circuit 968 which enables comprehensive remote diagnostic capability in a burst-switching system.

Looping the port circuit back provides means for a comprehensive test mode. A voice burst received from interface 954 will be reflected back as a voice burst to the interface, having been routed through the following circuit components: interface 954, microprocessor 952, D/A converter 956, loop-back 968, A/D converter 962, microprocessor 952, and interface 954. The voice burst received by a higher level processor may be compared (digitally) with the one sent, and the operability of these components determined. Also, tones received by tone detector 964 may be compared to tones sent from microprocessor 952, so that the operability of tone detector 964 may be monitored.

This testing capability leaves analog line 960 untested. Port circuit 950 can be moved from the link switch to the vicinity of the analog end instrument, if port bus interface 954 is replaced by a digital-line interface. For example, if port circuit 178 of FIG. 3 is physically located near an analog end instrument, then port circuit 950 performs the functions of port circuit 258 shown in FIG. 6. The line to the vicinity of the subscriber (perhaps on the subscriber premises or even within the end-user equipment) becomes a digital line, and the entire line including the remote port circuit can be tested using loop-back circuit 968.

Port circuit 950 will serve a digital voice telephone if the hybrid and battery feed circuit within SLIC 958 is removed. The output of D/A converter 956 goes directly to the telephone earpiece, and the telephone mike output goes directly to A/D converter 952.

A port circuit suitable for a digital terminal would comprise interface 954 and microprocessor 952 of port circuit 950, plus a commercially available parallel-to-serial and serial-to-parallel converter called a UART (Universal Asynchronous Receiver Transmitter).

Port circuit 950 performs the functions of an existing art circuit-switched line circuit, which consists of the codec (D/A and A/D converters 956 and 962) and SLIC 958.

Port circuit 950 differs from existing art line circuits in at least the following respects:

1. It includes interface 954 which permits use of a digital line and remote placement of the port circuit.

2. It includes microprocessor 950 which permits interpretation of control bursts and silence/voice detection.

3. It includes a local ringer circuit 966 which permits local generation of ring voltage rather than the common generation of ring voltage for many line circuits.

4. It includes tone detector 964 which permits local-detection of signal tones rather than relying on a common tone detector shared across many line circuits.

5. It includes loop-back circuit 968 which permits remote testing of all of the port circuit except for SLIC 958.

DISTRIBUTED CONTROL

FIG. 1 shows burst-switching system 100 comprising a network of link switches interconnected by links. Bursts may enter and leave the network via ports coupled with end users. In system 100, suppose user X desires to communicate with user Y. A burst entering the network at X's port with Y's address in its header must be routed by the network to Y's port. This routing requires that each link switch have knowledge of the network, so that a link switch can transmit the burst toward its destination. More specifically, each link switch must have sufficient intelligence to determine from the burst header the following:

1. If the destination is not local to itself, which link leads most directly toward the destination port. In general, more than one link is connected to a link switch.

2. If the destination is local to itself, to which port should the burst be delivered.

The burst switch control comprises a set of microprocessors each appearing at ports of the network. Each control processor sends and receives messages called control bursts. There are three functionally distinct types of processors in the control: port processors, call processors, and administrative processors.

As has been described above, each system port has a port processor situated in the port circuit, e.g., a line circuit. A port processor may exchange control bursts with its call processor. A port processor may detect external signals, such as off-hook, tones, etc., in conjunction with other circuits in the port circuit; in response, the port processor sends control bursts. A port processor may receive control bursts from other control processors; in response, the port processor sends external signals, such as ring, tones, etc., in conjunction with other circuits in the port circuit. The nature of the external signals will vary depending upon the type of port circuit. In this way, a port processor acts as a converter between external signals and internal control bursts.

Each port circuit has a port processor. Since it is generally desirable to keep the port processor's memory small for economy reasons, the port processor program is not large. Variations in the kind of port, e.g., line, trunk, etc., are handled in the port processor so that the control burst interface is nearly the same for all types of ports.

The bulk of the higher-level logical functions in a burst-switching system is located in the call processors. Call processors handle call set-up, custom-calling feature execution, various maintenance tasks, etc. As a consequence of the diversity of tasks, the program memory of call processors may be quite large.

Each call processor has a port appearance. That is, the call processor appears to the switching network as if it were a data device. Its network appearance is that of a user computer. Yet, it is directly involved in the control of the switch itself, in ways that will be described below. A switch control generally will include a number of call processors: as many as the call-handling load, availability, and survivability of the switch require. A currently available microprocessor, such as a Motorola 68000, will provide ample processing capacity for the call processor.

A burst-switching system necessarily includes a number of administrative processes. For example, in a telephone system, typical administrative processes are directory-number to equipment-number translation, time and usage accumulation, recent changes, maintenance, etc. These processes are mainly database activities. Thus, administrative processes are characterized by large data-storage and moderate program-storage requirements.

In smaller systems, the administrative processes might be performed by the call processors. In larger systems, they likely will be performed by separate administrative processors. In larger applications, the administrative processors may comprise call processor hardware with large storage capability, requiring only a port interface as for call processors proper. Thus, a port of a link switch may be coupled with a user line or with a trunk to another communications system, these couplings including a port processor; or the port may be coupled with a call processor or administrative processor.

A burst-switch control will include as many administrative processors as the administrative-processing load, availability, and survivability of the system require.

As described, control comprises a port processor for each user port, some number of call processors, and some number of administrative processors. In the following, the discussion addresses how these elements perform the control function. The unifying principle is that of provision of service. All processors ultimately perform services for users. Port processors perform services for users directly; call processors perform services for port processors; and administrative processors perform services for call processors. In order to formalize the discipline between the various control processors, it is useful to introduce the notion of a "service set" associated with each processor. To this end, the following definitions apply:

service processor: a processor providing services to others;

service set: all for whom a processor performs services;

service set member: one for whom a processor performs services; and service set head: the processor which performs services for a service set.

Figure 33:
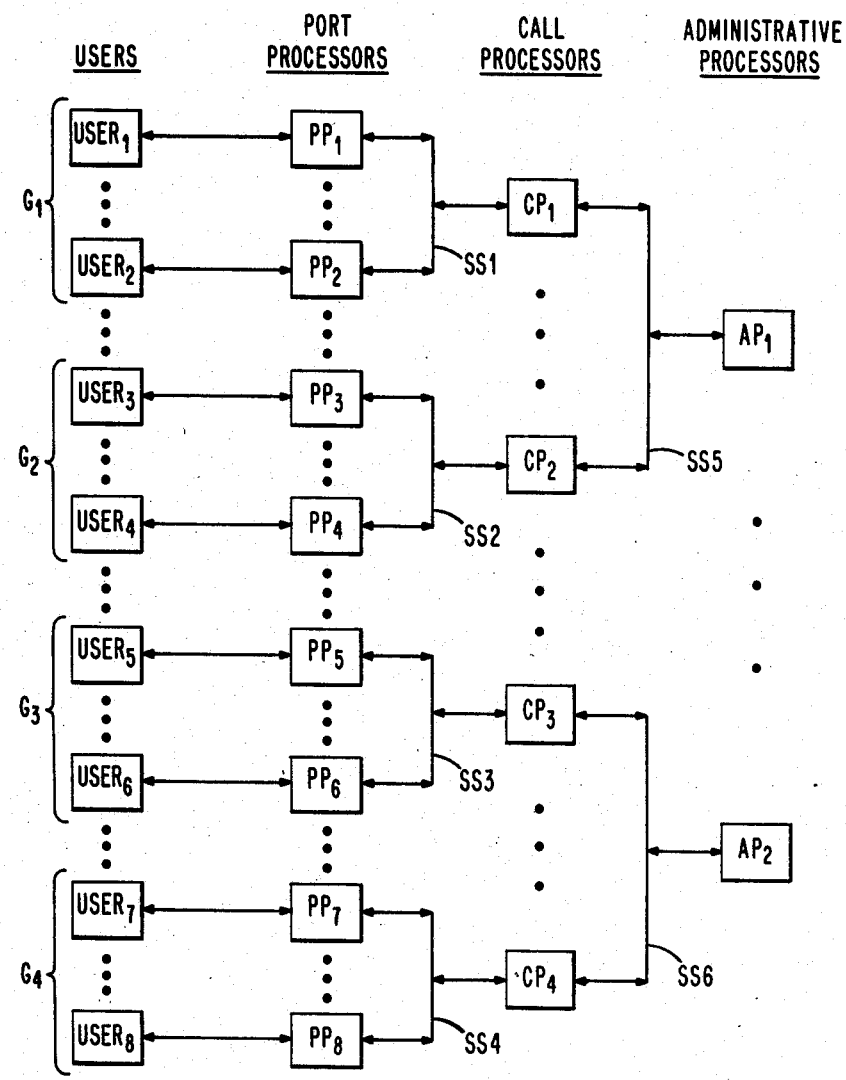
FIG. 33 is a block diagram illustrating service sets and the hierarchy of service providers in a typical control architecture for a burst-switching system.

FIG. 33 illustrates the notion of a service set and the hierarchy of service providers; note that:

each port processor has one user in its service set;

each call processor has a number of port processors in its service set; and each administrative processor has a number of call processors in its service set.

In FIG. 33, four groups of users are shown, $G_1$, $G_2$, $G_3$, and $G_4$, by way of example. Each group may contain a reasonable number of users, not necessarily two as depicted in the drawing for simplicity. Each user is the service set for the respective port processor (PP) with which it is coupled. Each group of port processors comprises the service set (SS) for the call processor (CP) with which the group is coupled. Each group of call processors comprises the service set for the administrative processor (AP) with which the group is coupled. Thus, $USER_5$ is serviced by $PP_5$; $PP_5$, being a member of $SS_3$, is serviced by $CP_3$; and $CP_3$, being a member of $SS_6$, is serviced by $AP_2$.

FIG. 33 suggests that there are more port processors than call processors, and more call processors than administrative processors. This is generally the case. Since port processors perform silence detection on voice ports, they are expected to be rather busy, even in serving a single port. Typically, a port initiates a call only occasionally, so that a number of port processors may be served by a single call processor. Because the program memory of a call processor is expected to be significant, there is a cost advantage in providing only the required number of call processors.

The administrative processor involvement in a call is small, even less than that of a call processor, so that fewer administrative processors are required than call processors. Since the database memory requirement of an administrative processor is expected to be significant, there is a cost advantage in providing only the minimum number of administrative processors.

Although FIG. 33 implies a hierarchy of service sets, it should be emphasized that all processors operate autonomously. The illustration in FIG. 33 is not intended to imply that a processor block may in some sense control a processor block to its left. Instead, the hierarchy is intended to show service relationships, with requests for service flowing to the right and responses to such requests flowing to the left.

As noted above, smaller systems may not require separate administrative processors in which case administrative processes will be executed by call processors. In fact, there is nothing in the architecture which necessarily requires call processors. All processes could operate at the port level. This would require substantial memory in every port processor. The relationships of FIG. 33 permit a system to implement the control functions in an efficient manner with shared and distributed resources.

In some embodiments of a burst-switching system, particularly those with stringent survivability requirements, port circuit intelligence including control may be located on user premises or even within end-user instruments. In such embodiments, all that is necessary for communications to occur between two (or more) surviving users is the mutual availability of communications—transport means, e.g., a link switch coupled between surviving users.

Members of a service set may be located anywhere in the switching network. There is no requirement that they be close together, contiguous, etc. As a practical matter, however, the farther a control message must travel the more network resources are employed in its transmission. In order to minimize network resources dedicated to control, it is reasonable to expect the members of a service set to be near one another with the head of the service set being located near the center of the set.

Control-burst traffic between a port processor and its call processor requires that each processor possess the network address of the other. As a "connection" is defined in these terms, another definition of a service set is that there is a connection between each member of the set and the set's head. As with all burst connections, no network resources are dedicated by these connections.

Figure 34:
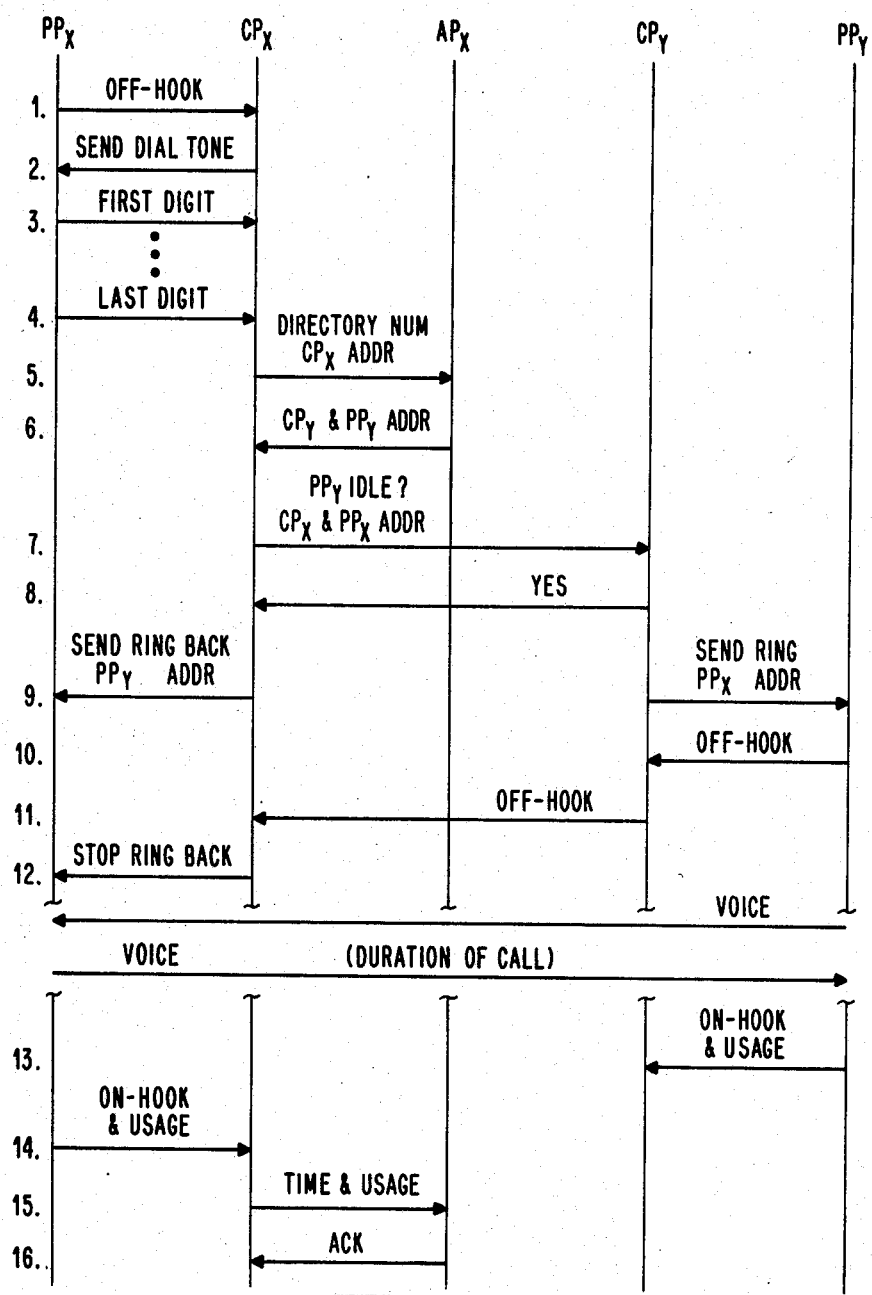
FIG. 34 is a diagram outlining the steps executed by various control processors required to set up a simple call in a burst-switching telephone communications system, such call originating at port X and terminating at port Y of the system.

Suppose in FIG. 1, user X desires to communicate by telephone with user Y. FIG. 34 shows the typical burst traffic between control processors in order to set-up and terminate a simple call.

In step 1, X's off-hook signal is detected by X's port processor ($PP_X$). $PP_X$ sends an appropriate control burst to X's call processor ($CP_X$).

In step 2, $CP_X$ sends a control burst to $PP_X$ which causes $PP_X$ to send a dial tone to X. Hearing the dial tone, X commences dialing Y's telephone number.

In step 3, $PP_X$ detects the first digit dialed by X. $PP_X$ sends this digit to $CP_X$ in a control burst. This process continues digit by digit.

In step 4, $PP_X$ detects the last digit dialed by X. $PP_X$ sends this digit to $CP_X$ in a control burst.

In step 5, $CP_X$ sends Y's directory telephone number (dialed by X) and the equipment address of $CP_X$ to X's administrative processor ($AP_X$) in a control burst. $AP_X$ looks up the equipment address of Y's call processor ($CP_Y$) and Y's port processor ($PP_Y$)

In step 6, $AP_X$ sends the equipment addresses for $CP_Y$ and $PP_Y$ to $CP_X$ in a control burst.

In step 7, $CP_X$ sends a control burst to $CP_Y$ inquiring whether $PP_Y$ is idle. This control burst includes $CP_X$'s and $PP_X$'s equipment addresses.

In step 8, $CP_Y$ responds to $CP_X$ by sending a control burst indicating whether or not $PP_Y$ is idle. (If $PP_Y$ is not idle, $CP_Y$ sends a control burst to $CP_X$ which will cause a busy-signal tone to be applied to X's line. This contingency is not shown in FIG. 34.) In the example of FIG. 34, it is assumed that $PP_Y$ is idle.

In step 9, $CP_X$ and $CP_Y$ each send control bursts to $PP_X$ and $PP_Y$ respectively. The control burst to $PP_Y$ includes $PP_X$'s equipment address and causes $PP_Y$ to initiate ringing of Y's phone. The control burst to $PP_X$ includes $PP_Y$'s equipment address and causes $PP_X$ to initiate a ring-back signal on X's phone. At this point, both port processors know the network address of the other party.

In step 10, Y lifts his handset. $PP_Y$ detects Y's off-hook condition and sends a control burst to $CP_Y$ indicating this condition.

In step 11, $CP_Y$ sends a control burst to $CP_X$ indicating Y's off-hook condition.

In step 12, $CP_X$ sends a control burst to $PP_X$ which causes $PP_X$ to terminate the ring-back signal on X's line.

Thereafter, a full-duplex conversation between X and Y ensues, using the previously sent equipment addresses of the parties. Bursts originating from $PP_X$ are sent directly to $PP_Y$ without administrative overhead, and likewise for bursts from $PP_Y$ to $PP_X$. The port processor of each party knows the network address of the port processor of the other party.

In step 13, $PP_Y$ detects that Y has hung up. $PP_Y$ sends a control burst to $CP_Y$ indicating Y's on-hook condition and including usage information.

In step 14, $PP_X$ detects X's on-hook condition. $PP_X$ sends a control burst to $CP_X$ indicating X's on-hook status and including usage information.

In step 15, $CP_X$ sends a control burst to $AP_X$ indicating completion of the call and including time and usage information for billing and/or administrative purposes.

In step 16, $AP_X$ sends a control burst to $CP_X$ acknowledging receipt of the control burst sent in step 15.

Figure 35:
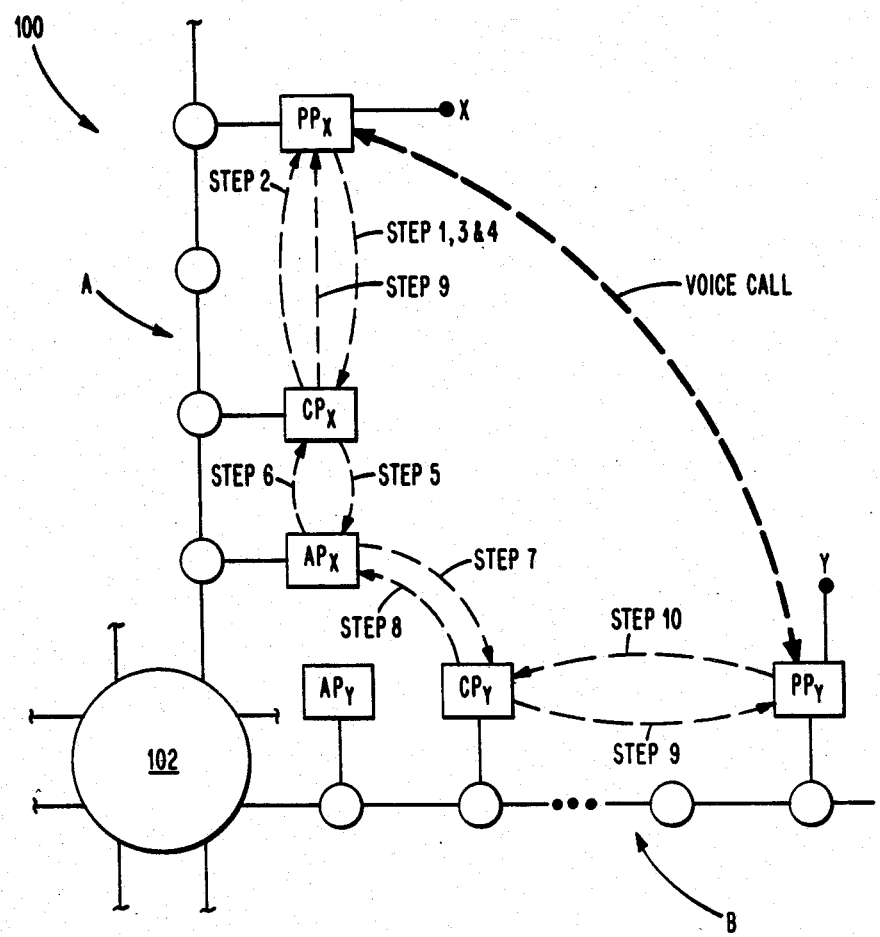
FIG. 35 illustrates certain control bursts transmitted between control processors in a typical burst-switching control architecture, the illustrated control bursts corresponding to steps in a method of call set-up and takedown in accordance with the invention.

FIG. 35 illustrates some of the control bursts in the method of call set-up and take-down shown in FIG. 34. In the drawing showing a portion of system 100, control bursts are shown as dashed lines between control processors for illustration purposes. All control bursts are transmitted through the network in the same manner as other types of bursts. The numbered steps in the drawing correspond to the numbered steps described above. The heavy dashed line between $PP_X$ and $PP_Y$ indicates the voice conversation (two-way) between X and Y.

FIG. 35 also depicts a typical control architecture for system 100. $CP_X$ is the call processor for a number of port processors including $PP_X$. Likewise, $CP_Y$ is the call processor servicing Y and a number of other users. $AP_X$ is the administrative processor for a number of call processors including $CP_X$; $AP_Y$ is the call processor for $CP_Y$. $AP_Y$ has no responsibilities in this embodiment of the call set-up and take-down method because X is the originator of the call. In alternative embodiments of the method, particularly where custom features are implemented, $AP_Y$ may play a role in call set-up and take-down. Although X and Y are users of different link groups and are shown in the drawing as being in different service sets of the respective control processors, there is nothing in the architecture that requires this arrangement. For example, $CP_Y$ might be in $AP_X$'s service set; and/or it may be that $CP_X$ services both $PP_X$ and $PP_Y$. There is no requirement at any level of control that members of a service set be restricted to one (or more) link groups.

As outlined in FIG. 34, a call may be set-up and taken down in a burst-switching system with highly distributed control architecture. The "highest" level of control required is that of the administrative processor which, rather than being situated in a central office, is coupled with a port of a conveniently located link switch or hub switch. The control traffic utilizes the network itself for transport. If X and Y were local to each other, the control necessary to effectuate the call would be no farther away than the locations of the control processors servicing X's line. As has been stated above, this control architecture may be employed for implementing custom features in addition to regular call services.

A control processor may be added to a service set by sending the network address of the set's head to the control processor. Thereafter, the control processor will forward its service requests to its service processor, the service set's head. There is no requirement that the service-set head be the sender of the assignment message, although that will frequently be the case. In the general case, a first control processor may assign a second control processor to the service set of a third control processor.

Referring to FIG. 33, $CP_1$ adds $PP_1$ to its service set by sending its ($CP_1$'s) address to $PP_1$ in a control burst; $AP_1$ adds $CP_1$ to its service set by sending its ($AP_1$'s) address to $CP_1$ in a control burst. In FIG. 34, $PP_x$ possesses $CP_X$'s address for control burst communications in a call set-up.

Establishment of service sets is easy because it may be accomplished by sending of control bursts between processors of the control. Service sets can be redefined equally easily.

In the event a control processor should fail, there must be means for reassigning members of the service set of the failed processor to the service set of an alternate control processor. This can be accomplished easily within the network by sending service set reassignments in control bursts.

In FIG. 33, if $CP_1$ should fail, it is necessary to reassign port processors $PP_1$ through $PP_2$ (generally there will be many more than two port processors in a group) to other service sets. Perhaps the simplest way to do this is to assign them to $CP_2$'s service set by sending each of them $CP_2$'s address. This may approximately double $CP_2$'s load. A more uniform redistribution might be better. For example, suppose a system has N equally loaded or approximately equally loaded call processors and one fails. Each of the remaining $N-1$ call processors might pick up $1/(N-1)$ of the port processors in the failed call processor's service set. In this case, each control processor's load would increase only by a factor of $N/(N-1)$. Another approach may be to incorporate into a control processor emergency capacity to substitute for another processor.

An important feature is the ease with which control capacity may be added to an existing burst-switching system. Suppose a system has N equally loaded or approximately equally loaded call processors, and additional control capacity is desired. If a new call processor is installed at an idle port and if $1/(N+1)$ of the port processors are reassigned to the service set of the new call processor, the resulting system has $N+1$ call processors. If the reassigned port processors are drawn uniformly from the original N service sets, the resultant system has $N+1$ equally loaded or approximately equally loaded call processors wherein each of the original call processors has its workload reduced commensurately, i.e., by a factor of $1/(N+1)$. Thus, additional capacity may be installed into the system incrementally and with virtually no disruption in user services.

When a control processor has been installed in a burst-switching system, software installation may be performed within the network itself. The software for the particular processor may be downloaded through the system; initialization and start-up testing likewise may be performed through the network. Future software modifications for the processor, or indeed any processor, may be installed automatically through the network. This start-up capability within the network is one aspect of the self-contained maintenance and administrative capability of a burst switch which provides flexible management of system resources with fast response and minimal cost.

However control reassignment may be accomplished, two points are significant with respect to the architecture of a burst-switching system. First, no special switchover network is required. Reassignment is accomplished entirely through the existing network. Second, allocation of redundant control capacity is extremely flexible and efficient, unlike the one-for-one redundancy often found in current duplex systems.

It is necessary to determine that a processor has failed before switchover can occur. In burst-switching control, processor failure is determined by lack of response to test message traffic. The redefinition of service sets is coordinated by the administrative processors working with the surviving call processors.

The burst-switching control is a multiprocessor system because it performs the control task using many processors. It differs from the usual multiprocessor system. A typical multi-processor system provides tight coupling among processors using common buses or shared memory; such architecture is itself subject to failure and must be duplexed. In a burst-switching network, the multiprocessor system is created from processors which are loosely coupled by message exchange through the network. This loose coupling provides substantially greater flexibility and economy in the management of system resources and in ease of expansion. Capacity can be expanded by the addition of processors to idle ports. The added processors can be brought into service easily by redefinition of the service sets, whether the new processors are call or administration processors.

Because the multiprocessor control processors are coupled only via the switching network, there are no processor intercommunications buses or common memories. Redundant buses and common memories are not required. Switchover circuits between one bus and the other, or between one common memory and the other, are not required. Sensing or comparison circuitry, to determine if failure has occurred, is not required. For these reasons, it is believed that maintenance will be less complicated than would be required in a typical one-to-one redundancy system.

Burst-switching control provides an architecture different from the control architecture of the central office and PBX circuit switches of today. The burst-switching distributed-control architecture offers the following advantages:

1. Easy capacity redistribution and expansion: the system will not be immobilized by the failure of a single (or several) control processors; in the event a control processor should fail, the remaining control processors will substitute for the failed processor so that user services will be maintained; control capacity may be added to the system incrementally with virtually no disruption in user services;

2. Easy and efficient processor failure/recovery using the switching network itself, without standby processors for each active processor, switchover networks, and error-detecting comparators;

3. Expected reduction in the complexity of the maintenance function because of the simplified architecture;

4. Independent operation of call processors so that a burst-switching system may concurrently originate as many calls as there are port processors in the system, which translates into the economic advantage that control may be added to the system incrementally; and 5. More economical use of system resources because of the previous advantages.

While there have been shown what are at present considered to be preferred embodiments of the invention, it will be apparent to those skilled in the art that various changes and modifications can be made herein without departing from the scope of the invention as defined by the claims which appear after the following appendix to the specification.

Appendix to Specification

```
,*------------------------------------------------------------*,    00010000
,*--This is the microcode used in the Burst Switching---------*,    00011004
,*---Link Switch. The following code is used in the-----------*,    00012004
,*----the Switching Processors   this listing is for ---------*,    00013004
,*-----Link Input Processors (LIPs)  Minor variations---------*,    00013104
,*-----of this code are used in LOPs  PIPs  and POPs ---------*,    00014004
,*------------------------------------------------------------*,    00016004
,*---these are the flag and DLE characters--------------------*,    00017004
equ dlechr  = 007f ,                                                00020000
equ term    = 00ff ,                                                00030000
equ flag    = 00ff ,                                                00040000
,*---these are the codes for the character states-------------*,    00050004
equ flgst   = 0000 ,                                                00060000
equ dlest   = 0001 ,                                                00070000
equ clear   = 0002 ,                                                00080000
,*------these are constants used in processing bursts---------*,    00090004
equ voice   = 0040 ,                                                00100000
equ bmax+1  = 0020 ,                                                00110000
equ done    = 00d0 ,                                                00120000
equ dacnt   = 0007 ,                                                00130000
,*--these are the channel states -----------------------------*,    00140004
equ idle    = 0000 ,                                                00150000
equ hdr2    = 0001 ,                                                00160000
equ hdr3    = 0002 ,                                                00170000
equ hdr4    = 0003 ,                                                00180000
equ tabmod  = 0004 ,                                                00190000
equ active  = 0005 ,                                                00200000
equ abort   = 0006 ,                                                00210000
,*---these are addresses for parameters in the local memory---*,    00220004
equ charst  = 0000 ,                                                00230000
equ chstat  = 0001 ,                                                00240000
equ putind  = 0002 ,                                                00250000
equ bccsav  = 0003 ,                                                00260000
equ brstyp  = 0004 ,                                                00270000
equ mark    = 0005 ,                                                00280000
equ tabadr  = 0006 ,                                                00290000
equ tabdat  = 0007 ,                                                00300000
equ outprt  = 0008 ,                                                00310000
equ getind  = 0009 ,                                                00320000
equ oldbuf  = 000a ,                                                00330000
,*--these are more constants----------------------------------*,    00340004
equ index0  = 0000 ,                                                00350000
equ inibcc  = 0000 ,                                                00360000
equ btyp0   = 0000 ,                                                00370000
equ notsw   = 0000 ,                                                00380000
equ tabad0  = 0000 ,                                                00390000
equ tabda0  = 0000 ,                                                00400000
,*--these are codes for requests to the Queue Sequencer-------*,    00410004
equ incsim  = 0001 ,                                                00420000
equ incunc  = 0002 ,                                                00430000
equ inccon  = 0003 ,                                                00440000
equ inccrc  = 0004 ,                                                00450000
equ reset   = 0005 ,                                                00460000
equ renqun  = 0006 ,                                                00470000
equ resenq  = 0007 ,                                                00480000
equ deqnrm  = 0008 ,                                                00490000
equ deccon  = 0009 ,                                                00500000
equ putbuf  = 000a ,                                                00510000
equ getbuf  = 000b ,                                                00520000
equ setbuf  = 000c ,                                                00530000
equ incenq  = 0010 ,                                                00540000
equ incunl  = 0020 ,                                                00550000
,*--these are the codes for ALU operations--------------------*,    00560004
equ atoq    = 00e5 ,                                                00570000
equ inc     = 00f1 ,                                                00580000
equ incq    = 00e1 ,                                                00590000
equ qincq   = 0060 ,                                                00600000
equ dec     = 00d5 ,                                                00610000
equ decq    = 00c5 ,                                                00620000
equ qdecq   = 0042 ,                                                00630000
equ exor    = 00fc ,                                                00640000
equ and     = 00f8 ,                                                00650000
equ andq    = 00e8 ,                                                00660000
,*------------------------------------------------------------*,    00670000
adr = 0500 ,                                                        00680000
,*--wait for queue sequencer initialization to finish---------*,    00681004
%waith      mov -areg <= #00ff ;                                    00682002
            alu $atoq ;                                             00683002
            mov -areg <= #0000 ;                                    00684002
```

```
%waitg      nop ;                                                           00685002
            nop ;                                                           00686002
            nop ;                                                           00686102
            nop ;                                                           00686202
            nop ;                                                           00686302
            nop ;                                                           00686402
            nop ;                                                           00686502
            nop ;                                                           00686602
            nop ;                                                           00686702
            alu $inc ,                                                      00687002
            mov -areg <= -aluo ;                                            00688002
            alu $exor ;                                                     00689002
            jnn $waitg ;                                                    00689102
            nop ;                                                           00689202
,*--reset routing table------------------------------------------*,         00690004
%init6      mov -areg <= #0020 ;                                            00700000
            alu $atoq ;                                                     00710000
            mov -indx & -areg <= #0000 ;                                    00720000
%tabl2      mov (-indx ) <= #0010 ;                                         00730000
            nop ;                                                           00740000
            alu $inc ,                                                      00750000
            mov -indx & -areg <= -aluo ;                                    00760000
            alu $exor ;                                                     00770000
            jnn $tabl2 ;                                                    00780000
            nop ;                                                           00790000
,*--set up all buffer parameters in local memory--------------*,            00800004
            rst ;                                                           00810000
%inith      jns $inith ;                                                    00820000
            nop ;                                                           00830000
            mov -areg <= -ccnt ;                                            00840000
            alu $atoq ,                                                     00850000
            jnu $setprh ;                                                   00860000
            nop ;                                                           00870000
,* loop through all the channels, resetting parameters      *,              00880000
%looph      jns $looph ;                                                    00890000
            nop ;                                                           00900000
            mov -areg <= -ccnt ;                                            00910000
            alu $exor ;                                                     00920000
            jne $reqbeh ;                                                   00930000
            nop ;                                                           00940000
,*--reset parameters------------------------------------------*,00950000
%setprh     mov ($charst) <= $flgst ;                                       00960000
            mov ($chstat) <= $idle ;                                        00970000
            mov ($putind) <= $index0 ;                                      00980000
            mov ($bccsav) <= $inibcc ;                                      00990000
            mov ($brstyp) <= $btyp0 ;                                       01000000
            mov ($mark  ) <= $notsw ;                                       01010000
            mov ($tabadr) <= $tabad0 ;                                      01020000
            mov ($tabdat) <= $tabda0 ;                                      01030000
            mov ($getind) <= $index0 ;                                      01040000
            jnu $looph ;                                                    01050000
            rst ;                                                           01060000
,*--ask qs to do first getbuf---------------------------------*,01070000
%reqbeh     rst ;                                                           01080000
            req $getbuf ;                                                   01090000
%loopq      jnq $chseth ;                                                   01100000
            nop ;                                                           01110000
            jnu $loopq ;                                                    01120000
            nop ;                                                           01130000
%chseth     mov -areg <= -ccnt ;                                            01140000
            alu $atoq ;                                                     01150000
,*--now loop through all channels  requesting getbufs and setbufs--*,       01160004
,*--getbufs return a valid buffer for use by an input channel------*,      01161004
,*--setbufs return 0 to clear the DP Ram for an output channel-----*,      01162004
%loop2h     jns $loop2h ;                                                   01170000
            nop ;                                                           01180000
            rst ,                                                           01190000
            mov -areg <= -ccnt ;                                            01200000
            alu $exor ;                                                     01210000
            jne $beg ;                                                      01220000
            nop ;                                                           01230000
,*--ask qs to do getbuf or setbuf-----------------------------*,01240004
            req $getbuf ;                                                   01250000
%loopqh     jnq $loop2h ;                                                   01260000
            nop ;                                                           01270000
            jnu $loopqh ;                                                   01280000
            nop ;                                                           01290000
,*-------------------------------------------------------------*,01300000
,*---OK - enough for initialization - now for the real stuff----------*,01301004
,*---the following code is used for input processors only------------*,01301104
,*---during each channel time  the switching processor waits---------*,01302004
,*---for the beginning of the channel - then does a few basic--------*,01302104
,*---instructions - then jumps to code appropriate for the ----------*,01302204
,*---particular character state and channel state--------------------*,01302304
```

```
,*------------------------------------------------------------------*,01303004
,*---This is the loop which waits for the beginning of the channel---*,01304004
%beg            jns $beg ;                                            01310000
                inn ;                                                 01320000
,*---These are instructions executed every channel time--------------*,01330004
,*---The rst instruction resets the channel start latch--------------*,01331004
,*---The jfu instruction jumps to the address presented by the FSM---*,01332004
,*---This corresponds to the character and channel state-------------*,01333004
,*---The move instructions restore parameters from local memory------*,01334004
,*---and feed the character state to and from the FSM----------------*,01335004
%start          mov -chrs <= ($charst ) ,                             01340000
                rst ,                                                 01350000
                bst ;                                                 01360000
                mov -chns <= ($chstat ) ;                             01370000
                nop ;                                                 01380000
                jfu ;                                                 01390000
                mov ($charst ) <= -chrs ;                             01400000
,*------------------------------------------------------------------*,01410000
,*---This is the routine executed when a DLE is found while----------*,01411004
,*---looking for a header or flag byte - the putindex is incremented-*,01412004
,*---An incsim is requested which places the character in buffer-----*,01413004
,*---memory and increments the count  The input is moved to the-----*,01414004
,*---output  and the bcc is updated ---------------------------------*,01415004
%diorh          mov -indx & -areg <= ($putind ) ;                     01420000
                req $incsim ;                                         01430000
                alu $inc ,                                            01440000
                mov ($putind ) <= -aluo ;                             01450000
                mov -areg & -outp <= -iput ;                          01460000
                alu $atoq ,                                           01470000
                jnu $beg ,                                            01480000
                mov -areg <= ($bccsav ) ;                             01490000
                alu $exor ,                                           01500000
                mov ($bccsav ) <= -aluo ;                             01510000
,*------------------------------------------------------------------*,01520000
,*---This is the routine executed when the first byte of the--------*,01521004
,*---header is found - the putindex is incremented------------------*,01522004
,*---the burst type and destination are extracted from the ---------*,01522104
,*---burst and stored in local memory-------------------------------*,01522204
,*---If the burst destination is an output link, then the-----------*,01522304
,*---Burst is routed in this channel time and an incenq-------------*,01522404
,*---is requested which routes the burst by enqueueing it-----------*,01522504
,*---If the burst is for this switch, it cannot be routed yet-------*,01522604
,*---An incsim is requested, which places the character in buffer---*,01523004
,*---memory and increments the count  In either case a flag is ----*,01524004
,*---set to show if the burst has been routed the input is moved to -*,01524104
,*---output, and the bcc is updated --------------------------------*,01525004
%cidle          mov -indx & -areg <= ($putind ) ;                     01530000
                alu $inc ,                                            01540000
                mov ($putind ) <= -aluo ;                             01550000
                mov -outp & -areg <= -iput ;                          01560000
                alu $atoq ,                                           01570000
                mov -areg <= ($bccsav ) ;                             01580000
                mov ($chstat ) <= $hdr2 ;                             01590000
                alu $exor ,                                           01600000
                mov ($bccsav ) <= -aluo ;                             01610000
                mov -areg <= #00e0 ;                                  01620000
                alu $and ,                                            01630000
                mov -btyp & ($brstyp ) <= -aluo ;                     01640000
                mov -areg <= #001f ;                                  01650000
                alu $andq ,                                           01660000
                mov -indx <= -aluo ;                                  01670000
                mov -areg <= -owns ;                                  01680000
                alu $exor ;                                           01690000
                jne $myown ;                                          01700000
                mov -queu <= (-indx ) ;                               01710000
                   req $incenq ,                                      01720000
                   jnu $beg ;                                         01730000
                   mov ($mark ) <= #0001 ;                            01740000
%myown          req $incsim ,                                         01750000
                jnu $beg ;                                            01760000
                mov ($mark ) <= #0002;                                01770000
,*------------------------------------------------------------------*,01780000
,*--The following routine processes the second byte of the header---*,01781004
,*--this is independent of the destination of the burst-------------*,01782004
,*--the character is sent to character memory by moving the---------*,01783004
,*--iput register to the outp register - - the bcc is updated-------*,01784004
,*--and an incsim request is sent to the queue sequencer------------*,01785004
%chdr2          mov -indx & -areg <= ($putind ) ;                     01790000
                alu $inc ,                                            01800000
                mov ($putind ) <= -aluo ;                             01810000
                mov -outp & -areg <= -iput ;                          01820000
                alu $atoq ,                                           01830000
                mov ($chstat ) <= $hdr3 ;                             01840000
                mov -areg <= ($bccsav ) ;                             01850000
```

```
                       alu $exor ,                                              01860000
                       mov ($bccsav ) <= -aluo ,                                01870000
                       req $incsim ,                                            01880000
                       jnu $beg ;                                               01890000
                       nop ;                                                    01900000
;*----------------------------------------------------------------------*,01910000
;*---This routine processes the third byte of the header---------------*,01911004
;*---If the burst has not yet been routed it must be for one-----------*,01912004
;*---of the ports on this switch - inthis case the destination---------*,01913004
;*---is extracted and saved for enqueing after error checking----------*,01914004
;*---If the most significant bit is set this burst is a control--------*,01915004
;*---burst which updates the routing table - --------------------------*,01916004
;*---In any case the byte is placed in character memory----------------*,01917004
;*---parameters are updated and an incsim request is submitted---------*,01918004
%chdr3         mov -areg <= -iput ;                                             01920000
               alu $atoq ;                                                      01930000
               mov -areg <= ($bccsav ) ;                                        01940000
               alu $exor ,                                                      01950000
               mov ($bccsav ) <= -aluo ;                                        01960000
               mov -areg <= #0080 ;                                             01970000
               alu $and ;                                                       01980000
               jne $notab ;                                                     01990000
               mov -areg <= #001f ;                                             02000000
                  alu $and ,                                                    02010000
                  mov ($tabadr ) <= -aluo ;                                     02020000
                  mov -areg <= #0040 ;                                          02030000
                  mov ($chstat ) <= $tabmod ,                                   02040000
                  jnu $beg ;                                                    02050000
                  alu $and ,                                                    02060000
                  mov ($tabdat ) <= -aluo ;                                     02070000
%notab         mov -indx & -areg <= ($putind ) ;                                02080000
               alu $inc ,                                                       02090000
               mov ($putind ) <= -aluo ;                                        02100000
               mov -outp <= -iput ;                                             02110000
               mov -areg <= #000f ;                                             02120000
               alu $and ,                                                       02121000
               mov ($chstat ) <= $hdr4 ;                                        02130000
               alu $and ,                                                       02140000
               mov ($outprt ) <= -aluo ,                                        02150000
               jnu $beg ;                                                       02160000
               req $incsim ;                                                    02170000
;*----------------------------------------------------------------------*,02180000
;*---This is the routine which processes control bursts If this--------*,02181004
;*---routine is entered we are in the fourth byte of the header--------*,02182004
;*---and thus we check for errors - if no errors are found we----------*,02183004
;*---update the routing table with the parameters extracted in---------*,02184004
;*---the chdr3 routine last frame time---------------------------------*,02185004
%tabmod        jnl $abt ;                                                       02190000
               mov -areg <= -iput ;                                             02200000
                  alu $atoq ,                                                   02210000
                  mov -areg <= ($bccsav ) ;                                     02220000
                  alu $exor ,                                                   02230000
                  mov -indx <= ($tabadr ) ;                                     02240000
                  jnn $abt ;                                                    02250000
                  mov -areg <= ($tabdat ) ;                                     02260000
                     alu $atoq ,                                                02270000
                     jne $abt ;                                                 02280000
                     mov (-indx) <= #0000 ;                                     02290000
                        mov (-indx) <= #0001 ;                                  02300000
;*--If errors are found we abort and reset the buffer------------------*,02301004
;*------*,                                                                      02310000
%abt           mov ($putind ) <= #0000 ;                                        02320000
               mov ($chstat ) <= $abort ;                                       02330000
               mov ($bccsav ) <= #0000 ;                                        02340000
               mov ($mark ) <= #0000 ,                                          02350000
               jnu $beg ;                                                       02360000
               req $reset ;                                                     02370000
;*----------------------------------------------------------------------*,02380000
;*----This routine processes the fourth byte of the burst -------------*,02381004
;*----There are meny different cases to examine------------------------*,02382004
;*----First the bcc is checked to see if there were errors-------------*,02383004
;*----in the burst-----------------------------------------------------*,02384004
%chdr4         mov -areg <= -iput ;                                             02390000
               alu $atoq ,                                                      02400000
               mov -areg <= ($bccsav ) ;                                        02410000
               alu $exor ,                                                      02420000
               mov -indx <= ($putind ) ;                                        02430000
               jnn $badbcc ;                                                    02440000
               mov -areg <= ($mark ) ;                                          02450000
;*--------------------*,                                                        02460000
;*----The following sections are executed only if the bcc was good----*,02461004
;*----Secondly we check if the burst has been routed yet--------------*,02462004
%gudbcc            mov ($chstat ) <= $active ,                                  02470000
```

```
                    alu  $atoq ;                                                        02480000
                    mov  -areg <= #0002 ;                                               02490000
                    alu  $exor ;                                                        02500000
                    jnn  $gsw ;                                                         02510000
                    mov  -outp <= -iput ;                                               02520000
,*----The following sections are for bursts which have notbeen routed-*,02521004
,*----and are therefore destined for this switch ----------------------*,02522004
,*----We check to see if this is a voice burst ------------------------*,02523004
                    mov  -areg <= ($brstyp ) ;                                          02530000
                    mov  -queu <= ($outprt ) ,                                          02540000
                    alu  $atoq ;                                                        02550000
                    mov  -areg <= $voice ;                                              02560000
                    alu  $exor ;                                                        02570000
                    jnn  $gnswnv ;                                                      02580000
                    mov  ($putind ) <= #0001 ;                                          02590000
,*----this section is for voice bursts routed to ports-----------------*,02591004
,*----a renqun request is issued which resets the buffer - enqueues---*,02592004
,*----it - and chains to another buffer - this makes clipping when----*,02593004
,*----delays are long a simple task-----------------------------------*,02594004
%gnswv              req  $renqun ;                                                      02600000
                    mov  ($putind) <= #0000 ;                                           02610000
                    jnu  $beg ;                                                         02620000
                    mov  ($mark ) <= #0001 ;                                            02630000
,*----this section is for non-voice bursts routed to ports------------*,02631004
,*----a resenq request is issued which resets the buffer - enqueues---*,02632004
,*----it - but does not chain buffers---------------------------------*,02633004
%gnswnv             req  $resenq ,                                                      02640000
                    jnu  $beg ;                                                         02650000
                    mov  ($mark ) <= #0001 ;                                            02660000
,*------*,                                                                              02670000
,*----this section is for bursts not routed to ports-----------------*,02671004
,*----we check to see if they are voice bursts or not---------------*,02672004
%gsw                mov  -areg <= ($brstyp ) ;                                          02680000
                    alu  $atoq ,                                                        02690000
                    mov  -areg <= $voice ;                                              02700000
                    alu  $exor ;                                                        02710000
                    jnn  $gswnv ;                                                       02720000
                    mov  -areg <= ($putind ) ;                                          02730000
,*----this section is for voice bursts routed to links---------------*,02731004
,*----a incunl request is issued which chains this buffer to --------*,02732004
,*----anoth for the purposes of clipping - this burst has already----*,02733004
,*----been routed---------------------------------------------------*,02734004
%gswv               req  $incunl ,                                                      02740000
                    jnu  $beg ;                                                         02750000
                    mov  ($putind ) <= #0000 ;                                          02760000
,*----this section is for non-voice bursts routed to links-----------*,02761004
,*----a incsim request is issued which updates the count in the------*,02762004
,*----buffer-------------------------------------------------------*,02763004
%gswnv              jnu  $beg ,                                                         02770000
                    alu  $inc ,                                                         02780000
                    req  $incsim ;                                                      02790000
                    alu  $inc ,                                                         02800000
                    mov  ($putind ) <= -aluo ;                                          02810000
,*------------------*,                                                                  02820000
,*----this section is for bursts with errors in the header-----------*,02821004
,*----we must check to see if the burst has been routed yet----------*,02822004
%badbcc             mov  ($putind ) <= #0000 ,                                          02830000
                    alu  $atoq ;                                                        02840000
                    jne  $bnsw ,                                                        02850000
                    mov  ($chstat ) <= $abort ;                                         02860000
                    mov  ($bccsav ) <= #0000 ;                                          02870000
,*----these bursts have been routed  and the buffer must be finished--*,02871004
,*----with an incunc request - which increments the count and puts----*,02872004
,*----the buffer away A new buffer is returned for the next frame time*,02873004
%bsw                req  $incunc ;                                                      02880000
                    mov  -outp  <=   $flag ,                                            02890000
                    jnu  $beg ;                                                         02900000
                    mov  ($mark ) <= #0000 ;                                            02910000
,*---*,                                                                                 02920000
,*----these bursts have not been routed - thus the buffer may --------*,02921004
,*----simply be reset and reused-------------------------------------*,02922004
%bnsw               req  $reset ,                                                       02930000
                    jnu  $beg ;                                                         02940000
                    nop ;                                                               02950000
,*-----------------------------------------------------------------*,02960000
,*----This request is executed in the middle of a burst--------------*,02961004
,*----cordact stands for clear or dlefound character state-----------*,02962004
,*----with active channel state------------------------------------*,02963004
,*----The character is read from the input and placed---------------*,02964004
,*----in character memory - and the end of the buffer is------------*,02965004
,*----checked for - wraparound is handled differently for-----------*,02966004
,*----voice and data----------------------------------------------*,02967004
%cordact            mov  -indx & -areg <= ($putind ) ;                                  02970000
                    alu  $incq ;                                                        02980000
```

```
                    alu $incq ,                                 02990000
                    mov ($putind ) <= -aluo ;                   03000000
                    mov -areg <= $bmax+1 ;                      03010000
                    alu $exor ;                                 03020000
                    jnn $nomod ;                                03030000
                    mov -outp <= -iput ;                        03040000
,*----This statement is executed if the end of the buffer-------------*,03041004
,*----is reached - it sets the active address back to zero------------*,03042004
                    mov ($putind ) <= #0000 ;                   03050000
%nomod              mov -areg <= ($brstyp ) ;                   03060000
                    alu $atoq ,                                 03070000
                    mov -areg <= $voice ;                       03080000
                    alu $exor ;                                 03090000
                    jnn $notv ;                                 03100000
                    nop ;                                       03110000
,*----this section is executed for voice bursts-----------------------*,03111004
,*----an inccre request is sent to the queue sequencer----------------*,03112004
,*----inccre resets the buffer if the end of the buffer is reached----*,03113004
                    req $inccre ,                               03120000
                    jnu $beg ;                                  03130000
                    nop ;                                       03140000
,*------*,                                                      03150000
,*----this section is executed for non-voice bursts-------------------*,03151004
,*----an inccon request is sent to the queue sequencer----------------*,03152004
,*----inccon chains buffers if the end of the buffer is reached----*, 03153004
%notv               req $inccon ,                               03160000
                    jnu $beg ;                                  03170000
                    nop ;                                       03180000
,*--------------------------------------------------------------------*,03190000
,*----This section is executed if a flag is found---------------------*,03191004
,*----this is therefore the end of the burst or an idle---------------*,03192004
,*----channel we test mark (the routed flag) to see which-------------*,03193004
,*---- --------------------------------------------------------------*,03194004
,*--------------------------------------------------------------------*,03195004
%ffnd               mov -areg <= ($mark ) ;                     03200000
                    mov ($chstat ) <= $idle ,                   03210000
                    alu $atoq ;                                 03220000
                    mov -indx <= ($putind ) ;                   03230000
                    mov ($bccsav ) <= #0000 ,                   03240000
                    jne $nomark ;                               03250000
                    mov ($putind ) <= #0000 ;                   03260000
,*----this section is executed at the end of a burst------------------*,03261004
,*----we   st if the burst has been routed or not--------------------*,03262004
                    mov -areg <= #0001 ;                        03270000
                    alu $exor ;                                 03280000
                    jnn $notr ;                                 03290000
                    mov ($mark ) <= #0000 ;                     03300000
,*----this section is executed for a burst which has been routed------*,03301004
,*----an incunc releases the buffer and returns a new one-------------*,03302004
                    req $incunc ,                               03310000
                    jnu $beg ;                                  03320000
                    mov -outp <= $flag ;                        03330000
,*----this section is executed for a burst which has not been routed--*,03331004
,*----a reset simply resets the buffer which is then reused-----------*,03332004
%notr               req $reset ,                                03340000
                    jnu $beg ;                                  03350000
                    nop ;                                       03360000
,*-------*,                                                     03370000
,*----this section is executed for an idle channel--------------------*,03371004
%nomark             jnu $beg ;                                  03380000
                    nop ;                                       03390000
,*--------------------------------------------------------------------*,03400000
,*----This is the abort routine---------------------------------------*,03401004
%dumpbu             jnu $beg ;                                  03410000
                    nop ;                                       03420000
,*--This is the code for an output processor--------------------*,    04090004
,*--this is written for a POP and is very similar---------------*,    04090104
,*--input processors - then a jump is made depending on---------*,    04090404
,*--whether ----------------------------------------------------*,    04090504
%popcod             req $setbuf ;                               04091001
,*--This is a wait loop comparable to the one for---------------*,    04092004
,*--input processors - the active queue is the channel count---*,     04093004
%begin              jns $begin ;                                04100000
                    mov -queu <= -ccnt ;                        04110000
,*-------*,                                                     04120000
,*--A jump is made depending on whether the active buffer is 0-*,     04121004
                    rst ,                                       04130000
                    mov -chrs <= ($charst ) ,                   04140000
                    jnb $nobuf ;                                04150000
                    mov -indx <= ($getind ) ;                   04160000
,*-------*,                                                     04170000
,*--If no - we are working on a burst---------------------------*,    04171004
,*--we check to see if the buffer has changed due to------------*,    04172004
,*--chaining - if so we reset the index-------------------------*,    04173004
```

```
                   mov -areg <= ($oldbuf ) ;                           04180000
                   alu $atoq ;                                         04190000
                   mov ($oldbuf ) & -areg <= -buff ;                   04200000
                   alu $exor ;                                         04210000
                   jnc $charot ;                                       04220000
                   nop ;                                               04230000
                   mov -indx & -areg & ($getind ) <= #0000 ;           04240000
 ,*------*,                                                            04250000
 ,*--bst requests a character from character memory-------------*,     04251004
 ,*--when a character is returned we jump on its status---------*,     04252004
 ,*--using the finite state machine-----------------------------*,     04253004
%charot            bst ,                                               04260000
                   mov -chns <= #0007 ;                                04261000
%charo             jnc $charok ;                                       04270000
                   mov ($charst ) <= -chrs ;                           04280000
                   jnu $charo ;                                        04290000
                   nop ;                                               04300000
%charok            jfu ;                                               04310000
                   mov -outp <= -iput ;                                04320000
 ,*------*,                                                            04330000
 ,*--this code is executed when the character is a flag and-----*,    04331004
 ,*--we are thus executing the end of the burst - we request----*,    04332004
 ,*--a putbuf which returns the buffer to the freequeue---------*,    04333004
%yflg              mov ($getind ) <= #0000 ,                           04340000
                   jnu $begin ;                                        04350000
                   req $putbuf ;                                       04360000
 ,*------*,                                                            04370000
 ,*--this code is executed when the character is not a flag-----*,    04371004
 ,*--we are thus executing the middle of a burst and request----*,    04372004
 ,*--a deccon which decrements the count in the buffer----------*,    04373004
%nflg              alu $incq ;                                         04380000
                   alu $incq ,                                         04390000
                   mov ($getind ) <= -aluo ,                           04400000
                   jnu $begin ;                                        04410000
                   req $deccon ;                                       04420000
 ,*--------------*,                                                    04430000
 ,*--If the active buffer is 0 a deque request is made----------*,    04431004
%nobuf             req $deqnrm ;                                       04440000
                   mov -indx <= #0000 ;                                04450000
                   jnu $begin ;                                        04460000
                   nop ;                                               04470000
 ,*-------------------------------------------------------------*,    04480000
fin ,                                                                  04490000
Format of Switching Processor Microprogram PROM Outputs - MKIIA        04520003
```

Format of Switching Processor Microprogram PROM Outputs - MKIIA

| PROM # / BITS | 7 | 6 | 5 | 4 | 3 | 2 | 1 | 0 |
|---|---|---|---|---|---|---|---|---|
| 1 | CH/TAB | | |------------ uADDOUT ------------| | | | |
| 2 | |----------------------- NEXTADD ---------------------------| | | | | | | |
| 3 | |----------------------- DATAOUT ---------------------------| | | | | | | |
| 4 | |----------------------- WEN -------------------------------| | | | | | | |
| | LMEM IN | BTYP | OUTP | AREG | CHRS IN | CHNS IN | INDX | QUEU |
| 5 | |----------------------- DD --------------------------------| | | | | | | |
| | CCNT | SEQD | OWNS | CHRS OUT | ALUO | IPUT | BUFF | LMEM OUT |
| 6 | | |---------- ALU ---------------------------| | | | | |
| | | | CN | I6 | I5 | I4 | I3 | I0 |
| | |-----WEN-----| | | | | |----MISC----| |

```
 7     | DEQ |/REST|  IN |                         |/IPUT |/QS         04920003
       |     | STRT|     |                         | STR  | REQ        04930003
       |     |     |     |                         |      |            04940003
       |     |     |     |                         |      |            04950003
 8     | EPA | NA  |     |        |-------- SEL ----------------        04960003
       | SEL | SEL |     |                                              04970003
              idl ,                                                     00361019
              nop ;                                                     00362019
,*---------------------------------------------------------------*,     00370014
,*---Incsim is used by input processors ------------------------*,      00371024
,*---it updates the count of characters in the-----------------*,       00372024
,*---active buffer---------------------------------------------*,       00373024
,*---------------------------------------------------------------*,     00374024
%incsim       mov -cntr & -dreg <= (b. -buff . $cnt ) ,                 00380014
              nst ;                                                     00390014
              nop ;                                                     00391017
              nop ;                                                     00392018
              inc ,                                                     00400014
              jfu ;                                                     00410014
              mov (b. -buff . $cnt ) <= -cntr ;                         00420014
,*---------------------------------------------------------------*,     00430014
,*---Incsim is used by input processors at the end of a -----*,         00431024
,*---burst - it updates the count and releases the-----------*,         00432024
,*---buffer by returning a different active buffer ----------*,         00433024
,*---from the freequeue--------------------------------------*,         00433124
,*---------------------------------------------------------------*,     00434024
%incunc       mov -cntr & -dreg <= (b. -buff . $cnt ) ,                 00440014
              nst ;                                                     00450014
              inc ,                                                     00460014
              mov -temp & -bufo <= (q. $freeq . -zero . $top ) ;        00470028
              mov -dreg <= (b. -temp . $next ) ;                        00480014
              mov (b. -buff . $cnt ) <= -cntr ,                         00490014
              jnn #0000 $isnext ;                                       00500014
              mov (q. $freeq . -zero . $top ) <= -dreg ;                00510028
                mov (q. $freeq . -zero . $bot ) <= #0000 ;              00520028
%isnext       mov (b. -temp . $cnt ) <= #0000 ,                         00530014
              jfu ;                                                     00540014
              mov (b. -temp . $next ) <= #0000 ;                        00550015
,*---------------------------------------------------------------*,     00560014
,*---Inccon is used by input processors in the middle of a--*,          00561024
,*---burst - it updates the count and chains the------------*,          00562024
,*---active buffer to another one if the buffer is ---------*,          00563024
,*---full---------------------------------------------------*,          00564024
,*---------------------------------------------------------------*,     00565024
%inccon       mov -cntr & -dreg <= (b. -buff . $cnt ) ,                 00570014
              nst ;                                                     00580014
              inc ,                                                     00590014
              jnn $max-1 $isnxt4 ;                                      00600014
              mov (b. -buff . $cnt ) <= -cntr ;                         00610014
,*---the following code is executed if the buffer is full---*,          00611024
,*---a new buffer is taken from the freequeue and chained---*,          00612024
,*---to the old one-----------------------------------------*,          00613024
              mov -temp & -bufo <= (q. $freeq . -zero . $top ) ;        00620028
              mov -dreg <= (b. -temp . $next ) ;                        00630014
              jnn #0000 $isnxt3 ;                                       00640014
              mov (q. $freeq . -zero . $top ) <= -dreg ;                00650028
                mov (q. $freeq . -zero . $bot ) <= #0000 ;              00660028
%isnxt3       mov (b. -temp . $cnt ) <= #0000 ;                         00670014
              mov (b. -temp . $next ) <= #0000 ,                        00680015
              jfu ;                                                     00690014
              mov (b. -buff . $succ ) <= -temp ;                        00700014
,*---only the count is incremented if the buffer is not full-*,         00701024
%isnxt4       jfu ;                                                     00710014
              nop ;                                                     00720014
,*---------------------------------------------------------------*,     00730014
,*---Inccre is used by input processors in the middle of a--*,          00731024
,*---voice burst - the count is reset if the buffer is------*,          00732024
,*---full---------------------------------------------------*,          00734024
,*---------------------------------------------------------------*,     00735024
%inccre       mov -cntr & -dreg <= (b. -buff . $cnt ) ,                 00740014
              nst ;                                                     00750014

,*---------------------------------------------------------------*,     00001023
,*---This is the microcode executed by the Queue Sequencer--*,          00002023
,*---in a Burst Switching Link Switch-----------------------*,          00003023
,*---------------------------------------------------------------*,     00004023
,*---The microcode is organized as an initialization--------*,          00005023
,*---section followed by a number of routines---------------*,          00005123
,*---Each routine is independent of the others--------------*,          00005223
,*---and is executed when its request is presented to-------*,          00005323
,*---the Queue Sequencer control by the FIFOs---------------*,          00005423
,*---------------------------------------------------------------*,     00006023
```

```
,*---These are the constants and parameters used in--------*,      00007023
,*---the microcode----------------------------------------*,       00008023
,*-------------------------------------------------------*,        00009023
         equ cnt   = 0000 ,                                        00010014
         equ succ  = 0001 ,                                        00020014
         equ next  = 0002 ,                                        00030014
         equ bot   = 0000 ,                                        00040014
         equ top   = 0001 ,                                        00050014
         equ indx  = 0002 ,                                        00060014
         equ freeq = 00f8 ,                                        00070022
         equ lop0q = 00c0 ,                                        00071022
         equ lop1q = 00c8 ,                                        00072022
         equ max-1 = 001f ,                                        00080016
adr = 0700 ,                                                       00090014
,*-------------------------------------------------------*,        00100014
,*---This is the initialization section-------------------*,       00101023
,*---Initialization is done for all queues and buffers-----*,      00102023
,*-------------------------------------------------------*,        00104023
,* set up the freequeue   *,                                       00110014
%init    mov (q. $freeq . -zero . $top ) <= #0001 ;                00120028
         mov (q. $freeq . -zero . $bot ) <= #00ff ;                00130028
         mov (q. $freeq . -zero . $indx ) <= #00ff ;               00140028
,* put all buffers on freequeue   *,                               00150014
         mov -cntr & -dreg <= #0000 ;                              00160014
%loop    mov (b. -dreg . $cnt ) <= #0000 ;                         00170014
         inc ,                                                     00180014
         mov (b. -dreg . $succ ) <= #0000 ;                        00190014
         mov -temp <= -dreg ;                                      00200014
         mov -dreg <= -cntr ;                                      00210014
         mov (b. -temp . $next ) <= -dreg ;                        00220014
         jnn #0000 $loop ;                                         00230014
         nop ;                                                     00240014
,*-------------------------------------------------------*,        00250014
,* set up all other queues   *,                                    00260014
%loop2   mov (q. -dreg . $top ) <= #0000 ;                         00270014
         mov (q. -dreg . $bot ) <= #0000 ;                         00280014
         inc ,                                                     00290014
         mov (q. -dreg . $indx ) <= #00ff ;                        00300014
         mov -dreg <= -cntr ;                                      00310014
         jnn #00f8 $loop2 ;                                        00320027
         nop ;                                                     00330014
,*-------------------------------------------------------*,        00340014
,*---The following code comprises the routines used to----*,       00341023
,*---service requests from the Switching Processors-------*,       00342023
,*---All active routines contain a jfu instruction to-----*,       00342124
,*---jump to the next routine and either an nst or a pst--*,       00342224
,*---to strobe the FIFOs - this latches the next request--*,       00342324
,*---out of the FIFOs------------------------------------*,        00342424
,*-------------------------------------------------------*,        00343023
,*---beg is the loop executed when no requests are pending*,       00344024
,*---the idl instruction sets a test bit to indicate that-*,       00344124
,*---the Queue Sequencer is idel--------------------------*,       00344224
,*-------------------------------------------------------*,        00345023
%beg     idl ,                                                     00350019
         jfu ;                                                     00360019
         inc ,                                                     00760014
         jnn $max-1 $isnxt5 ;                                      00770014
         mov (b. -buff . $cnt ) <= -cntr ;                         00780014
            jfu ;                                                  00790014
            mov (b.-buff . $cnt ) <= #0000 ;                       00800014
%isnxt5  jfu ;                                                     00810014
         nop ;                                                     00820014
,*-------------------------------------------------------*,        00830014
,*---Reset is used by input processors to abort a burst ---*,      00831024
,*---which has not been routed- the count is simply reset-*,       00832024
,*-------------------------------------------------------*,        00834024
%reset   mov (b. -buff . $cnt ) <= #0000 ,                         00840014
         nst ;                                                     00850014
         nop ;                                                     00851017
         nop ;                                                     00852018
         jfu ;                                                     00860014
         nop ;                                                     00870014
,*-------------------------------------------------------*,        00880014
,*---Renqun is used by input processors when processing---*,       00881024
,*---the fourth byte of a voice burst routed to a port----*,       00882024
,*---The count is reset - the buffer is enqueued onto the-*,       00882124
,*---appropriate queue - and another buffer is taken from-*,       00882224
,*---the freequeue and chained to this one----------------*,       00882324
,*-------------------------------------------------------*,        00883024
%renqun  nst ,                                                     00890014
         mov -ireg <= (q. -queu . -zero . $indx ) ;                00900028
         mov -dreg <= (q. -queu . -btyp . $bot ) ;                 00910016
```

```
,*--this instruction tests if the queue is empty-----------*,         00911024
            jne #0000 $nnext1 ;                                       00920014
            mov (q. -queu . -btyp . $bot ) <= -buff ;                 00930016
,*--if not the buffers are linked using the next parameter--*,        00931024
            mov -temp & -bufo <= (q. $freeq . -zero . $top ) ,        00940028
            jnu $gtbuf ;                                              00950014
            mov (b. -dreg . $next ) <= -buff ;                        00960014
,*--if so the top and bottom of the queue are set to buff---*,        00961024
%nnext1     mov (q. -queu . -btyp . $top ) <= -buff ;                 00970016
            mov -temp & -bufo <= (q. $freeq . -zero . $top ) ;        00980028
,*--this section gets a buffer from the freequeue-----------*,        00981024
%gtbuf      mov -dreg <= (b. -temp . $next ) ;                        00990014
            mov (b. -buff . $succ ) <= -temp;                         01000014
            mov (b. -buff . $cnt ) <= #0001 ;                         01010016
            jnn #0000 $setind ;                                       01020014
            ein ,                                                     01030014
            mov (q. $freeq . -zero . $top ) <= -dreg ;                01040028
            mov (q. $freeq . -zero . $bot ) <= #0000 ;                01050028
,*--this section updates the index for this destination-----*,        01051024
%setind     ein ,                                                     01060014
            mov (q. -queu . -zero . $indx ) <= -and ;                 01070028
            mov (b. -temp . $cnt ) <= #0000 ,                         01080014
            jfu ;                                                     01090014
            mov (b. -temp . $next ) <= #0000 ;                        01100015
,*----------------------------------------------------------*,        01110014
,*---Resenq is used by input processors when processing------*,       01111024
,*---the fourth byte of a non-voice burst routed to a port---*,       01112024
,*---The count is reset and the buffer is enqueued onto the----*,     01113024
,*---appropriate queue --------------------------------------*,       01114024
,*----------------------------------------------------------*,        01116024
%resenq     nst ,                                                     01120014
            mov -ireg <= (q. -queu . -zero . $indx ) ;                01130028
            mov -dreg <= (q. -queu . -btyp . $bot ) ,                 01140014
            ein ;                                                     01150014
            ein ,                                                     01160014
            mov (q. -queu . -zero . $indx ) <= -and ;                 01170028
            mov (b. -dreg . $next ) <= -buff ,                        01180014
            jne #0000 $nnext2 ;                                       01190014
            mov (q. -queu . -btyp . $bot ) <= -buff ,                 01200025
            jnu $cntset ;                                             01210025
            nop ;                                                     01211025
%nnext2     mov (q. -queu . -btyp . $top ) <= -buff ;                 01220025
%cntset     jfu ;                                                     01230014
            mov (b. -buff . $cnt ) <= #0001 ;                         01240014
,*----------------------------------------------------------*,        01250014
,*---deqnrm is used to dequeue buffers for ports-this is-----*,       01251024
,*---a normal priority instruction and is channel specific---*,       01252024
,*---The index for the destination requesting a deque is -----*,      01253024
,*---checked to see if there is pending work ---------------*,        01254024
,*---deques are done only by output processors-------------*,         01254124
,*----------------------------------------------------------*,        01255024
%deqnrm     mov -ireg  <= (q. -queu . -zero . $indx ) ,               01260028
            nst ;                                                     01270014
            mov -dreg & -temp & -bufo <= (q. -queu . -ireg . $top ) ; 01280014
            jfe #0000 ;                                               01290014
            mov -dreg <= (b. -temp . $next ) ;                        01300014
,*----if so the highest priority work is given to the output-*,       01301024
,*----------------------------------------------------------*,        01302024
            jfn #0000 ;                                               01310014
            mov (q. -queu . -ireg . $top ) <= -dreg ,                 01320014
            din ;                                                     01330014
            din ,                                                     01340014
,*---this instruction updates the index if there are no------*,       01341024
,*---more bursts in this priority class--------------------*,         01342024
            mov (q. -queu . -zero . $indx ) <= -exor;                 01350028
            jfu ;                                                     01360014
            mov (q. -queu . -ireg . $bot ) <= #0000 ;                 01370014
,*----------------------------------------------------------*,        01380014
,*---Deccon is used by output processors in the middle of a--*,       01381024
,*---burst - it updates the count and finds the next--------*,        01382024
,*---active buffer if the present buffer is empty-----------*,        01383024
,*---if there is no next buffer for this burst - zero--------*,       01384024
,*---is automatically returned to the output processor------*,        01384124
,*----------------------------------------------------------*,        01385024
%deccon     mov -cntr & -dreg <= (b. -buff . $cnt ) ,.                01390014
            nst ;                                                     01400014
            dec ,                                                     01410014
            mov -bufo <= -buff ;                                      01420014
            jnn #0001 $finish ;                                       01430016
            mov (b. -buff . $cnt ) <= -cntr ;                         01450014
,*----this section is executed if the present buffer is empty-*,      01451024
            mov -bufo <= (b. -buff . $succ ) ;                        01460014
            mov -dreg <= (q. $freeq . -zero . $bot ) ;                01470028
```

```
                    mov (b. -buff . $next ) <= #0000 ,                      01480014
                    jne #0000 $zertop ;                                     01490014
                    mov (q. $freeq . -zero . $bot ) <= -buff ;              01500028
                       jfu ;                                                01510014
                       mov (b. -dreg . $next ) <= -buff ;                   01520014
%zertop             jfu ;                                                   01530014
                    mov (q. $freeq . -zero . $top ) <= -buff ;              01540028
%finish             jfu ;                                                   01550014
                    nop ;                                                   01560014
,*------------------------------------------------------------------*,      01570014
,*---Putbuf is used by output processors at the end of a-----*,             01571024
,*---burst - it returns the buffer to the freequeue---------*,              01572024
,*---if the freequeue was empty both the top and bottom-----*,              01573024
,*---of the freequeue are set to this buffer---------------*,               01574024
,*------------------------------------------------------------------*,      01576024
%putbuf    mov -dreg <= (q. $freeq . -zero . $bot ) ,                       01580028
           nst ;                                                            01590014
           mov -bufo & (b. -buff . $next ) <= #0000 ,                       01600014
           jne #0000 $nnext6 ;                                              01610014
           mov (q. $freeq . -zero . $bot ) <= -buff ;                       01620028
              jfu ;                                                         01630014
              mov (b. -dreg . $next ) <= -buff ;                            01640014
%nnext6       jfu ;                                                         01650014
              mov (q. $freeq . -zero . $top ) <= -buff ;                    01660028
,*------------------------------------------------------------------*,      01670014
,*---Getbuf is used by input processors for initialization--*,              01671024
,*---it returns a buffer from the freequeue----------------*,               01672024
,*------------------------------------------------------------------*,      01675024
%getbuf    nst ,                                                            01680014
           mov -temp & -bufo <= (q. $freeq . -zero . $top ) ;               01690028
           mov -dreg <= (b. -temp . $next ) ;                               01700014
           mov (q. $freeq . -zero . $top ) <= -dreg ;                       01710028
           jfu ;                                                            01720014
           mov (b. -temp . $next ) <= #0000 ;                               01721015
,*------------------------------------------------------------------*,      01740014
,*---Setbuf is used by output processors for initialization--*,             01741024
,*---it returns 0 in order to reset the dual port RAM-------*,              01742024
,*------------------------------------------------------------------*,      01743024
%setbuf    nst ;                                                            01750014
           mov -bufo <= #0000 ;                                             01760014
           nop ;                                                            01761018
           jfu ;                                                            01770014
           nop ;                                                            01780014
,*------------------------------------------------------------------*,      01790014
,*---The following are high priority instructions-----------*,              01791024
,*------------------------------------------------------------------*,      01791124
,*---Incenq is used by input processors when processing-----*,              01792024
,*---the first byte of a non-voice burst routed to a link -should---*,      01793024
,*---be fast because it is in the critical path - the buffer---*,           01794024
,*---is enqueued - the index is updated - and the count-----*,              01795024
,*---is incremented----------------------------------------*,               01795124
,*------------------------------------------------------------------*,      01796024
%incenq    mov -cntr & -dreg <= (b. -buff . $cnt ) ,                        01800014
           pst ;                                                            01810014
           inc ,                                                            01820014
           mov -dreg <= (q. -queu . -btyp . $bot ) ;                        01830014
           mov -ireg <= (q. -queu . -zero . $indx ) ,                       01840028
           jne #0000 $nonext ;                                              01850014
           mov (b. -buff . $cnt ) <= -cntr ;                                01860014
              mov (q. -queu . -btyp . $bot ) <= -buff ,                     01870014
              jfu ;                                                         01880014
              mov (b. -dreg . $next ) <= -buff ;                            01890014
%nonext    mov (q. -queu . -btyp . $bot ) <= -buff ,                        01900014
           ein ;                                                            01910014
           ein ,                                                            01920014
           mov (q. -queu . -zero . $indx ) <= -and ;                        01930028
           jfu ;                                                            01940014
           mov (q. -queu . - btyp . $top ) <= -buff ;                       01950014
,*------------------------------------------------------------------*,      01960014
,*---Incunl is used by input processors when processing-----*,              01961024
,*---the first byte of a voice burst routed to a link -----*,               01962024
,*---the buffer is enqueued - the index is updated -------*,                01964024
,*---and the buffer is linked to another buffer-----*,                      01965024
,*------------------------------------------------------------------*,      01966024
%incunl    mov -cntr & -dreg <= (b. -buff . $cnt ) ,                        01970014
           pst ;                                                            01980014
           inc ,                                                            01990014
           mov -temp & -bufo <= (q. $freeq . -zero . $top ) ;               02000028
           mov (b. -buff . $succ ) <= -temp ;                               02010014
           mov -dreg <= (b. -temp . $next ) ;                               02020014
           mov (b. -buff . $cnt ) <= -cntr ,                                02030014
           jnn #0000 $isnxt2 ;                                              02040014
           mov (q. $freeq . -zero . $top ) <= -dreg ;                       02050028
              mov (q. $freeq . -zero . $bot ) <= #0000 ;                    02060028
```

```
%isnxt2     mov (b. -temp . $cnt ) <= #0000 ,              02070014
            nop ;                                          02480014
                                                           02490014
,*------------------------------------------------------*, 02491024
,*---The rest of this code may be used to test the------*, 02492024
,*---Queue Sequencer-------------------------------------*,02493024
,*------------------------------------------------------*, 02500014
,* test for memory  *,                                     02510014
%test1      mov -cntr <= #0000 ;                           02520014
            mov -temp <= -cntr ;                           02530014
%bloop      mov (b. -temp . $cnt ) <= #0055 ;              02540014
            mov -dreg <= (b.-temp. $cnt ) ;                02550014
            jnn #0055 $error ;                             02560014
            mov (b. -temp . $cnt ) <= #00aa ;              02570014
            mov -dreg <= (b.-temp. $cnt ) ;                02580014
            jnn #00aa $error ;                             02590014
            mov (b. -temp . $succ ) <= #0055 ;             02600014
            mov -dreg <= (b.-temp. $succ ) ;               02610014
            jnn #0055 $error ;                             02620014
            mov (b. -temp . $succ ) <= #00aa ;             02630014
            mov -dreg <= (b.-temp. $succ ) ;               02640014
            jnn #00aa $error ;                             02650014
            mov (b. -temp . $next ) <= #0055 ;             02660014
            mov -dreg <= (b.-temp. $next ) ;               02670014
            jnn #0055 $error ;                             02680014
            mov (b. -temp . $next ) <= #00aa ;             02690014
            mov -dreg <= (b.-temp. $next ) ;               02700014
            jnn #00aa $error ;                             02710014
            inc ;                                          02720014
            mov -temp & -dreg <= -cntr ;                   02730014
            jnn #0000 $bloop ;                             02740014
            nop ;                                          02750014
%qloop      mov (q. -temp . $indx ) <= #0055 ;             02760014
            mov -dreg <= (q.-temp. $indx ) ;               02770014
            jnn #0055 $error ;                             02780014
            mov (q. -temp . $indx ) <= #00aa ;             02790014
            mov -dreg <= (q.-temp. $indx ) ;               02800014
            jnn #00aa $error ;                             02810014
            mov (q. -temp . $top ) <= #0055 ;              02820014
            mov -dreg <= (q.-temp. $top ) ;                02830014
            jnn #0055 $error ;                             02840014
            mov (q. -temp . $top ) <= #00aa ;              02850014
            mov -dreg <= (q.-temp. $top ) ;                02860014
            jnn #00aa $error ;                             02870014
            mov (q. -temp . $bot ) <= #0055 ;              02880014
            mov -dreg <= (q.-temp. $bot ) ;                02890014
            jnn #0055 $error ;                             02900014
            mov (q. -temp . $bot ) <= #00aa ;              02910014
            mov -dreg <= (q.-temp. $bot ) ;                02920014
            jnn #00aa $error ;                             02930014
            inc ;                                          02940014
            mov -temp & -dreg <= -cntr ;                   02950014
            jnn #0000 $qloop ;                             02960014
            nop ;                                          02970014
%iloop      jnu $iloop ;                                   02980014
            nop ;                                          02990014
%error      mov -dreg <= -cntr ;                           03000014
            mov -ireg <= -temp ;                           03010014
            jnu $error ;                                   03020014
            nop ;                                          03030014
,*------------------------------------------------------*, 03040014
fin ,                                                      03050014
,*------------------------------------------------------*, 03060014
                                                           03070014
     BITS | 7 | 6 | 5 | 4 | 3 | 2 | 1 | 0                  03080014
                                                           03090014
            jfu ;                                          02080014
            mov (b. -temp . $next ) <= #0000 ;             02090015
,*------------------------------------------------------*, 02100014
,*---deqpr0 is used to dequeue buffers for link 0 - this is-----*, 02101024
,*---a the highest priority instruction and is not channel--*, 02102024
,*---specific - otherwise this is very similar to deqnrm ------*, 02103024
,*------------------------------------------------------*, 02106024
%deqpr0     mov -ireg  <= (q. $lop0q . -zero . $indx ) ,   02110028
            dq0 ;                                          02120014
            mov -dreg & -temp & -buf0 <= (q. $lop0q . -ireg . $top ) , 02130022
            dq0 ;                                          02131022
            jfe #0000 ,                                    02140022
            dq0 ;                                          02141022
            mov -dreg <= (b. -temp . $next ) ;             02150014
              jfn #0000 ;                                  02160014
              mov (q. $lop0q . -ireg . $top ) <= -dreg ,   02170022
              din ;                                        02180014
                din ,                                      02190014
```

```
                    mov (q. $lop0q . -zero . $indx ) <= -exor;          02200028
                    jfu ;                                                02210014
                    mov (q. $lop0q . -ireg . $bot ) <= #0000 ;           02220022
                                                                         02230014
,*---------------------------------------------------------------*,      02231024
,*---deqpr1 is used to dequeue buffers for link 1 - this is-----*,       02232024
,*---identical to deqpr0 except for the queues used------------*,        02233024
,*---high priority dequeues use hardware lines rather than-----*,        02233124
,*---instructions in the FIFOs to make requests----------------*,        02234024
,*---------------------------------------------------------------*,      02240028
%deqpr1       mov -ireg <= (q. $lop1q . -zero . $indx ) ,                02250014
              dq1 ;                                                      02260022
              mov -dreg & -temp & -bufo <= (q. $lop1q . -ireg . $top ) , 02261022
              dq1 ;                                                      02270022
              jfe #0000 ,                                                02271022
              dq1 ;                                                      02280014
              mov -dreg <= (b. -temp . $next ) ;                         02290014
                jfn #0000 ;                                              02300022
                mov (q. $lop1q . -ireg . $top ) <= -dreg ,               02310014
                din ;                                                    02320014
                  din ,                                                  02330028
                  mov (q. $lop1q . -zero . $indx ) <= -exor;             02340014
                  jfu ;                                                  02350022
                  mov (q. $lop1q . -ireg . $bot ) <= #0000 ;             02360014
,*---------------------------------------------------------------*,      02361024
,*--nnop is used to clean garbage from the normal priority-FIFO-*,       02363024
,*---------------------------------------------------------------*,      02370014
%nnop         nst ;                                                      02371017
              nop ;                                                      02372018
              nop ;                                                      02380014
              jfu ;                                                      02390014
              nop ;                                                      02400014
,*---------------------------------------------------------------*,      02401024
,*--pnop is used to clean garbage from the high priority FIFO-*,         02402024
,*---------------------------------------------------------------*,      02410014
%pnop         pst ;                                                      02411017
              nop ;                                                      02412018
              nop ;                                                      02420014
              jfu ;                                                      02430014
              nop ;                                                      02440014
,*---------------------------------------------------------------*,      02441024
,*--anop is used to clean garbage from both FIFOs--------------*,        02442024
,*---------------------------------------------------------------*,      02450014
%anop         nst ,                                                      02460014
              pst ;                                                      02461017
              nop ;                                                      02462018
              nop ;                                                      02470014
              jfu ;                                                      03100014
```

| PROM # | | | | | | | | |
|---|---|---|---|---|---|---|---|---|
| 1 | |------------------ UADDOUT --------------------| | | | | | |
| 2 | /NAEN | /MAENO | IDLE | -- LADDOUT -- | -------- SEL -------- | | | |
| 3 | |------------------- NEXTADD --------------------| | | | | | |
| 4 | |------------------- DATAOUT --------------------| | | | | | |
| 5 | | |-------------------- WEN --------------------| | | | | |
| | | | CNTR | IREG | BUFQ | LMEM | DREG | TEMP |
| 6 | |------------------------DD--------------------| | | | | | |
| | AND | XNOR | CNTR | BUFF | SEQU | LMEM | DREG | TEMP |
| 7 | |----- /MAEN -|------------------- /UAEN --------------| | | | | |
| | BTYP | IREG | SEQ1 | BUFF | SEQU | QUEU | DREG | TEMP |
| | |--------------------- MISC ---------------------| | | | | | |
| 8 | /DQR1 | /DQR0 | B/$\overline{Q}$ | B/$\overline{T}$ | D/$\overline{U}$ | CNTEN | /PSTR | /NSTR | qseq.text(qsform1)

We claim:

1. A high-speed queue sequencer for use in a switch of a burst-switching communications system, a burst being a plurality of bytes, said system including a plurality of switches interconnected by time-division multiplexed communications links, each link having a plurality of frames within each second of time, each frame having a plurality of channels, each channel having communications capacity for the transmission of one byte, a byte being a predetermined number of bits, a bit being one binary digit, said system including a plurality of ports, each port being a component of a switch, said switch including a queue sequencer and at least one switching processor, said queue sequencer and switching processor(s) being coupled via a queue-sequencer bus, said queue sequencer comprising:
  (a) a data/address bus;
  (b) control means coupled with said data/address bus for controlling said queue sequencer, said control means including stored-program memory and execution means and queue-memory means for storing administrative information pertaining to bursts passing through said link switch;
  (c) enque/deque means coupled with said data/address bus, said enque means for performing the administration required for placing a burst on an output queue, said output queue being a list which indicates those bursts awaiting assignment to an output channel in a communications link, said deque means for assigning the highest priority burst on an output queue to an idle output channel of said communications link and removing said assigned burst from said output queue, said enque/deque means operating substantially in parallel with and independently of said control means;
  (d) request-holding means coupled with said data/address bus, for receiving requests from said switching processor(s), determining the priority of each request, storing said pending requests within priority classes, and outputting said requests within each priority class in the same time order as received, said request-holding means operating substantially in parallel with and independently of said control means;
  (e) input-interface means coupled between said queue-sequencer bus and said request-holding means, for providing an interface between said queue sequencer and said switching processor(s), said input-interface means having the ability to receive a request from a switching processor of said switch and to transmit said request to said request-holding means, said input-interface means operating substantially in parallel with and independently of said control means; and
  (f) output-interface means coupled between said data/address bus and said queue-sequencer bus, for providing an interface between said queue sequencer and said switching processor(s), said output interface means having the ability to transmit a buffer address to a switching processor, said output-interface means operating substantially in parallel with and independently of said control means;
  (g) whereby said queue sequencer operates substantially in parallel with and independently of said switching processor(s), and said queue sequencer acts on behalf of all switching processors of said switch.

2. A high-speed queue sequencer for use in a switch of a burst-switching communications system as described in claim 1 wherein the transmission speeds over said communications links are substantially equivalent to the T1 rate or a higher rate.

3. A high-speed queue sequencer for use in a switch of a burst-switching communications system as described in claim 1 wherein a byte is eight bits.

4. A high-speed queue sequencer for use in a switch of a burst-switching communications system as described in claim 1 wherein said request-holding means comprises one or more first-in first-out memories, each of said memories including the required control functions.

5. A high-speed queue sequencer for use in a switch of a burst-switching communications system as described in claim 1 wherein said stored-program memory is a programmable read-only memory having a word length of at least sixty-four bits.

6. A high-speed queue sequencer for use in a switch of a burst-switching system as described in claim 1 wherein said queue-memory means is a random-access memory coupled with said data/address bus and said control means.

7. A high-speed queue sequencer for use in a switch of a burst-switching system as described in claim 1 wherein said communications system includes a link switch and said queue sequencer is a component of said link switch.

8. A high-speed queue sequencer for use in a switch of a burst-switching system as described in claim 1 wherein said communications system includes a hub switch and said queue sequencer is a component of said hub switch.

9. A high-speed queue sequencer for use in a switch of a burst-switching communications system, a burst being a plurality of bytes, a byte being a predetermined number of bits, a bit being one binary digit, said system including a link switch having a plurality of ports, each port being a component of said switch, each port being associated with a communications channel, said link switch including a queue sequencer and at least one switching processor, said queue sequencer and switching processor(s) being coupled via a queue-sequencer bus, said queue sequencer comprising:
  (a) a data/address bus;
  (b) control means coupled with said data/address bus for controlling said queue sequencer, said control means including stored-program memory and execution means and queue-memory means for storing administrative information pertaining to bursts passing through said link switch;
  (c) enque/deque means coupled with said data/address bus, said enque means for performing the administration required for placing a burst on an output queue, said output queue being a list which indicates those bursts awaiting assignment to an output channel, said deque means for assigning the highest priority burst on an output queue to an idle output channel and removing said assigned burst from said output queue, said enque/deque means operating substantially in parallel with and independently of said control means;
  (d) request-holding means coupled with said data/address bus, for receiving requests from said switching processor(s), determining the priority of each request, storing said pending requests within priority classes, and outputting said requests within each priority class in the same time order as received, said request-holding means operating substantially in parallel with and independently of said control means;

(e) input-interface means coupled between said queue-sequencer bus and said request-holding means, for providing an interface between said queue sequencer and said switching processor(s), said input-interface means having the ability to receive a request from a switching processor of said link switch and to transmit said request to said request-holding means, said input-interface means operating substantially in parallel with and independently of said control means; and (f) output-interface means coupled between said data-/address bus and said queue-sequencer bus, for providing an interface between said queue sequencer and said switching processor(s), said output interface means having the ability to transmit a buffer address to a switching processor, said output-interface means operating substantially in parallel with and independently of said control means;

(g) whereby said queue sequencer operates substantially in parallel with and independently of said switching processor(s), and said queue sequencer acts on behalf of all switching processors of said link switch.

10. A high-speed queue sequencer for use in a switch of a burst-switching communications system as described in claim 9 wherein a byte is eight bits.

11. A high-speed queue sequencer for use in a switch of a burst-switching communications system as described in claim 9 wherein said request-holding means comprises one or more first-in first-out memories, each of said memories including the required control functions.

12. A high-speed queue sequencer for use in a switch of a burst-switching communications system as described in claim 9 wherein said stored-program memory is a programmable read-only memory having a word length of at least sixty-four bits.

13. A high-speed queue sequencer for use in a switch of a burst-switching system as described in claim 9 wherein said queue-memory means is a random-access memory coupled with said data/address bus and said control means.

14. A high-speed queue sequencer for use in a switch of a burst-switching system as described in claim 9 wherein said communications system includes a link switch and said queue sequencer is a component of said link switch.

15. A high-speed queue sequencer for a burst-switching system as described in claim 9 wherein said communications system includes a hub switch and said queue sequencer is a component of said hub switch.

* * * * *